US012108216B2

(12) United States Patent
Vermeiren et al.

(10) Patent No.: US 12,108,216 B2
(45) Date of Patent: Oct. 1, 2024

(54) IMPACT AND RESONANCE MANAGEMENT

(71) Applicants: Jan Vermeiren, Mechelen (BE); Travis Rian Andrews, Westminster, CO (US)

(72) Inventors: Jan Vermeiren, Mechelen (BE); Travis Rian Andrews, Westminster, CO (US)

(73) Assignee: Cochlear Limited, Macquarie University (AU)

( * ) Notice: Subject to any disclaimer, the term of this patent is extended or adjusted under 35 U.S.C. 154(b) by 0 days.

(21) Appl. No.: 17/572,263

(22) Filed: Jan. 10, 2022

(65) Prior Publication Data

US 2022/0210582 A1 Jun. 30, 2022

Related U.S. Application Data

(62) Division of application No. 15/656,181, filed on Jul. 21, 2017, now Pat. No. 11,223,912.

(51) Int. Cl.
*H04R 1/10* (2006.01)
*H04R 25/00* (2006.01)

(52) U.S. Cl.
CPC ........... *H04R 25/48* (2013.01); *H04R 25/606* (2013.01); *H04R 25/65* (2013.01); *H04R 2225/67* (2013.01)

(58) Field of Classification Search
CPC ...... H04R 25/65; H04R 25/606; H04R 9/027; H04R 25/48; H04R 25/604; H04R 1/10; H04R 1/1091; H04R 25/603; H04R 2225/67; H02K 33/18
See application file for complete search history.

(56) References Cited

U.S. PATENT DOCUMENTS

| | | | | |
|---|---|---|---|---|
| 7,076,074 B2 * | 7/2006 | Gebert | H04R 25/604 | 381/328 |
| 7,180,225 B2 * | 2/2007 | Sashida | B06B 1/0611 | 367/160 |
| 7,442,164 B2 * | 10/2008 | Berrang | H04R 25/606 | 600/25 |
| 10,003,898 B1 * | 6/2018 | Bjorn | H04R 25/606 | |
| 11,223,912 B2 * | 1/2022 | Vermeiren | H04R 25/65 | |
| 2006/0045298 A1 * | 3/2006 | Westerkull | H02K 33/18 | 381/322 |
| 2012/0302822 A1 * | 11/2012 | Van Himbeeck | H04R 1/1091 | 381/151 |
| 2014/0163308 A1 * | 6/2014 | Miller | H04R 1/2896 | 29/25.35 |
| 2015/0156594 A1 * | 6/2015 | Bervoets | H04R 25/606 | 600/25 |
| 2016/0112813 A1 * | 4/2016 | Hillbratt | H04R 25/603 | 381/326 |
| 2017/0134841 A1 * | 5/2017 | Miller | H04R 1/10 | |
| 2019/0028819 A1 * | 1/2019 | Vermeiren | H04R 25/606 | |
| 2022/0210582 A1 * | 6/2022 | Vermeiren | H04R 25/606 | |

* cited by examiner

*Primary Examiner* — Gerald Gauthier
(74) *Attorney, Agent, or Firm* — Pilloff Passino & Cosenza LLP; Martin J. Cosenza

(57) ABSTRACT

A vibrator including a housing, a transducer positioned within the housing such that there is a gap between the transducer and housing, and a damper assembly, disposed in the gap between the housing and at least a portion of the transducer, the damper assembly extending a sub-distance of the total distance of the gap.

27 Claims, 37 Drawing Sheets

IMPACT AND RESONANCE MANAGEMENT

CROSS REFERENCE TO RELATED APPLICATIONS

The present application is a Divisional application of U.S. patent application Ser. No. 15/656,181, filed Jul. 21, 2017, naming Jan VERMEIREN as an inventor, the entire contents of that application being hereby incorporated by reference herein in its entirety.

BACKGROUND

Hearing loss, which may be due to many different causes, is generally of two types: conductive and sensorineural. Sensorineural hearing loss is due to the absence or destruction of the hair cells in the cochlea that transduce sound signals into nerve impulses. Various hearing prostheses are commercially available to provide individuals suffering from sensorineural hearing loss with the ability to perceive sound. For example, cochlear implants use an electrode array implanted in the cochlea of a recipient to bypass the mechanisms of the ear. More specifically, an electrical stimulus is provided via the electrode array to the auditory nerve, thereby causing a hearing percept.

Conductive hearing loss occurs when the normal mechanical pathways that provide sound to hair cells in the cochlea are impeded, for example, by damage to the ossicular chain or the ear canal. Individuals suffering from conductive hearing loss may retain some form of residual hearing because the hair cells in the cochlea may remain undamaged.

Individuals suffering from conductive hearing loss typically receive an acoustic hearing aid. Hearing aids rely on principles of air conduction to transmit acoustic signals to the cochlea. In particular, a hearing aid typically uses an arrangement positioned in the recipient's ear canal or on the outer ear to amplify a sound received by the outer ear of the recipient. This amplified sound reaches the cochlea causing motion of the perilymph and stimulation of the auditory nerve.

In contrast to hearing aids, which rely primarily on the principles of air conduction, certain types of hearing prostheses, commonly referred to as bone conduction devices, convert a received sound into vibrations. The vibrations are transferred through the skull to the cochlea causing generation of nerve impulses, which result in the perception of the received sound. Bone conduction devices are suitable to treat a variety of types of hearing loss and may be suitable for individuals who cannot derive sufficient benefit from acoustic hearing aids, cochlear implants, etc., or for individuals who suffer from stuttering problems. Other types of hearing prostheses, such as middle ear implants, can have utilitarian value, and use actuators.

SUMMARY

In accordance with one aspect, there is a vibrator comprising, a housing, a transducer positioned within the housing such that there is a gap between the transducer and housing, and a damper assembly, disposed in the gap between the housing and at least a portion of the transducer, the damper assembly extending a sub-distance of the total distance of the gap.

In accordance with another aspect, there is a prosthesis, comprising a transducer-seismic mass assembly, a housing, and a shock-proof assembly configured to permanently shock proof the transducer-seismic mass assembly, wherein the prosthesis is configured such that the shock proof assembly is free of contact of one of the housing or the transducer-seismic mass assembly during normal operation.

In accordance with another aspect, there is a prosthesis, comprising a transducer and a damper configured to provide varying degrees of damping to the transducer, which varying degrees include at least effectively no damping.

In accordance with another aspect, there is a prosthesis, comprising a transducer-seismic mass assembly, a housing, and a damper apparatus, wherein the damper apparatus is made by a method of completely filling a space between the housing and the transducer-seismic mass assembly with structural components of the prosthesis, and permanently shrinking the damper apparatus to create a gas gap in the formerly filled space.

BRIEF DESCRIPTION OF THE DRAWINGS

Some embodiments are described below with reference to the attached drawings, in which.

DETAILED DESCRIPTION

Embodiments herein are described primarily in terms of a bone conduction device, such as an active transcutaneous bone conduction device and a passive transcutaneous bone conduction device. However, it is noted that the teachings detailed herein and/or variations thereof are also applicable to a middle ear implant or an inner ear implant, or a percutaneous bone conduction device, for that matter. Accordingly, any disclosure herein of teachings utilized with an active transcutaneous bone conduction device also corresponds to a disclosure of utilizing those teachings with respect to a passive transcutaneous bone conduction device and a middle ear implant and an inner ear implant and a percutaneous bone conduction device, etc.

Figure 1A:
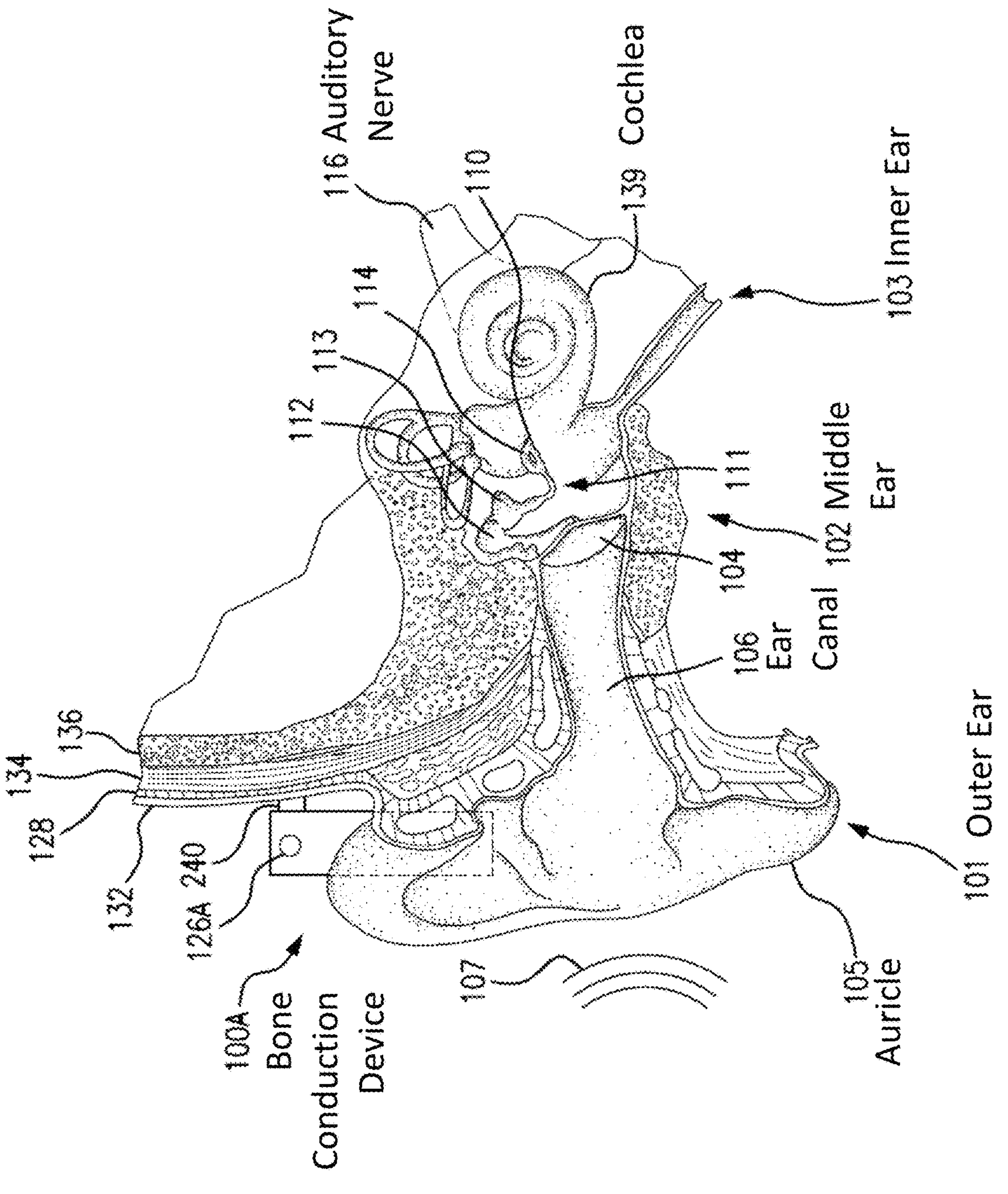
FIG. 1A is a perspective view of an exemplary bone conduction device in which at least some embodiments can be implemented.

FIG. 1A is a perspective view of a bone conduction device 100A in which embodiments may be implemented. As shown, the recipient has an outer ear 101, a middle ear 102, and an inner ear 103. Elements of outer ear 101, middle ear 102, and inner ear 103 are described below, followed by a description of bone conduction device 100.

In a fully functional human hearing anatomy, outer ear 101 comprises an auricle 105 and an ear canal 106. A sound wave or acoustic pressure 107 is collected by auricle 105 and channeled into and through ear canal 106. Disposed across the distal end of ear canal 106 is a tympanic membrane 104 which vibrates in response to acoustic wave 107. This vibration is coupled to oval window or fenestra ovalis 210 through three bones of middle ear 102, collectively referred to as the ossicles 111 and comprising the malleus 112, the incus 113 and the stapes 114. The ossicles 111 of middle ear 102 serve to filter and amplify acoustic wave 107, causing oval window 210 to vibrate. Such vibration sets up waves of fluid motion within cochlea 139. Such fluid motion, in turn, activates hair cells (not shown) that line the inside of cochlea 139. Activation of the hair cells causes appropriate nerve impulses to be transferred through the spiral ganglion cells and auditory nerve 116 to the brain (not shown), where they are perceived as sound.

FIG. 1A also illustrates the positioning of bone conduction device 100A relative to outer ear 101, middle ear 102 and inner ear 103 of a recipient of device 100. As shown, bone conduction device 100 is positioned behind outer ear 101 of the recipient and comprises a sound input element 126A to receive sound signals. Sound input element may comprise, for example, a microphone, telecoil, etc. In an exemplary embodiment, sound input element 126A may be located, for example, on or in bone conduction device 100A, or on a cable extending from bone conduction device 100A.

In an exemplary embodiment, bone conduction device 100A comprises an operationally removable component and a bone conduction implant. The operationally removable component is operationally releasably coupled to the bone conduction implant. By operationally releasably coupled, it is meant that it is releasable in such a manner that the recipient can relatively easily attach and remove the operationally removable component during normal use of the bone conduction device 100A. Such releasable coupling is accomplished via a coupling assembly of the operationally removable component and a corresponding mating apparatus of the bone conduction implant, as will be detailed below. This as contrasted with how the bone conduction implant is attached to the skull, as will also be detailed below. The operationally removable component includes a sound processor (not shown), a vibratory electromagnetic actuator and/or a vibratory piezoelectric actuator and/or other type of actuator (not shown—which are sometimes referred to herein as a species of the genus vibrator) and/or various other operational components, such as sound input device 126A. In this regard, the operationally removable component is sometimes referred to herein as a vibrator unit. More particularly, sound input device 126A (e.g., a microphone) converts received sound signals into electrical signals. These electrical signals are processed by the sound processor. The sound processor generates control signals which cause the actuator to vibrate. In other words, the actuator converts the electrical signals into mechanical motion to impart vibrations to the recipient's skull.

As illustrated, the operationally removable component of the bone conduction device 100A further includes a coupling assembly 240 configured to operationally removably attach the operationally removable component to a bone conduction implant (also referred to as an anchor system and/or a fixation system) which is implanted in the recipient. In the embodiment of FIG. 1, coupling assembly 240 is coupled to the bone conduction implant (not shown) implanted in the recipient in a manner that is further detailed below with respect to exemplary embodiments of the bone conduction implant. Briefly, an exemplary bone conduction implant may include a percutaneous abutment attached to a bone fixture via a screw, the bone fixture being fixed to the recipient's skull bone 136. The abutment extends from the bone fixture which is screwed into bone 136, through muscle 134, fat 128 and skin 232 so that the coupling assembly may be attached thereto. Such a percutaneous abutment provides an attachment location for the coupling assembly that facilitates efficient transmission of mechanical force.

It is noted that while many of the details of the embodiments presented herein are described with respect to a percutaneous bone conduction device, some or all of the teachings disclosed herein may be utilized in transcutaneous bone conduction devices and/or other devices that utilize a vibratory electromagnetic actuator. For example, embodiments include active transcutaneous bone conduction systems utilizing the electromagnetic actuators disclosed herein and variations thereof where at least one active component (e.g., the electromagnetic actuator) is implanted beneath the skin. Embodiments also include passive transcutaneous bone conduction systems utilizing the electromagnetic actuators disclosed herein and variations thereof where no active component (e.g., the electromagnetic actuator) is implanted beneath the skin (it is instead located in an external device), and the implantable part is, for instance a magnetic pressure plate. Some embodiments of the passive transcutaneous bone conduction systems are configured for use where the vibrator (located in an external device) containing the electromagnetic actuator is held in place by pressing the vibrator against the skin of the recipient. In an exemplary embodiment, an implantable holding assembly is implanted in the recipient that is configured to press the bone conduction device against the skin of the recipient. In other embodiments, the vibrator is held against the skin via a magnetic coupling (magnetic material and/or magnets being implanted in the recipient and the vibrator having a magnet and/or magnetic material to complete the magnetic circuit, thereby coupling the vibrator to the recipient).

Figure 1B:
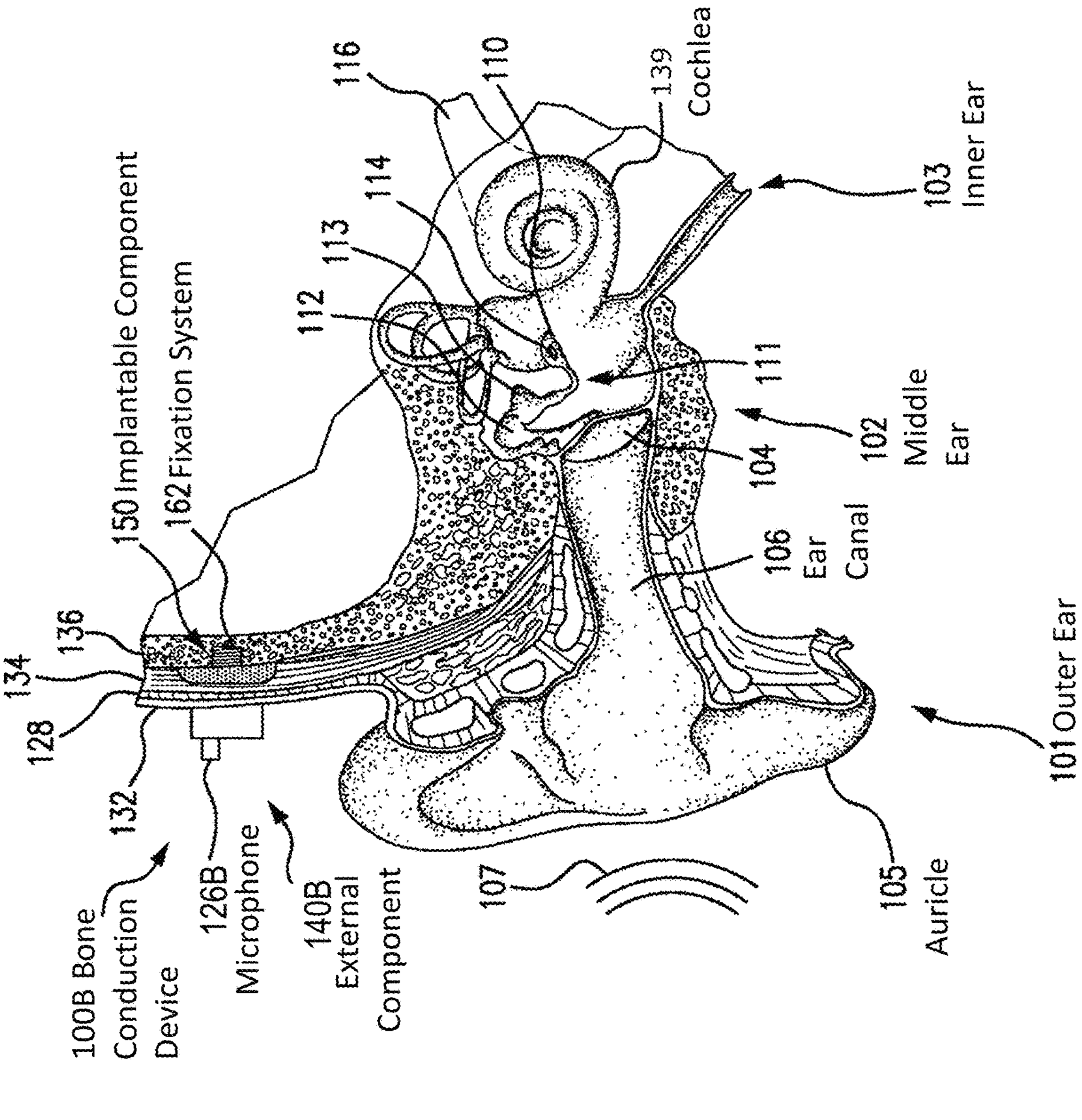
FIG. 1B is a perspective view of an alternate exemplary bone conduction device in which at least some embodiments can be implemented.

More specifically, FIG. 1B is a perspective view of a transcutaneous bone conduction device 100B in which embodiments can be implemented.

FIG. 1A also illustrates the positioning of bone conduction device 100B relative to outer ear 101, middle ear 102 and inner ear 103 of a recipient of device 100. As shown, bone conduction device 100 is positioned behind outer ear 101 of the recipient. Bone conduction device 100B comprises an external component 140B and implantable component 150. The bone conduction device 100B includes a sound input element 126B to receive sound signals. As with sound input element 126A, sound input element 126B may comprise, for example, a microphone, telecoil, etc. In an exemplary embodiment, sound input element 126B may be located, for example, on or in bone conduction device 100B, on a cable or tube extending from bone conduction device 100B, etc. Alternatively, sound input element 126B may be subcutaneously implanted in the recipient, or positioned in the recipient's ear. Sound input element 126B may also be a component that receives an electronic signal indicative of sound, such as, for example, from an external audio device. For example, sound input element 126B may receive a sound signal in the form of an electrical signal from an MP3 player electronically connected to sound input element 126B.

Bone conduction device 100B comprises a sound processor (not shown), an actuator (also not shown) and/or various other operational components. In operation, sound input device 126B converts received sounds into electrical signals. These electrical signals are utilized by the sound processor to generate control signals that cause the actuator to vibrate. In other words, the actuator converts the electrical signals into mechanical vibrations for delivery to the recipient's skull.

In accordance with some embodiments, a fixation system 162 may be used to secure implantable component 150 to skull 136. As described below, fixation system 162 may be a bone screw fixed to skull 136, and also attached to implantable component 150.

In one arrangement of FIG. 1B, bone conduction device 100B is a passive transcutaneous bone conduction device. That is, no active components, such as the actuator, are implanted beneath the recipient's skin 132. In such an arrangement, the active actuator is located in external component 140B, and implantable component 150 includes a magnetic plate, as will be discussed in greater detail below. The magnetic plate of the implantable component 150 vibrates in response to vibration transmitted through the skin, mechanically and/or via a magnetic field, that are generated by an external magnetic plate.

In another arrangement of FIG. 1B, bone conduction device 100B is an active transcutaneous bone conduction device where at least one active component, such as the actuator, is implanted beneath the recipient's skin 132 and is thus part of the implantable component 150. As described below, in such an arrangement, external component 140B may comprise a sound processor and transmitter, while implantable component 150 may comprise a signal receiver and/or various other electronic circuits/devices.

Figure 2:
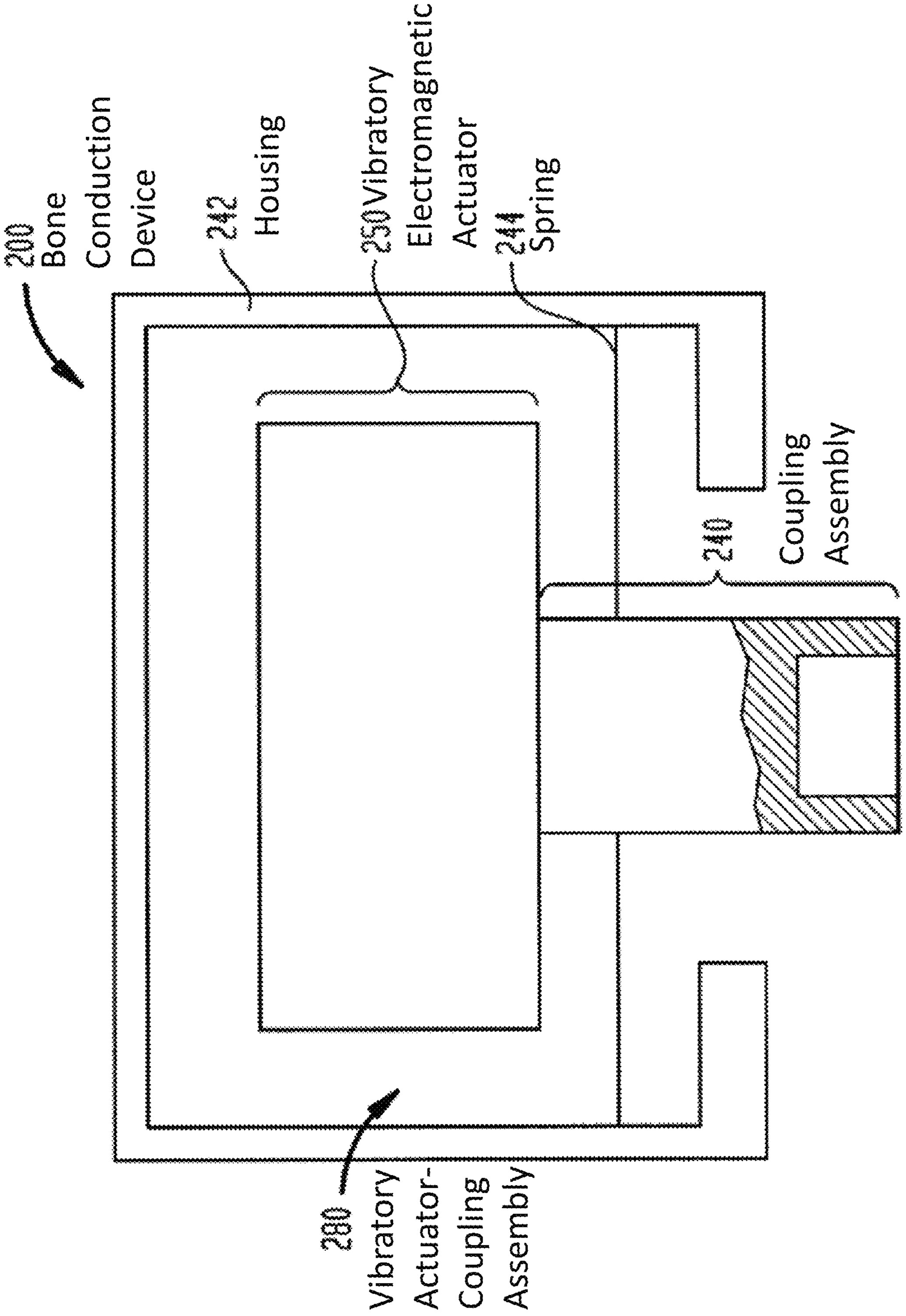
FIG. 2 is a schematic diagram conceptually illustrating a removable component of a percutaneous bone conduction device in accordance with at least some exemplary embodiments.

FIG. 2 is an embodiment of a bone conduction device 200 in accordance with an embodiment corresponding to that of FIG. 1A, illustrating use of a percutaneous bone conduction device. Bone conduction device 200, corresponding to, for example, element 100A of FIG. 1A, includes a housing 242, a vibratory electromagnetic actuator 250, a coupling assembly 240 that extends from housing 242 and is mechanically linked to vibratory electromagnetic actuator 250. Collectively, vibratory electromagnetic actuator 250 and coupling assembly 240 form a vibratory actuator-coupling assembly 280. Vibratory actuator-coupling assembly 280 is suspended in housing 242 by spring 244. In an exemplary embodiment, spring 244 is connected to coupling assembly 240, and vibratory electromagnetic actuator 250 is supported by coupling assembly 240.

Figure 3:
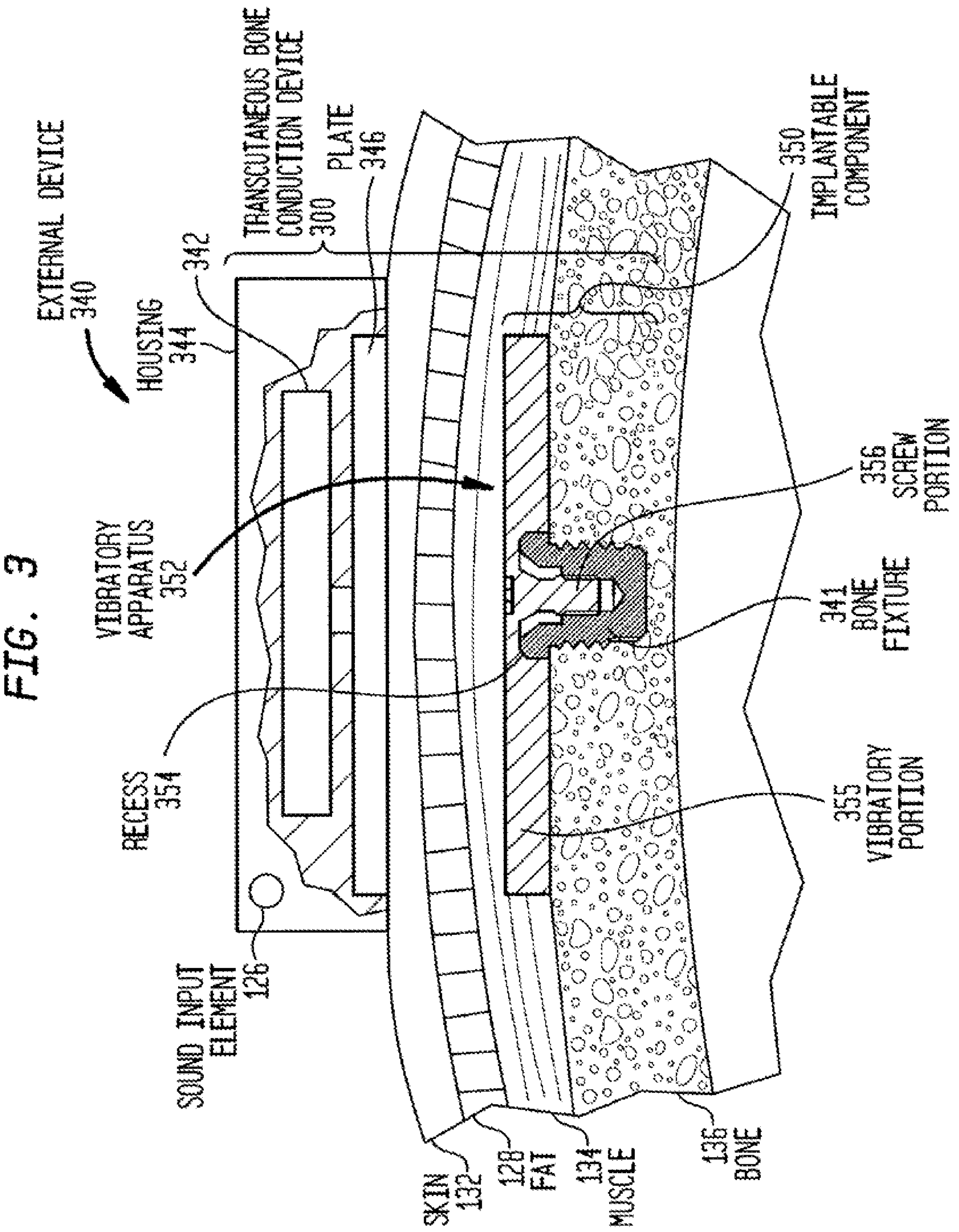
FIG. 3 is a schematic diagram conceptually illustrating a passive transcutaneous bone conduction device in accordance with at least some exemplary embodiments.

FIG. 3 depicts an exemplary embodiment of a transcutaneous bone conduction device 300 according to an embodiment that includes an external device 340 (corresponding to, for example, element 140B of FIG. 1B) and an implantable component 350 (corresponding to, for example, element 150 of FIG. 1B). The transcutaneous bone conduction device 300 of FIG. 3 is a passive transcutaneous bone conduction device in that a vibratory electromagnetic actuator 342 is located in the external device 340. Vibratory electromagnetic actuator 342 is located in housing 344 of the external component, and is coupled to plate 346. Plate 346 may be in the form of a permanent magnet and/or in another form that generates and/or is reactive to a magnetic field, or otherwise permits the establishment of magnetic attraction between the external device 340 and the implantable component 350 sufficient to hold the external device 340 against the skin of the recipient.

In an exemplary embodiment, the vibratory electromagnetic actuator 342 is a device that converts electrical signals into vibration. In operation, sound input element 126 converts sound into electrical signals. Specifically, the transcutaneous bone conduction device 300 provides these electrical signals to vibratory actuator 342, or to a sound processor (not shown) that processes the electrical signals, and then provides those processed signals to vibratory electromagnetic actuator 342. The vibratory electromagnetic actuator 342 converts the electrical signals (processed or unprocessed) into vibrations. Because vibratory electromagnetic actuator 342 is mechanically coupled to plate 346, the vibrations are transferred from the vibratory actuator 342 to plate 346. Implanted plate assembly 352 is part of the implantable component 350, and is made of a ferromagnetic material that may be in the form of a permanent magnet, that generates and/or is reactive to a magnetic field, or otherwise permits the establishment of a magnetic attraction between the external device 340 and the implantable component 350 sufficient to hold the external device 340 against the skin of the recipient. Accordingly, vibrations produced by the vibratory electromagnetic actuator 342 of the external device 340 are transferred from plate 346 across the skin to plate 355 of plate assembly 352. This can be accomplished as a result of mechanical conduction of the vibrations through the skin, resulting from the external device 340 being in direct contact with the skin and/or from the magnetic field between the two plates. These vibrations are transferred without penetrating the skin with a solid object such as an abutment as detailed herein with respect to a percutaneous bone conduction device.

As may be seen, the implanted plate assembly 352 is substantially rigidly attached to a bone fixture 341 in this embodiment. Plate screw 356 is used to secure plate assembly 352 to bone fixture 341. The portions of plate screw 356 that interface with the bone fixture 341 substantially correspond to an abutment screw discussed in some additional detail below, thus permitting plate screw 356 to readily fit into an existing bone fixture used in a percutaneous bone conduction device. In an exemplary embodiment, plate screw 356 is configured so that the same tools and procedures that are used to install and/or remove an abutment screw (described below) from bone fixture 341 can be used to install and/or remove plate screw 356 from the bone fixture 341 (and thus the plate assembly 352).

Figure 4:
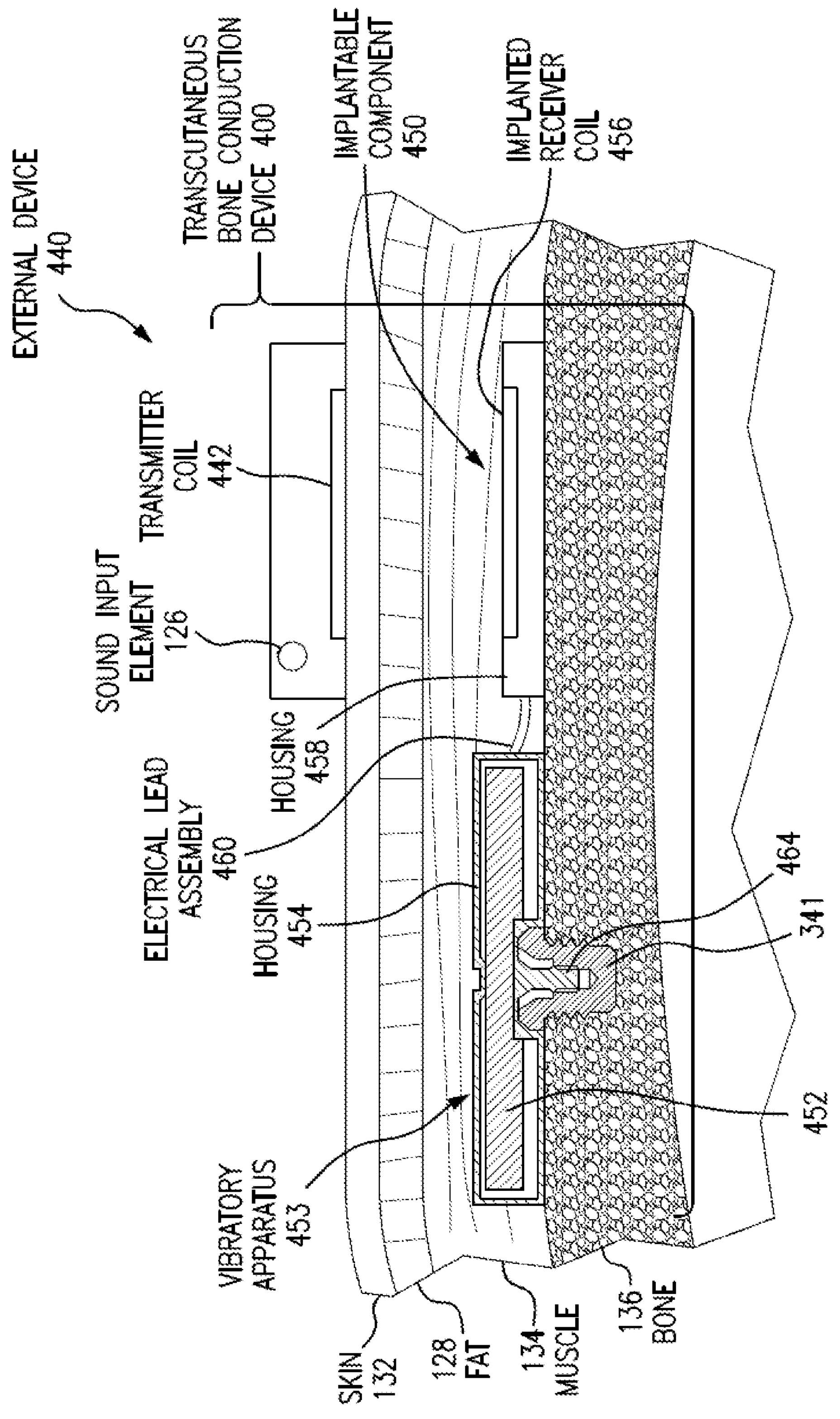
FIG. 4 is a schematic diagram conceptually illustrating an active transcutaneous bone conduction device in accordance with at least some exemplary embodiments.

FIG. 4 depicts an exemplary embodiment of a transcutaneous bone conduction device 400 according to another embodiment that includes an external device 440 (corresponding to, for example, element 140B of FIG. 1B) and an implantable component 450 (corresponding to, for example, element 150 of FIG. 1B). The transcutaneous bone conduction device 400 of FIG. 4 is an active transcutaneous bone conduction device in that the vibratory actuator 452 is located in the implantable component 450. Specifically, a vibratory element in the form of vibratory actuator 452 is located in housing 454 of the implantable component 450. In an exemplary embodiment, much like the vibratory actuator 342 described above with respect to transcutaneous bone conduction device 300, the vibratory actuator 452 is a device that converts electrical signals into vibration.

External component 440 includes a sound input element 126 that converts sound into electrical signals. Specifically, the transcutaneous bone conduction device 400 provides these electrical signals to vibratory electromagnetic actuator 452, or to a sound processor (not shown) that processes the electrical signals, and then provides those processed signals to the implantable component 450 through the skin of the recipient via a magnetic inductance link. In this regard, a transmitter coil 442 of the external component 440 transmits these signals to implanted receiver coil 456 located in housing 458 of the implantable component 450. Components (not shown) in the housing 458, such as, for example, a signal generator or an implanted sound processor, then generate electrical signals to be delivered to vibratory actuator 452 via electrical lead assembly 460. The vibratory electromagnetic actuator 452 converts the electrical signals into vibrations.

The vibratory electromagnetic actuator 452 is mechanically coupled to the housing 454. Housing 454 and vibratory actuator 452 collectively form a vibratory element 453. The housing 454 is substantially rigidly attached to bone fixture 341.

Some exemplary features of the vibratory electromagnetic actuator usable in some embodiments of the bone conduction devices detailed herein and/or variations thereof will now be described in terms of a vibratory electromagnetic actuator used in the context of the percutaneous bone conduction device of FIG. 1A. It is noted that any and/or all of these features and/or variations thereof may be utilized in transcutaneous bone conduction devices such as those of FIGS. 1B, 3, and 4 and/or other types of prostheses and/or medical devices and/or other devices, at least with respect to enabling utilitarian performance thereof. It is also noted that while the embodiments detailed herein are detailed with respect to an electromagnetic actuator, the teachings associated therewith are equally applicable to electromagnetic transducers that receive vibrations and output a signal indicative of the vibrations, at least unless otherwise noted. In this regard, it is noted that use of the term actuator herein also corresponds to transducer, and vice versa, unless otherwise noted.

In some embodiments, the actuator is a piezo bender based actuator. The following focuses on a piezoelectric transducer. However, it is noted that the teachings detailed herein can also be applicable to other types of transducers, such as an electromagnetic transducer.

The functional part of some active transcutaneous bone conduction device is a piezo bender on which counter masses are attached on both ends (additional details of this are presented below). The bender is centrally clamped with the aim to transfer the forces—generated by the piezo-mass assembly to this central attachment point. During normal operation, the masses move up and down with micro-displacements. However, if shock occurs to this combination, in some instances, this could be bad. For example, the inertia of the masses can make the piezo bender over-stressed and potentially can fail, for example, at or near the central clamp.

Figure 5A:
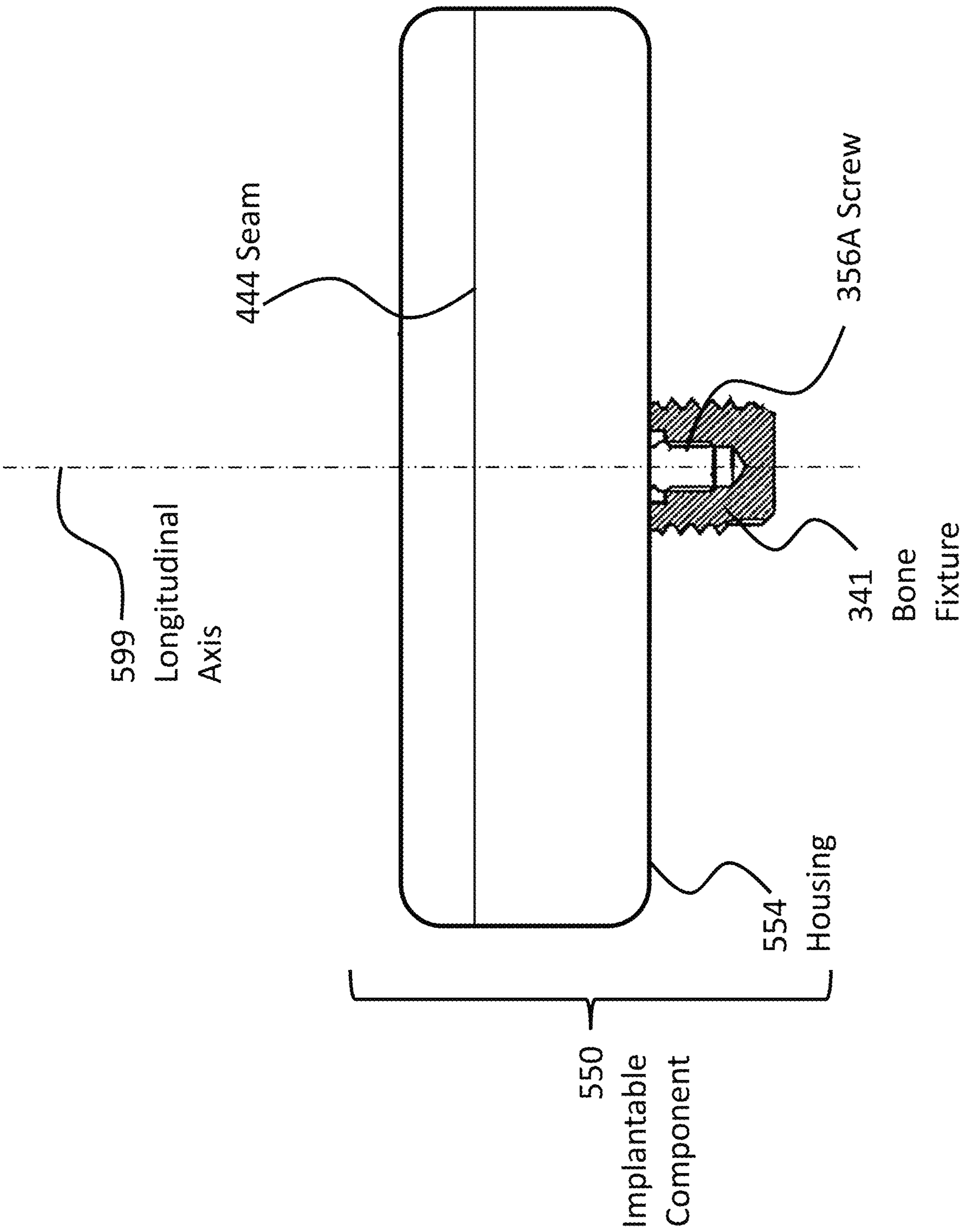
FIG. 5A is a side view of an exemplary embodiment of an implantable subcomponent.
Figure 5B:
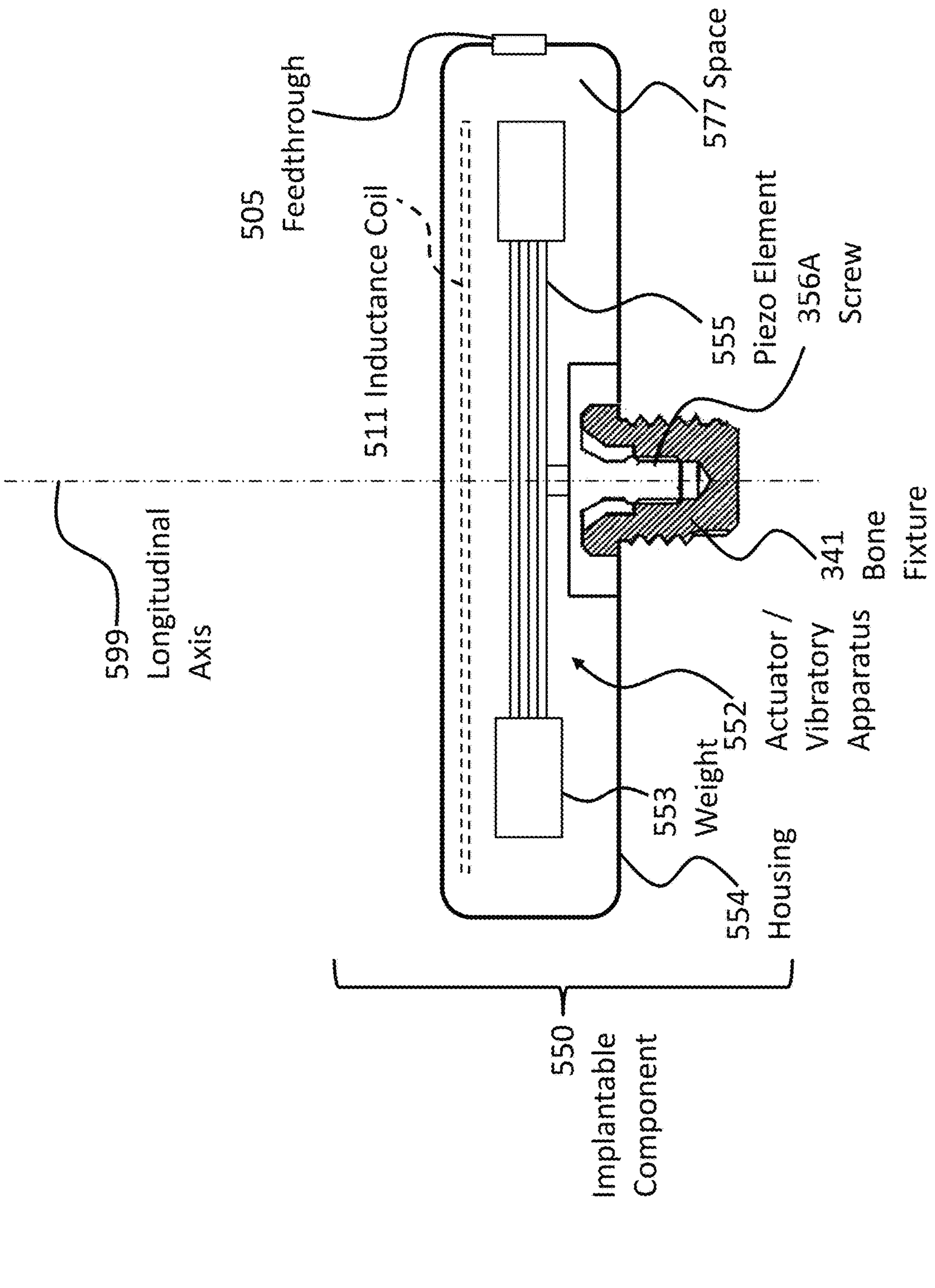
FIG. 5B is a cross-sectional view of the embodiment of FIG. 5A.

FIGS. 5A and 5B depict another exemplary embodiment of an implantable component usable in an active transcutaneous bone conduction device, here, implantable component 550. FIG. 5A depicts a side view of the implantable component 550 which includes housing 554 which entails two housing bodies made of titanium in an exemplary embodiment, welded together at seam 444 to form a hermetically sealed housing. FIG. 5B depicts a cross-sectional view of the implantable component 550.

In an exemplary embodiment, the implantable component 550 is used in the embodiment of FIG. 4 in place of implantable component 450. As can be seen, implantable component 550 combines an actuator 552 (corresponding with respect to functionality to actuator 452 detailed above) and, optionally, an inductance coil 511 (corresponding to coil 456 detailed above). Briefly, it is noted that the vibrating actuator 552 includes a so-called counterweight/mass 553 that is supported by piezoelectric components 555. In the exemplary embodiment of FIG. 5A, the piezoelectric components 555 flex upon the exposure of an electrical current thereto, thus moving the counterweight 553. In an exemplary embodiment, this movement creates vibrations that are ultimately transferred to the recipient to evoke a hearing percept. Note that in some other embodiments, consistent with the embodiment of FIG. 4, the coil is located outside of the housing 553, and is in communication therewith via a feedthrough or the like. Any disclosure herein associated with one corresponds to a disclosure associated with the other, unless otherwise noted.

As can be understood from the schematic of FIG. 5B, in an exemplary embodiment, the housing 554 entirely and completely encompasses the vibratory apparatus 552, but includes feedthrough 505, so as to permit the electrical lead assembly 460 to communicate with the vibrating actuator 452 therein. It is briefly noted at this time that some and/or all of the components of the embodiment of FIG. 5 are at least generally rotationally symmetric about the longitudinal axis 559. In this regard, the screw 356A is circular about the longitudinal axis 559. Back lines have been omitted for purposes of clarity in some instances.

Figure 6:
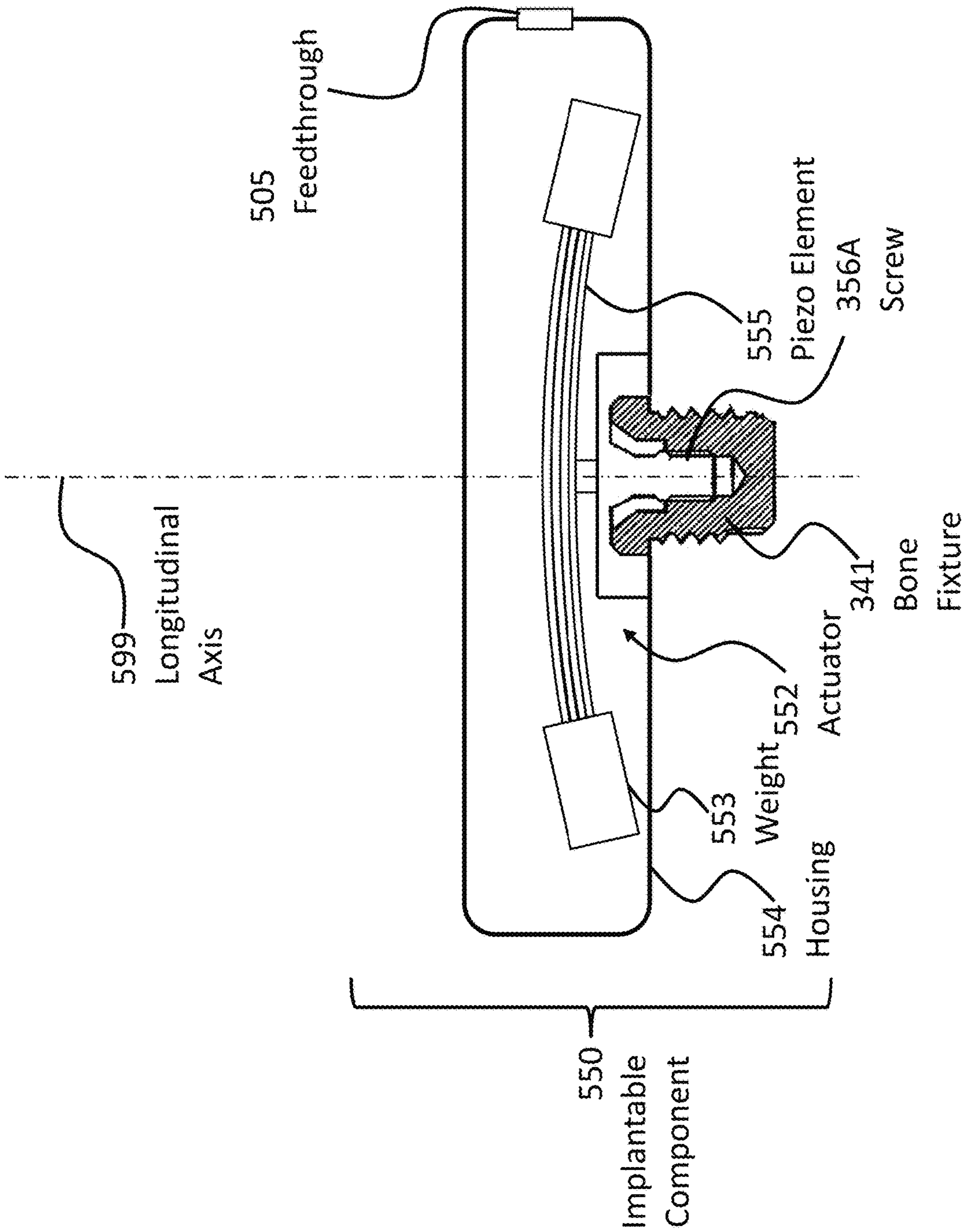
FIG. 6 is a schematic diagram of a cross-section of the exemplary implantable component of FIG. 5B in operation.

Still with reference to FIG. 5B, as can be seen, there is a space 577 (sometimes referred to herein as a gap) located between the housing 554 in general, and the inside wall thereof in particular, and the counterweight 553. This space/gap has utilitarian value with respect to enabling the implantable component 550 to function as a transducer in that, in a scenario where the implantable component is an actuator, the piezoelectric material 555 can flex, which can enable the counterweight 553 to move within the housing 554 so as to generate vibrations to evoke a hearing percept. FIG. 6 depicts an exemplary scenario of movement (exaggerated) of the piezoelectric material 555 when subjected to an electrical current along with the movement of the counterweight 553. As can be seen, space 577 provides for the movement of the actuator 552 within housing 554 so that the counterweight 553 does not come into contact with the inside wall of the housing 554. However, the inventors of the present application have identified a failure mode associated with such an implantable component 550. Specifically, in a scenario where prior to the attachment of the housing 554 and the components therein to the bone fixture 341, the housing and the components therein are subjected to an acceleration above certain amounts and/or a deceleration above certain amounts, the piezoelectric material 555 will be bent or otherwise deformed beyond its operational limits, which can, in some instances, have a deleterious effect on the piezoelectric material.

At times the transducer may be subjected to a sudden increase or decrease in velocity resulting from, for example, a shock or blow to the component and/or to the recipient. When this occurs, the transducer can experience a rapid acceleration or deceleration and thus experience, in at least some instances, an impulse force. Such an impulse force may be sufficient to damage the transducer.

Figure 7:
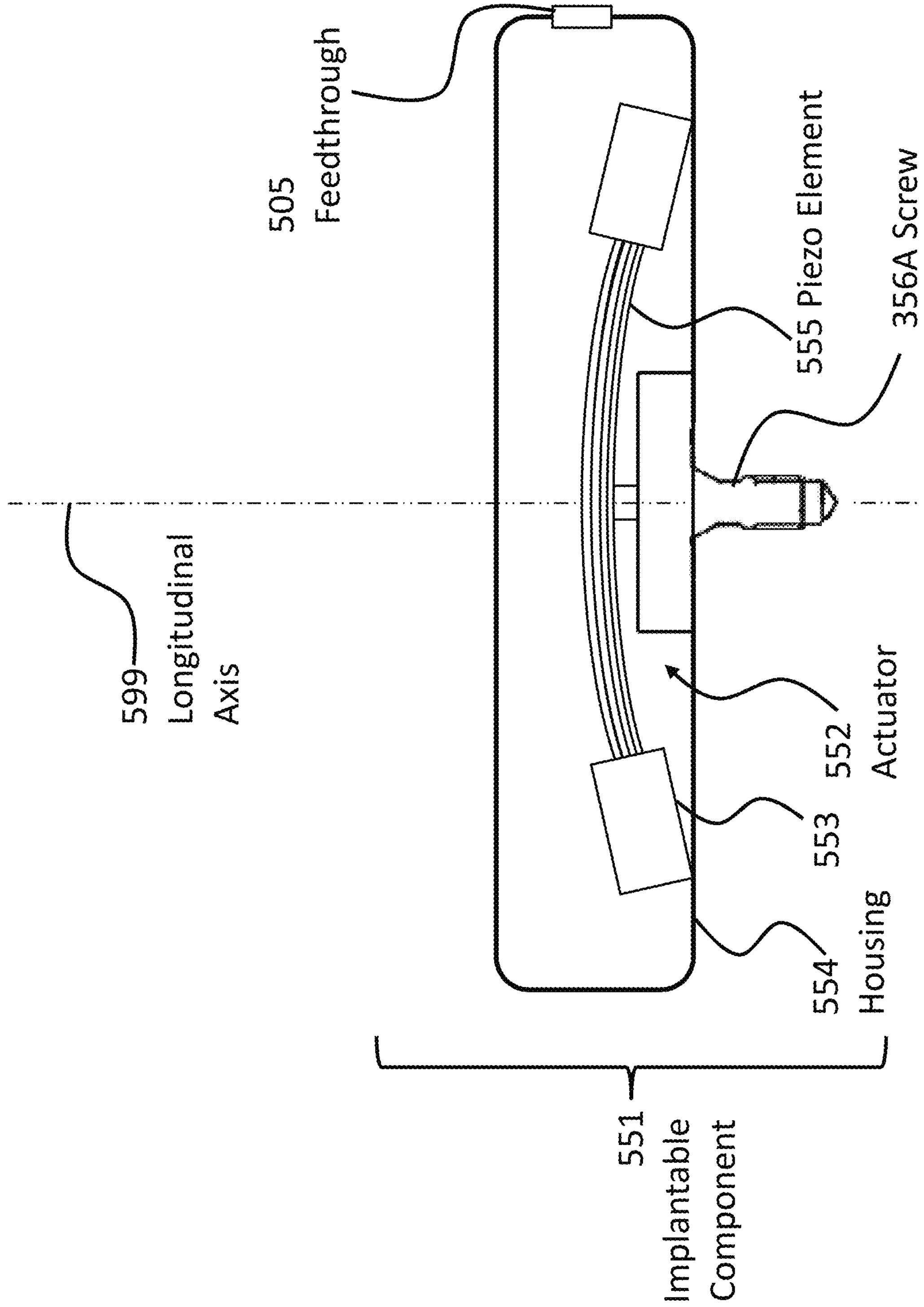
FIG. 7 is a schematic diagram of a cross-section of the exemplary implantable component of FIG. 5 in a failure mode.

FIG. 7 depicts an exemplary failure mode, where implantable subcomponent 551 (without bone fixture 541) prior to implantation into a recipient (and thus prior to attachment to the bone fixture 541) is dropped from a height of, for example, 30 cm, or from 1.2 meters, etc., onto a standard operating room floor or the like. The resulting deceleration causes the piezoelectric material 555, which is connected to the counterweight 553, to deform as seen in FIG. 7. This can break or otherwise plastically deform the piezoelectric material 555 (irrespective of whether the counterweight 553 contacts the housing walls, in some embodiments—indeed, in many embodiments, the piezoelectric material 555 will fail prior to the counterweights contacting the walls—thus, FIG. 7 is presented for purposes of conceptual illustration). The teachings detailed herein are directed towards avoiding such a scenario when associated with such decelerations and/or accelerations.

Again, it is noted that while much of the disclosure herein is directed to a piezoelectric transducer, the teachings herein can also be applicable to an electromagnetic transducer. Thus, any disclosure associated with one corresponds to a disclosure of such for the other, and vice versa. Moreover, any disclosure herein associated with one or both of these transducers also corresponds to a disclosure for application of these teachings to another type of transducer. To be clear, in at least some exemplary embodiments, any of the teachings detailed herein with respect to damping or otherwise shock proofing can be applicable to any device, system, and/or method that has one moving component that moves relative to another moving component, where one or both of those components could become damaged or otherwise experience a failure mode owing to such movement.

Still further, it is noted that in at least some exemplary embodiments of a transcutaneous bone conduction device utilizing a piezoelectric actuator, it may not necessarily be the case that FIG. 7 represents a scenario that results in, all the time, a failure mode. That is, in some embodiments, the scenario depicted in FIG. 7 does not result in a failure mode for all types of piezoelectric actuators. In at least some exemplary embodiments, it is the "bounce back" from the initial deflection and the momentum that carries the piezoelectric material past the at rest position in the other direction that causes a failure mode. That is, by way of example only and not by way of limitation, there can be, in some scenarios, a reaction such that after the piezoelectric material 555 is deformed as depicted in FIG. 7 (or, in some instances, approximately thereabouts, or, in some instances, more than that which usually results from activation of the transducer in even extreme operational scenarios), the piezoelectric material deforms oppositely towards its at rest position, but owing to the fact that it was deformed a substantial amount as depicted in FIG. 7 (or as just described), as the piezo material springs/bounces back to the "at rest" position, the counterweights 553 have momentum which causes the piezoelectric material to deform in the opposite direction, as depicted by way of example in FIG. 8. In fact, in some instances, even though the counterweights 553 specifically, or the piezoelectric actuator in general, do not contact the inside of the housing 554, as was the case in FIG. 7, this "flapping" can cause the piezoelectric material 555 to break or otherwise permanently deform in a manner that does not have utilitarian value. To be clear, this phenomenon can also be the case with respect to the scenario FIG. 7, except where the counterweight 553 did not contact the inside the housing 554. That is, in at least some exemplary embodiments, the flapping can cause permanent damage to the piezoelectric material 555 irrespective of whether or not the counterweights 553 or other components of the piezoelectric actuator contact the housing. In at least some exemplary embodiments of the teachings detailed herein and/or variations thereof, this permanent damage is prevented from occurring, or otherwise the likelihood of such permanent damage is reduced, some exemplary embodiments of achieving such prevention and/or reduction will now be described.

In some embodiments, due to the configuration of the prosthesis, impulse forces which are more likely to cause damage to the transducer can be, in some instances, those forces which have a vector component that is parallel to the vibration axis (e.g., with respect to FIG. 9A, axis 310, as will be described in greater detail below) because the transducer is provided freedom of movement along that axis.

Exemplary embodiments include impulse force damper(s) disposed between a component of the transducer (or, in some embodiments, the transducer-seismic mass assembly—more on this below). Impulse force damper assemblies, in at least some exemplary embodiments, fills the space/gap between the mass and the housing, while in other embodiments, are present in the gap but do not fill the space. In some embodiments, impulse force dampers substantially absorb impulse forces created by physical movement of transducer along the vibration axis.

Figure 9A:
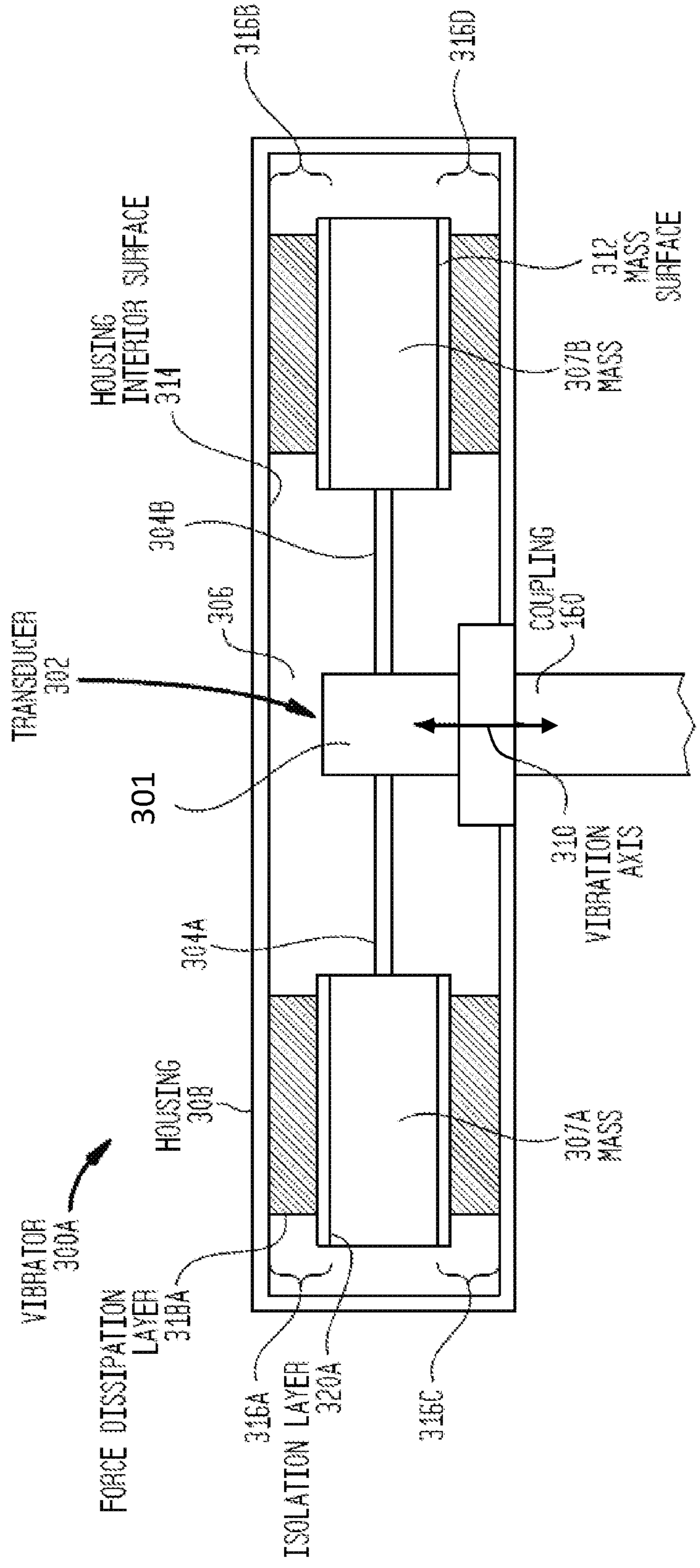
FIGS. 9A-9D are cross-sectional schematic diagrams according to an exemplary way of utilizing damper assemblies.

Referring to FIG. 9A, vibrator 300A has a transducer 302 supported by a support 301 which is mechanically fixed to the wall of the housing 308. The transducer 302 includes a piezoelectric component that includes sides 304A, 304B, respectively (which collectively correspond to piezoelectric component 555 detailed above), where masses 307A, 307B are supported by the piezoelectric component in general, and the sides 304A and 304B respectively. In some embodiments, the interior of the housing 308 is filled with an inert gas 306. In an exemplary embodiment, the interior of the housing 308 is filled with argon.

Each mass 307 is formed of material such as tungsten, tungsten alloy, brass, etc., and may have a variety of shapes. Additionally, the shape, size, configuration, orientation, etc., of each mass 307A and 307B can be selected to increase the transmission of the mechanical force from piezoelectric transducer 302 to the recipient's skull and to provide a utilitarian frequency response of the transducer. In certain embodiments, the size and shape of each mass 307A and 307B is chosen to ensure that there is utilitarian mechanical force is generated and to provide a utilitarian response of the transducer 302.

In specific embodiments, masses 307A and 307B have a weight between approximately 1 g and approximately 50 g (individually). Furthermore, the material forming masses 307 can have a density, e.g., between approximately 2000 kg/m3 and approximately 22000 kg/m3. As shown, the vibrator includes a coupling 160 which is presented in generic terms. In some embodiments, the coupling is a coupling that connects to a bone fixture, while in other embodiments the coupling is a coupling that connects to a skin interface pad that abuts the skin of the recipient.

Transducer 302 is suspended in housing 308 such that there is a distance between the housing 308 and the masses, which enables vibration of transducer 302 in vibration axis 310. In the embodiment illustrated in FIG. 9A, impulse force damper assemblies 316A-D are disposed between housing interior surface 314 and the adjacent surfaces 312 of masses 307 to substantially fill the respective distances between housing interior surface 314 and juxtaposed mass surface 312. In at least some embodiments, impulse force damper assemblies 316A-D limit or otherwise prevent a rapid acceleration and deceleration of masses 307A and B. Such movement may cause a significant impulse force to be applied to piezoelectric component. For ease of description, impulse force damper assembly 316A will be described below. With the exceptions noted below, the description of impulse force damper assembly 316A applies to impulse force dampers assemblies 316B-D.

In certain embodiments, impulse force damper assembly 316A includes at least two layers, an elastic force dissipation layer 318A and an isolation layer 320A. Force dissipation layer 318A substantially dissipates the kinetic energy in the moving mass 307A thereby preventing the mass from experiencing sudden acceleration or deceleration which would cause the piezoelectric component to experience a potentially damaging impulse force. Isolation layer 320A is disposed between force dissipation layer 318A and transducer mass 307A. In some embodiments, isolation layer 320A is formed from a silicone elastomer. In the same or other embodiments, force dissipation layer 318A is substantially elastic shock absorbing layer formed of a soft and elastic material such as a cured liquid silicone rubber material. As noted, force dissipation layer 318A deforms as mass 307A travels toward the housing. This deformation absorbs energy, causing a decrease in the rate at which the transducer travels and limits the amount of force transmitted to the piezoelectric elements or the mass elements. In some embodiments, frequency response and output of vibrator 900A is maintained because housing 308 and mass 307 are decoupled and prevented from adhering to each other. For example, as shown in the exemplary embodiment of FIG. 9A, the isolation layer 320A disposed between the force dissipation layer 318A and the housing interior surface 314 decouples mass 307A from housing 308 and prevents mass 307A from adhering to housing 308.

Force dissipation layer 318A is formed of material(s) configured to exhibit sufficiently low stiffness and/or sufficient elasticity so as to flex or deform in response to a compressive force caused by transducer mass 307A traveling toward housing surface 314, thereby reducing the rate at which the distance between the masses and the housing decreases. Elastic materials strain when stretched and return to their original state relatively quickly once the stress is removed. In certain embodiments, force dissipation layer 318A is an elastic material made from one or more of a soft silicone type material, a foam material, and/or a rubber material.

Thus, exemplary impulse force damper assembly 316A is configured to achieve impulse force dissipation through a combination of deformation of an elastic material exhibiting sufficiently low stiffness and shear damping via substantial gross slip along the interface where a surface of impulse force damper assembly 316A abuts an adjacent layer or surface. In one embodiment, impulse force dissipation layer 318A comprises a cured liquid silicone rubber.

Isolation layer 320A is disposed between force dissipation layer 318A and mass 307A to prevent adhesion of the force dissipation layer to mass surface 312. Isolation layer 320A can be configured to achieve this by preventing adhesion between itself and mass 307A. In some embodiments, the force dissipation and isolation layers are configured to exhibit substantially no adhesion between each other.

Impulse force damper assembly 316A comprises a relatively thin isolation layer 320A and a relatively thick impulse force dissipation layer 318A. It should be appreciated that the absolute and relative thicknesses of force dissipation layer 318A and isolation layer 320A depicted in FIG. 9A is for ease of illustration, and is not intended to illustrate specific or relative dimensions. In certain embodiments, isolation layer 320A has a thickness between 0.1 mm and 0.6 mm and impulse force damper assembly 316A has an overall thickness of between 0.5 mm and 10 mm. Force dissipation layer 318A can have a thickness of between 0.4 mm to 0.9 mm. Other size ranges, larger or smaller, than the exemplary size ranges described herein, are possible depending on the dimensions of the vibrator and the gap. In alternative embodiments, layers 320A and 318A have substantially the same thickness.

In some embodiments isolation layer 320 is a relatively thin film or sheet arranged on either side of mass components 307A and 307B and impulse force dissipation layer 318A is a relatively thicker shock absorbing/damping material arranged between isolation layers and housing 308. In certain embodiments, the isolation layer can comprise a cured silicone elastomer having a thickness of less than about 70 micrometers (μm). The force dissipation layer 318A is configured to deform laterally with respect to a surface of the transducer (such as a surface 312 of mass component 307) and an opposing surface 314 of housing 308 in order to dissipate an impulse force applied to the vibrator. In embodiments, impulse force dissipation layer 318A can comprise a cured silicone rubber.

In certain embodiments, isolation layer 320A comprises a material having one of more of the following: an American Society for Testing and Materials (ASTM) technical standard D2240 Durometer Type A scale value of about 50; a Tensile Strength of about 1450 psi (pounds per square inch); an Elongation of about 1000%; a Tear Strength (Die B) of about 250 ppi (pounds per inch); a Stress at 200% Strain of about 300 psi; and a Specific Gravity of about 1.16. A commercially available example of such a material is Model No. MED 49-01 (a type of silicone elastomer) manufactured by NUSIL® Technology, LLC, in a cured state, which is available in sheets of about 0.002 inches thick.

In certain embodiments, impulse force dissipation layer 318A comprises a material having one of more of the following: an ASTM technical standard D2240 Durometer Type 00 scale value less than or equal to about 40; a Tensile Strength of about 325 psi; an Elongation of about 1075%; a Tear Strength of about 60 ppi; a Stress at 100% Strain of about 10 psi; a Stress at 300% Strain of about 30 psi; and a Stress at 500% Strain of about 65 psi. A commercially available example of such a material is Model No MED 82-50 1 0-02 (a type of liquid silicone rubber) manufactured by NUSIL® Technology, LLC, in a cured state.

Thus, in the embodiment of FIG. 9A, impulse force dissipation layer 318A is configured to exhibit non-negligible adhesion to housing surface 314 and substantially no adhesion to isolation layer 320A. This enables impulse force damper 316A to dissipate energy through a combination of deformation and shear damping along the interface between with isolation layer 320A. Shear damping refers to the lateral sliding or slipping of the layers 318A and 320A, which is possible due to lack of adhesion between the layers.

In certain embodiments, isolation layer 320A is configured to exhibit substantially no adhesion with respect to an adjacent surface of impulse force dissipation layer 318A so as to allow gross slip via at least some shear damping along one or more of an interface between: dissipation layer 318A and isolation layer 320A. For example, isolation layer 320A can be configured to act as an anti-adhesive or lubricant with respect to dissipation layer 318A. Shear damping along an interface between dissipation layer 318A and isolation layer 320A can be explained by considering the behavior of two adjacent surfaces that are in contact with each other. A clamping force may exist between these two surfaces. Such a clamping force can result from externally applied loads, or from a mating or press fit that produces an interface common to the two parts. If an additional exciting force is gradually imposed, the two parts may initially react as a single elastic body such that there is shear on the interface, but not enough to produce relative slip at any point. As the force increases in magnitude to the extent that the force constitutes application of an impulse force, the resulting shearing traction at some places on the interface can exceed the limiting value permitted by the friction characteristics of the two mating surfaces (e.g., a surface of isolation layer 320A and an adjacent surface dissipation layer 318A). According to the embodiments described herein, isolation layer 320A of impulse force damper assembly 316A exhibits substantially no adhesion to dissipation layer 318A such that the limiting value and shearing traction are sufficiently low so as to allow gross slip to occur along the interface where dissipation layer 318A and isolation layer 320A mate with each other. In regions where a surface of impulse force damper assembly 316A mates with mass component 307A, 307B or housing 308, microscopic slip of adjacent points on opposite sides of the interface can occur. In an alternative embodiment, there is slip between the two layers of the impulse force damper 316A. According to this embodiment, there is slip between force dissipation layer 318A and isolation layer 320A. In an exemplary embodiment, the slipped region extends substantially over the entire interface between layers 318A and 320A so that gross slip can occur. In some embodiments, slip occurs between isolation layer 320A and one of the interior housing surface 314 or the mass 307 depending on which is in contact with isolation layer 320A. Subsequent application of a tangential force can produce slip over a portion of the interface even if a peak tangential force is not great enough to affect gross slip or sliding along the interface. In certain embodiments, isolation layer 320A can comprise a relatively thin (with respect to layer 318A) foil, sheet, or film of silicone elastomer coating a surface of a portion of a transducer, such as a region or surface of mass component 307A and mass component 307B. For example, isolation layer 320A can be a cured silicone elastomer applied to mass components 307A and/or B so as to allow gross slip between impulse force dissipation layer 318A and isolation layer 320A. In some embodiments, gross slip occurs between the isolation layer 320A and the housing 308 or mass 307A and mass 307B, depending on which one the isolation layer 320A is in contact with. In an alternative embodiment, slip occurs between force dissipation layer 318A and the isolation layer 320A.

Figure 9B:
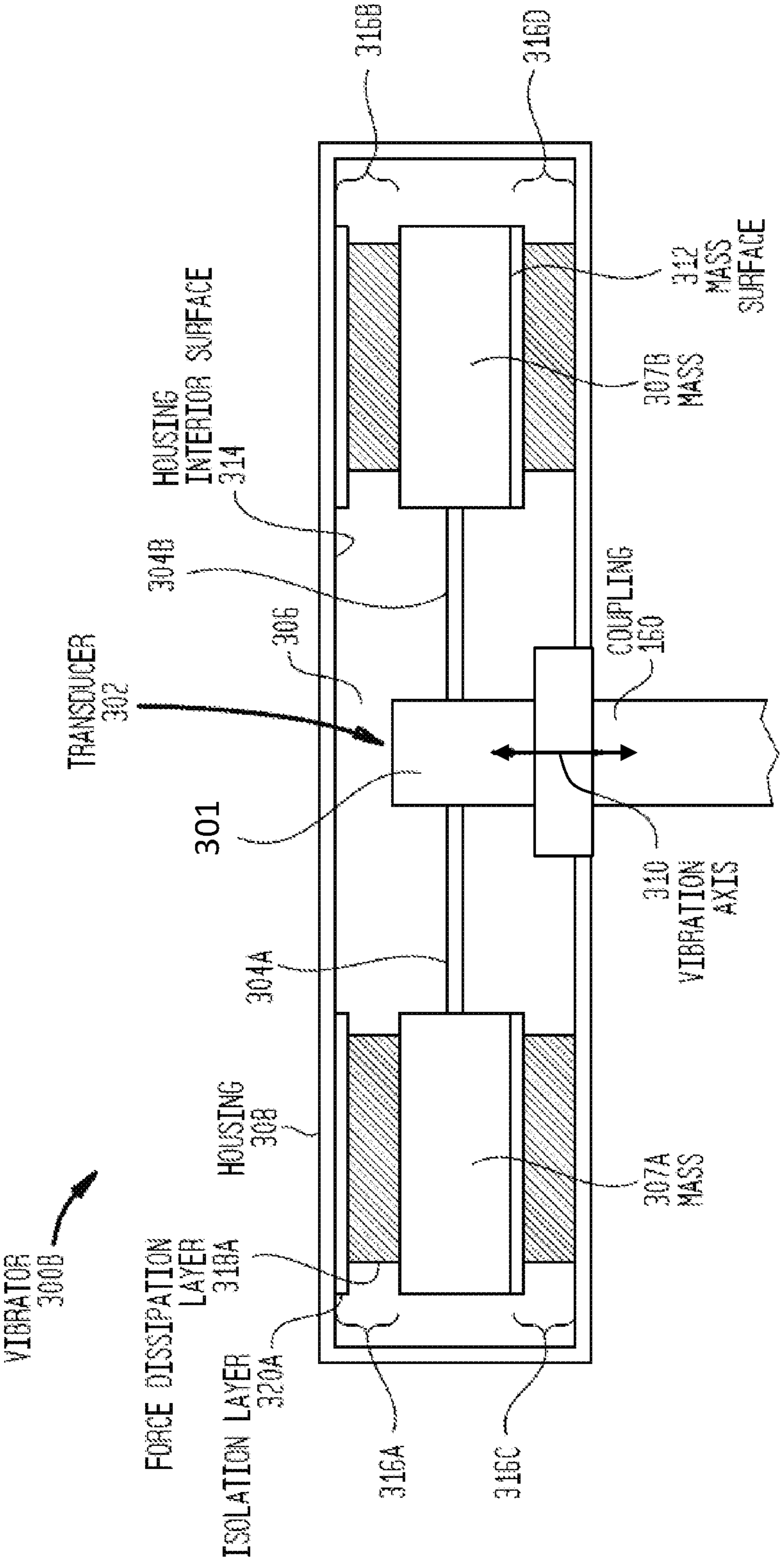
Figure 9C:
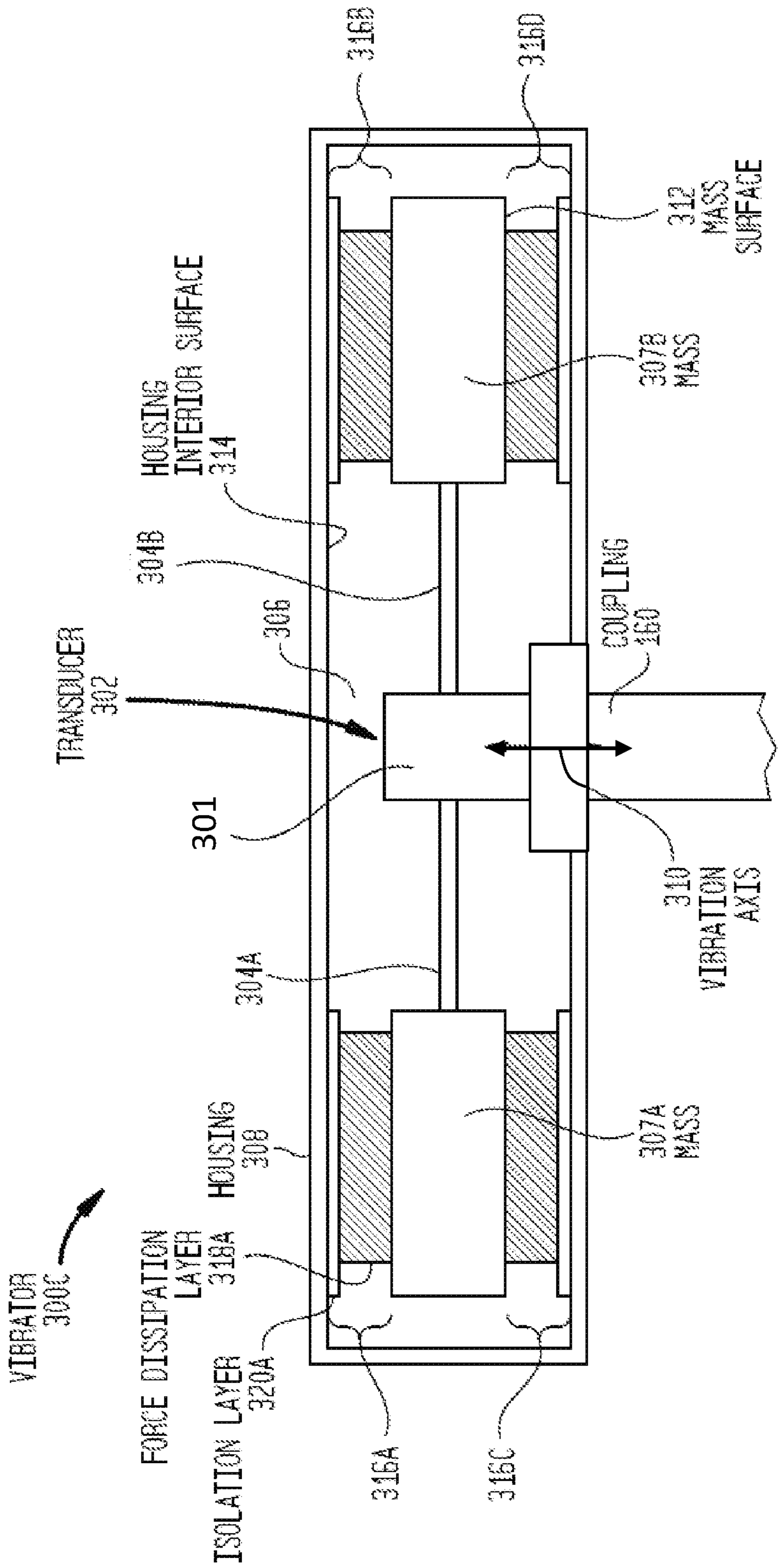
Figure 9D:
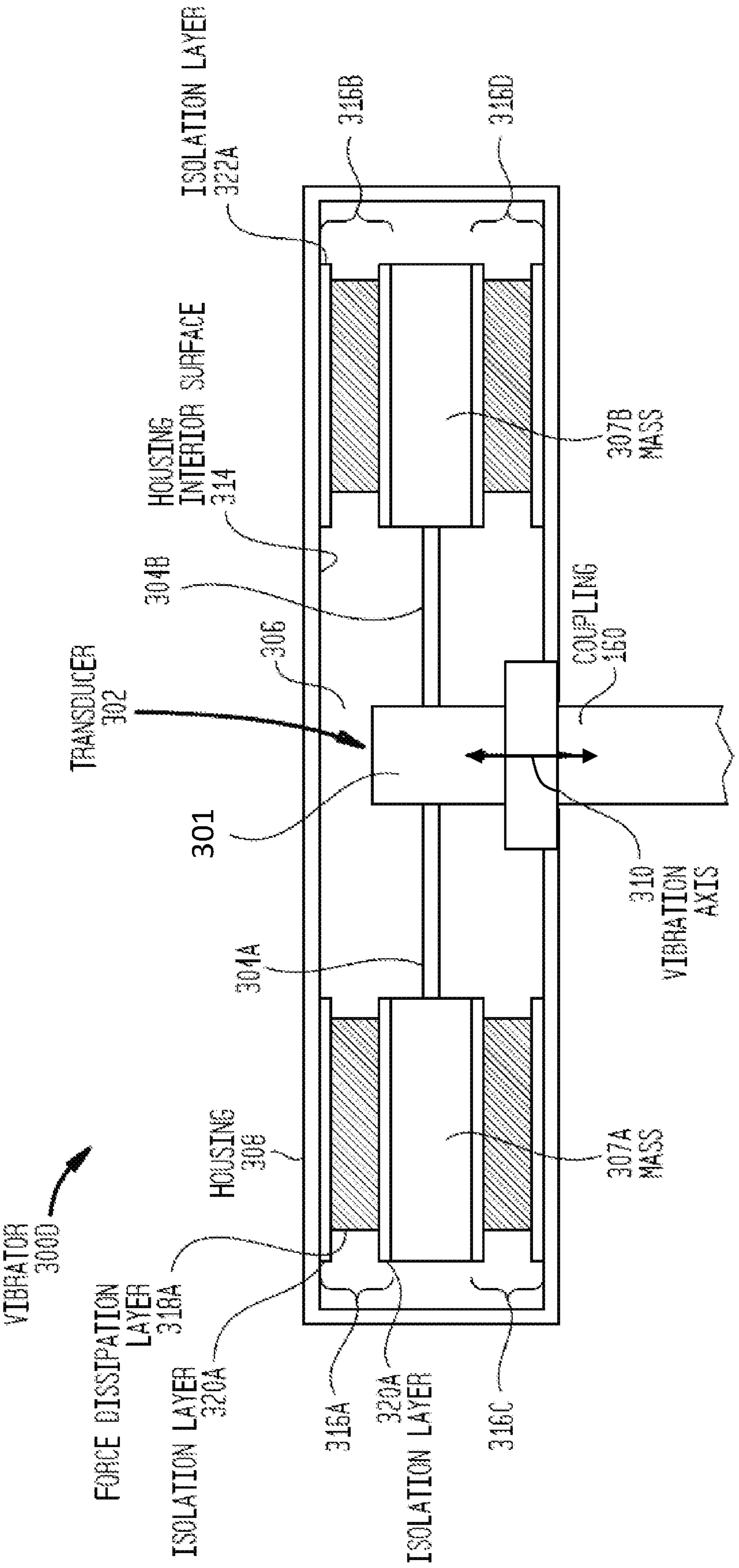

As seen in FIGS. 9A-D, embodiments of impulse force damper assemblies comprise varying arrangements of layers 320A and 318A in which isolation layer 320A is in contact with either housing surface 314 or transducer mass surface 312, and force dissipation layer 318A is in contact with the other surface. In certain embodiments, layers 320A and 318A are arranged and configured so that the layers substantially conform to manufacturing tolerances of a respective, abutting housing interior surface 314 and mass surface 312. In FIG. 9B, isolation layers 320A, 320B are applied to or interface with housing interior surfaces 314 and force dissipation layers 318A, 318B are applied to or interface with mass surfaces 312. Impulse force dampers assemblies 316C, 316D are configured as described above with reference to FIG. 3A. In FIG. 9C, all four impulse force damper assemblies 316A-D are configured the same as impulse force damper assemblies 316A, 316B of FIG. 9B. In FIG. 9D, impulse force damper assemblies 316A-D each have two isolation layers 320A applied to or interfacing with housing interior surface 314 and mass surface 312, with the respective force dissipation layer 318A disposed between the two isolation layers.

Figure 8:
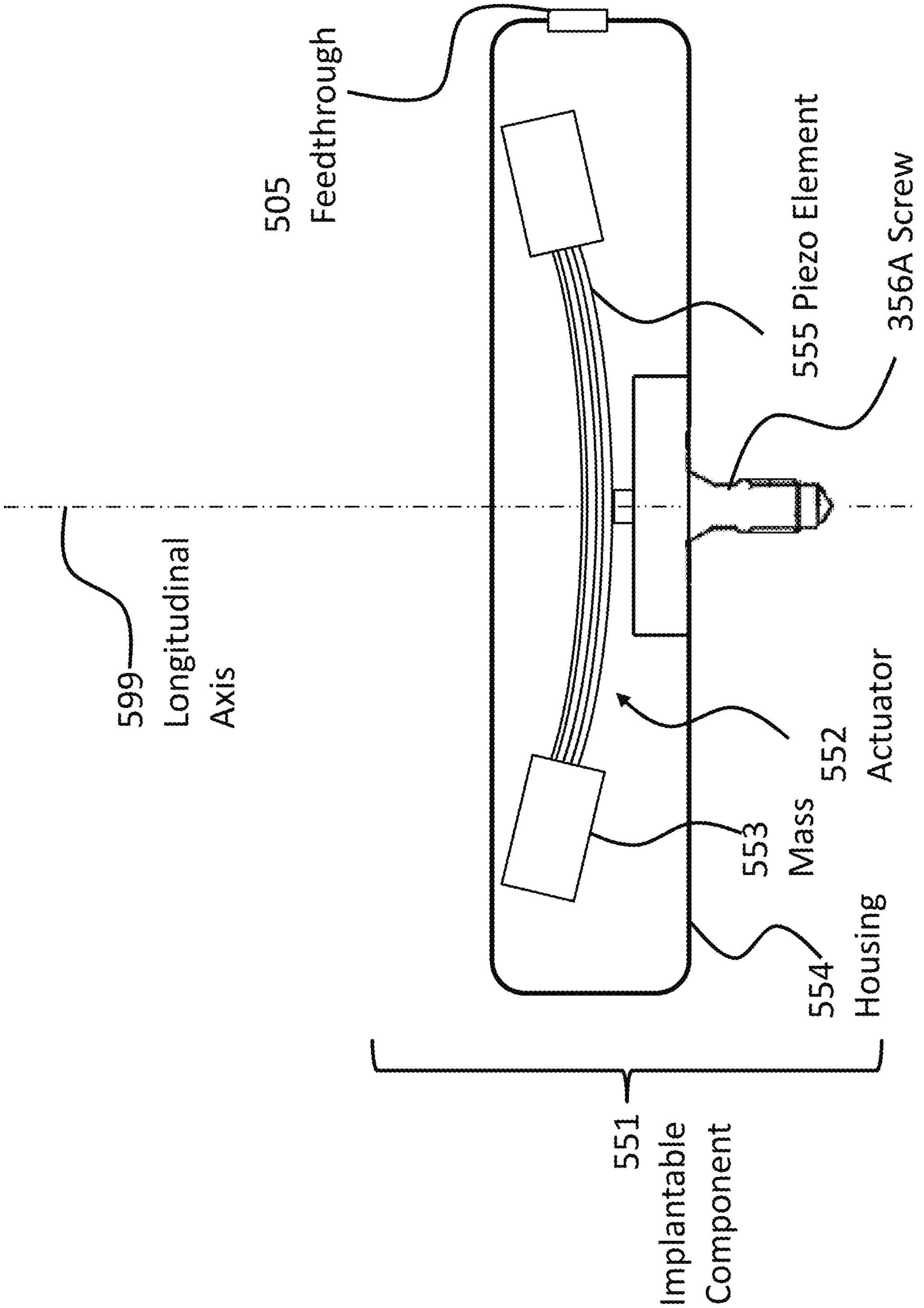
FIG. 8 is another schematic diagram of a cross-section of the exemplary implantable component of FIG. 5 in a failure mode.
Figure 9E:
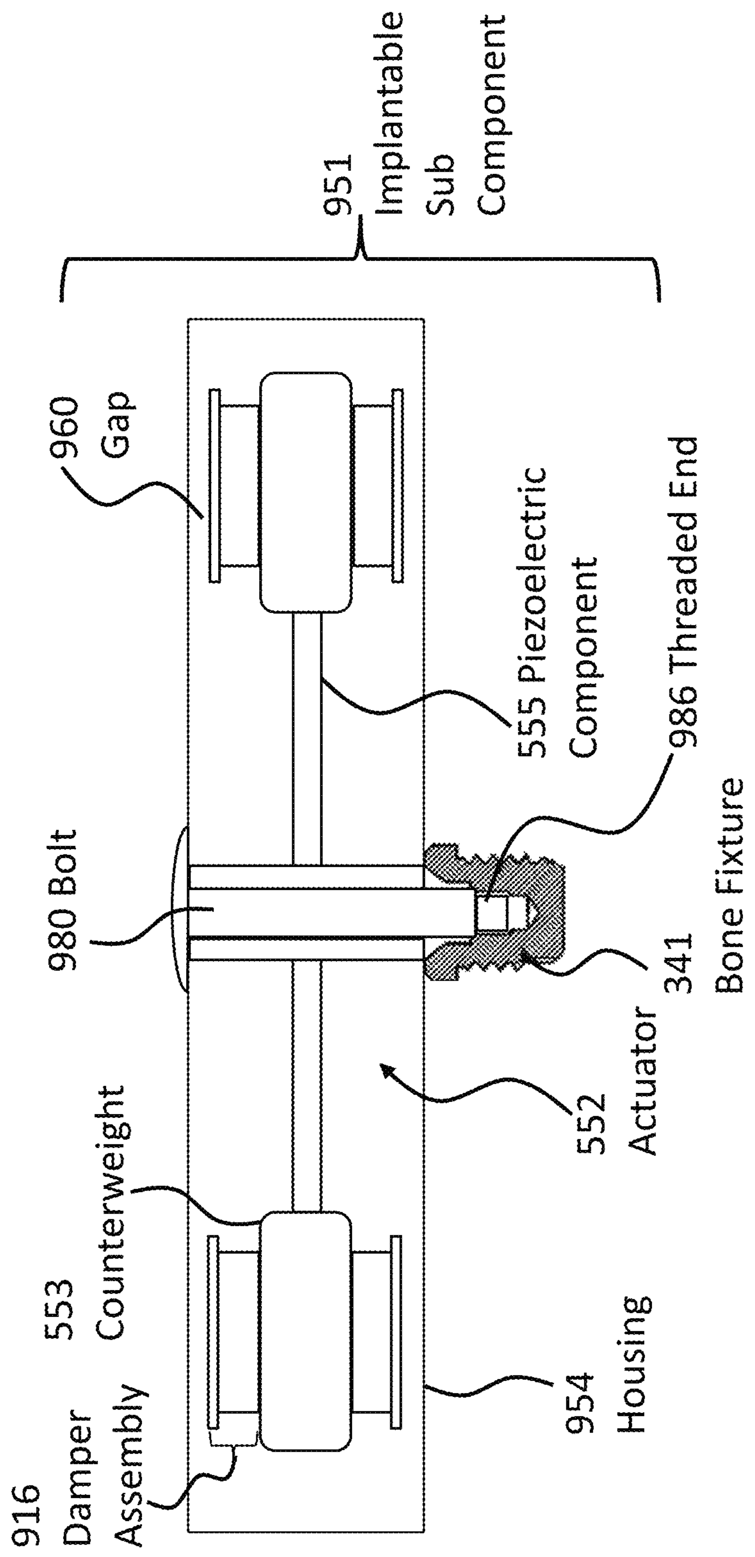
FIG. 9E is a cross-sectional schematic diagram according to another exemplary way of utilizing damper assemblies.

FIG. 9E is a variation of the embodiments of FIGS. 9A-9D, and depicts an exemplary embodiment of an exemplary implantable subcomponent 951 having utilitarian value, as is the case with the embodiments of FIGS. 9A-9D, in that such can reduce the likelihood of the occurrence of (which includes eliminate the possibility of occurrence of) the failure mode associated with that depicted in FIG. 7 and/or FIG. 8, and the variations detailed above. FIG. 9E depicts a cross-section through the geometric center of the subcomponent 951. Implantable subcomponent 951 includes a housing 954 that encases a transducer 552, which can be an actuator, which actuator includes a piezoelectric material 555 corresponding to that of FIG. 7, and a counterweight 553 that corresponds to the counterweight 553 of FIG. 7.

In the embodiment of FIG. 9E, bolt 980 extends to the bone fixture 341 and is screwed therein during attachment of the housing 954 to the already implanted bone fixture 341 so as to establish the implantable component 951. In this regard, bolt 980 includes a male threaded end 986 that threads into female threads located within bone fixture 341. This operates as an effective jackscrew to pull the head of the bolt 980 downward towards the bone fixture 341, thus driving the housing 954 onto the fixture 341, thus securing the housing to the fixture 341. It is noted that in alternate embodiments, the bolt does not extend through the housing, but instead the threaded boss is attached to the outside of the housing, as seen in FIG. 5A.

FIG. 9E also includes a damper assembly 916. As will be described in greater detail below, the damper assembly 916 also has features of an impulse force damper assembly detailed above. The damper assembly 916 in some embodiments corresponds to that detailed above with the exception that the damper assembly 916 does not span the entire distance from the counterweight to the housing, while in other embodiments, the material that makes up the damper assembly, such as the silicon, is different than that detailed above, while in still other embodiments, the damper assembly is a mixture of silicone and glass beads. Various details of this will be described below, but the point here is that the damper assembly 916 provides both damping of the transducer for certain regimes of operation but not others (all during normal operation) as well as damping as a result of an impulse force (which is not normal operation). As can be seen, in contrast to the embodiment of FIG. 9B, for example, there is a gap 960 between the damper assembly 916 and the interior of the housing 954, at least when the piezoelectric component 555 is that a static/at rest position such as that depicted in FIG. 9E. That is, in this exemplary embodiment, the damper assembly 916 does not bridge the full distance between the counterweight 553 and the interior of the housing 954. Some utilitarian features of this embodiment will be described below.

While the embodiment of FIG. 9E is directed towards the implantable component of an active transcutaneous bone conduction device, it is noted that any of the teachings detailed herein with respect to this embodiment are also applicable to a removable component of a passive transcutaneous bone conduction device and/or a removable component of a percutaneous bone conduction device and/or another type of transducer that utilizes a seismic mass or the like or another type of transducer that has a moving part or in potentially moving part where there can be utilitarian value with respect to damping and/or providing shock proofing. Accordingly, in at least some exemplary embodiments, the teachings associated with FIG. 9E are also teachings directed to a transducer of a passive transcutaneous bone conduction device, a percutaneous bone conduction device, or any other type of device that utilizes a transducer.

Figure 10:
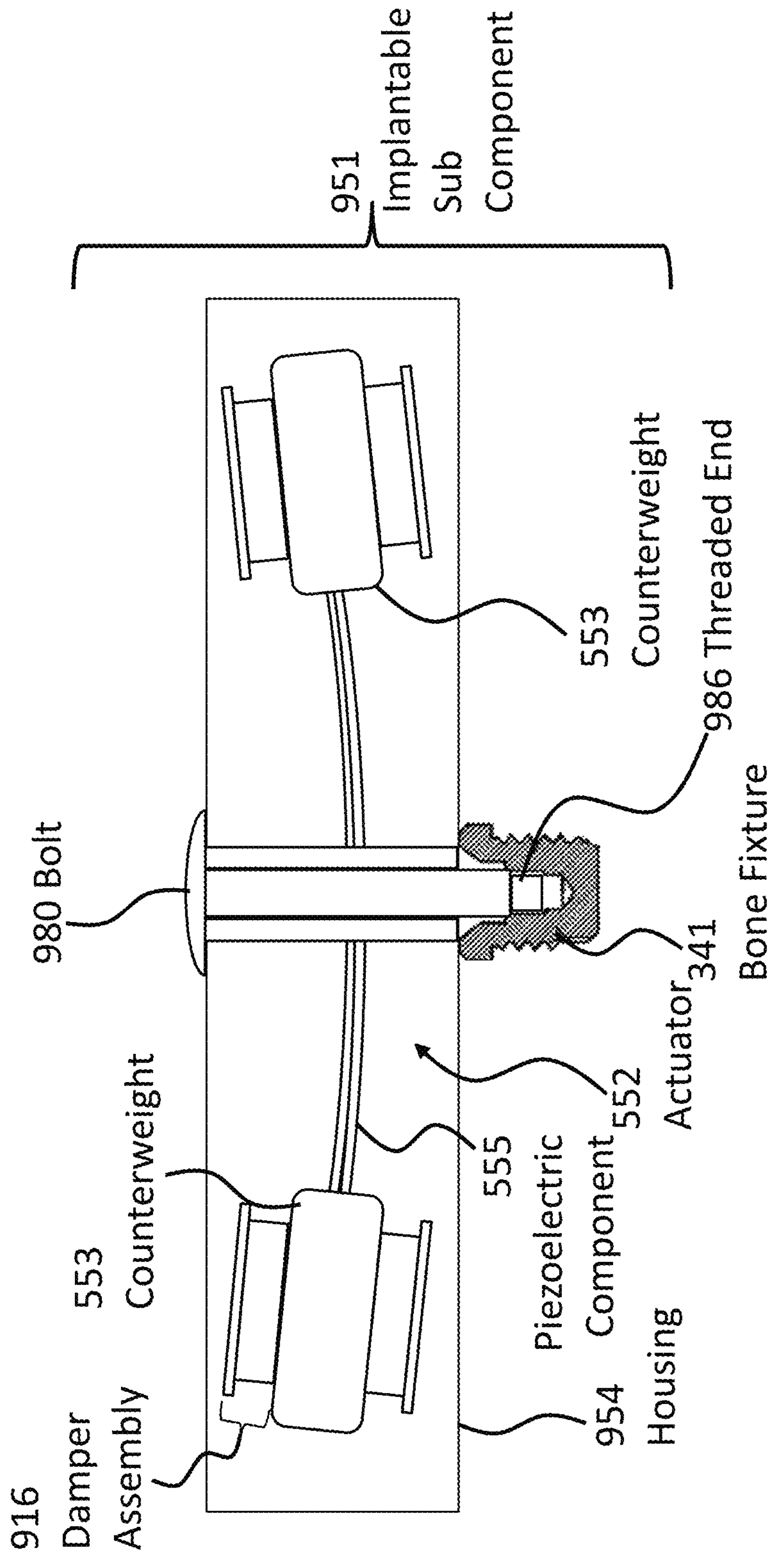
FIG. 10 is a schematic diagram of a cross-section of the exemplary implantable component of FIG. 9E in operation.

FIG. 10 depicts an exemplary scenario of utilization of the implantable subcomponent 951. As can be seen, piezoelectric component 555 is deformed upward. In this exemplary embodiment, the piezoelectric component 555 has been energized to do so by the application of a current thereto. While not depicted in FIG. 10, during operation of the implantable subcomponent 951, another current can be applied to the piezoelectric component 555 to deform the component 555 downward. Controlled application of these currents results in the deformation of the piezoelectric component upward and downward so as to output vibrations where, in an exemplary embodiment where such is utilized in hearing prostheses, such results in a bone conduction hearing percept. It is to be understood that in some alternate embodiments, the actuator 552 is instead a transducer that receives vibrations that results in the upward and downward deformation of the piezoelectric component 555, which in turn results in the output of a current.

As can be seen, with the following caveat, during normal operation of the implantable subcomponent 951, the damper assembly 916 does not come into contact with the housing 954. This is the case with respect to upward deformation and downward deformation of the piezoelectric component 555. However, in some instances, there will be contact of the damper assembly 916 with the housing 954 during normal operation where, for example, the piezoelectric component 555/implantable subcomponent 951 is operating at or near its resonant frequency. Additional details of this will be described in greater detail below. For the moment, it is noted that in at least some exemplary embodiments/scenarios of use, during normal operation, the damper assembly 916 does not come into contact with the housing 954, while in some alternate embodiments/alternate scenarios, in some limited instances the damper assembly 916 comes into contact with the housing 954, but for the most part, the layer 318 does not come into contact with the housing 954.

Figure 11:
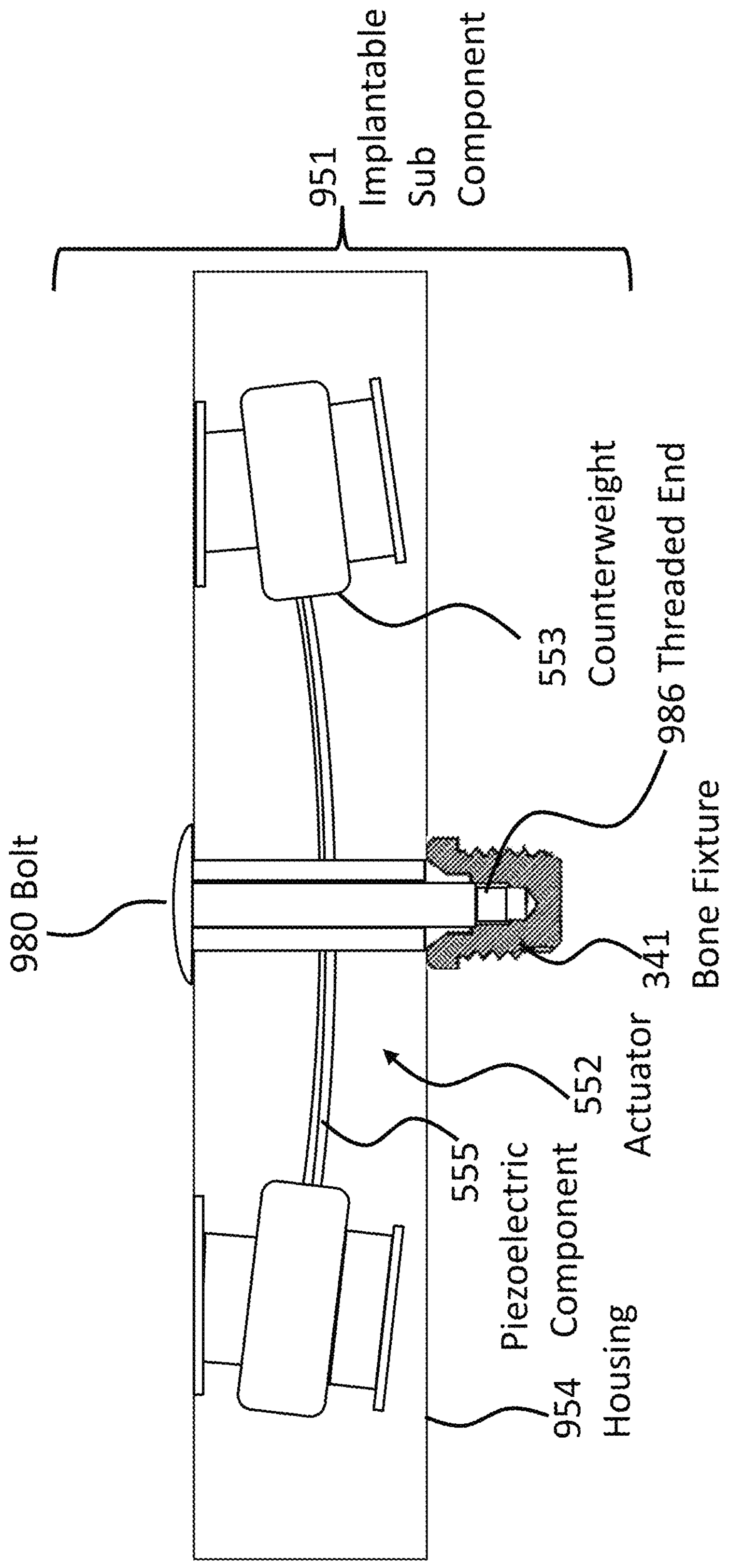
FIG. 11 is a schematic diagram of a cross-section of the exemplary implantable component of FIG. 9E vibrating at its resonance peak.

FIG. 11 depicts the scenario associated with the caveat above, where, in this exemplary embodiment, the implantable subcomponent 951 is vibrating at its resonant frequency, and thus the deformation of the piezoelectric component 555 is greater than that which would normally be the case (e.g., by way of example, for the same amount of energy input) at other frequencies. The specifics of the frequencies will be described in greater detail below. However, for the moment, it can be seen albeit in an exaggerated manner in FIG. 11, that irrespective of outside forces acting on the implantable subcomponent that would induce an acceleration of the implantable subcomponent, in some modes of operation, the piezoelectric component 555 can deform by a greater amount than that which would otherwise be the case. It is specifically noted that in the scenario FIG. 11, the implantable subcomponent 951 is only subjected to a one G environment. That is, other than the force of gravity, and the deformation resulting from current input to the piezoelectric component 555, there is absolutely no other acceleration or deceleration or other forces acting on the implantable subcomponent 951. In this regard, as can be seen, the damper assembly 916 is compressed a certain amount. This compression damps the system, and thus prevents or otherwise limits any increased output by the implantable subcomponent 951 at and around the resonance frequency thereof that would otherwise be the case in the absence of the damper assembly 916.

To be clear, in at least some exemplary embodiments, the compression depicted in FIG. 11 does not correspond to full compression of the damper assembly 916. Conversely, the compression depicted in FIG. 12, resulting from further deformation of the piezoelectric component 555, corresponds to, in an exemplary embodiment, essentially full compression of the damper assembly 916. Some of the ramifications and otherwise features thereof will be described below. The point is that with respect to the damping feature vis-à-vis the resonance frequency, in at least some exemplary embodiments, such damping does not correspond to full compression of the damper assembly 916 in general, and the force dissipation layer thereof in particular, and instead only corresponds to partial compression of the damper assembly 916, which partial compression is sufficient to damp the system.

Figure 12:
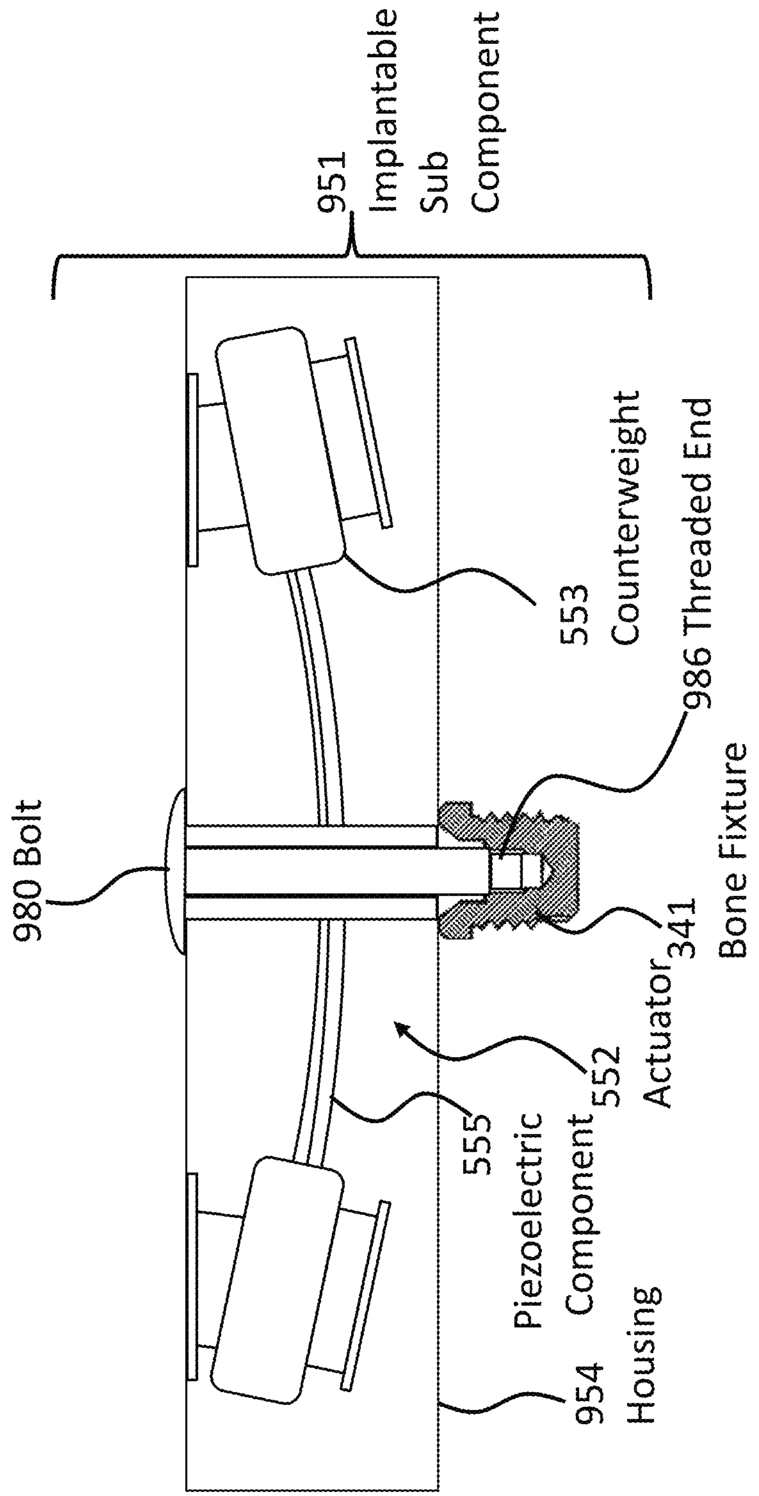
FIG. 12 is a schematic diagram of a cross-section of the exemplary implantable component of FIG. 9E experiencing an impulse force.

With respect to FIG. 12, as can be seen, the deflection is a deflection resulting from an impulse force or the like, as opposed to operation of the implantable subcomponent 951 at the resonance frequency. In an exemplary embodiment, the deflection is a result of the implantable subcomponent 951 and/or only the housing 954 with the transducer therein (e.g., in a scenario where the housing 954 is dropped onto an operating floor or the like prior to coupling thereof to the bone fixture 341) being subjected to an acceleration and/or deceleration, such as, for example, a 200 G acceleration/deceleration, which deforms the piezoelectric component 555 by an amount that can result in damage (whether that damage is a result of the deformation in one direction, or the subsequent backlash in the opposite direction, etc.).

In this exemplary embodiment, the compression of the damper assemblies 916 is sufficient to result in the damper assembly being an impulse force damper assembly akin to the operation of the impulse force damper assembly 316 detailed above. Accordingly, any of the features detailed above and/or below associated with the impulse force damper assembly 316 can also be present in at least some embodiments with respect to the damper assembly 916 when so compressed.

Figure 13:
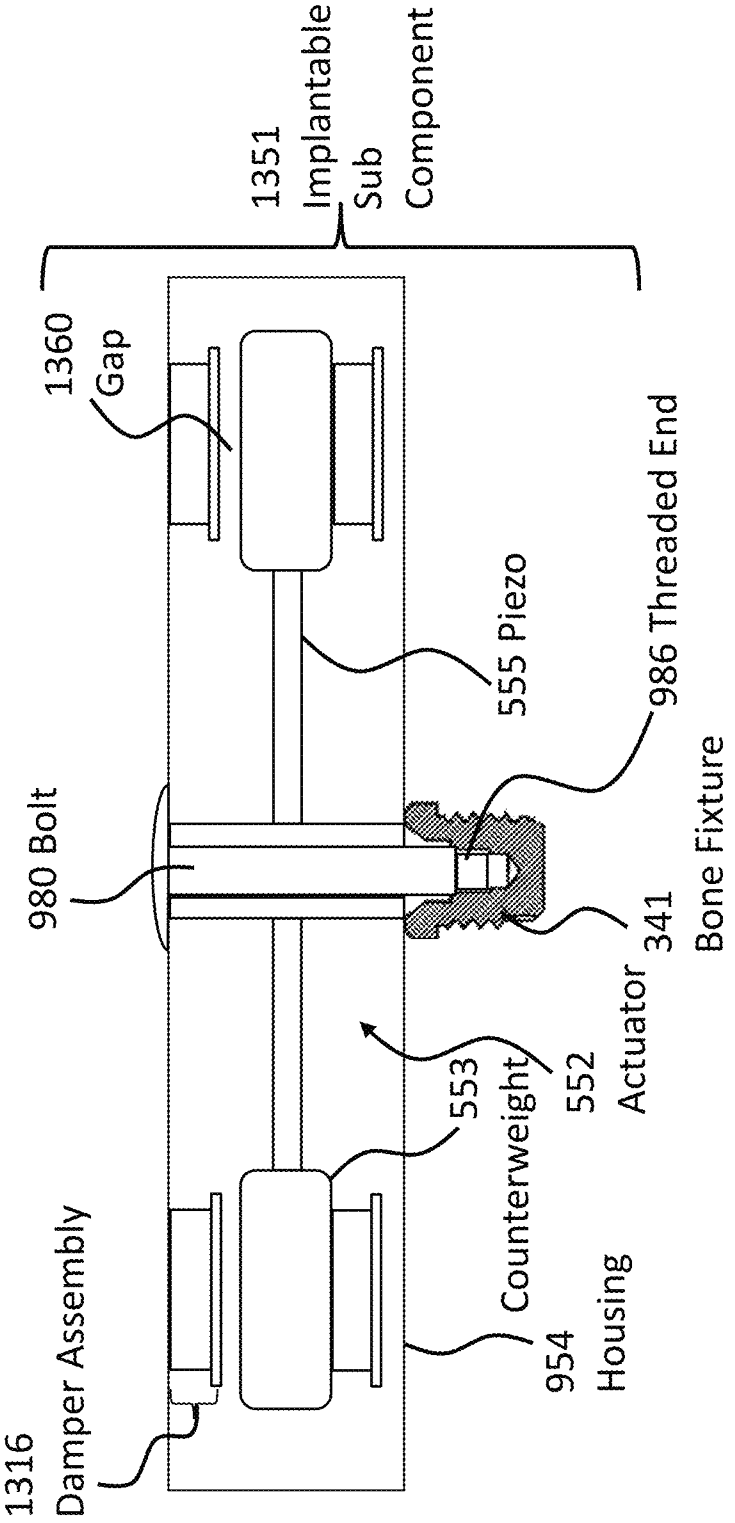
FIG. 13 is a schematic diagram of another exemplary embodiment of an implantable subcomponent.

FIG. 13 depicts an alternate embodiment of an implantable subcomponent 1351 that utilizes some of the features of the embodiment of FIG. 9E. Here, the damper assembly 1316 is fixed to the housing 954, and the gap 1360 is between the counterweight 553 in general, and the mass thereof in particular, and the damper assembly 1316. In an exemplary embodiment, the damper assembly 1316 functions in a manner analogous to or otherwise basically the same as damper assembly 916 with the exception that the compression is a result of the counterweight 553 being pushed into the damper assembly 1351 as opposed to the counterweight pushing the damper assembly 1351 into the housing 954. Any one or more features associated with the embodiment of FIG. 9E can be present with respect to the embodiment of FIG. 13 in at least some exemplary embodiments. Further, while the embodiment of FIG. 13 presents a hybrid system where the top damper assembly is carried by the housing 954 but the bottom damper assembly is carried by the counterweight 553, in an alternate embodiment, the housing 954 carries all of the damper assemblies. That is, the bottom damper assembly essentially mirrors the top damper assembly, and there is a gap between the bottom damper assembly and the bottom of the counterweight 553 that essentially mirrors the gap 1360 between the top damper assembly and the top of the counterweight.

Figure 14:
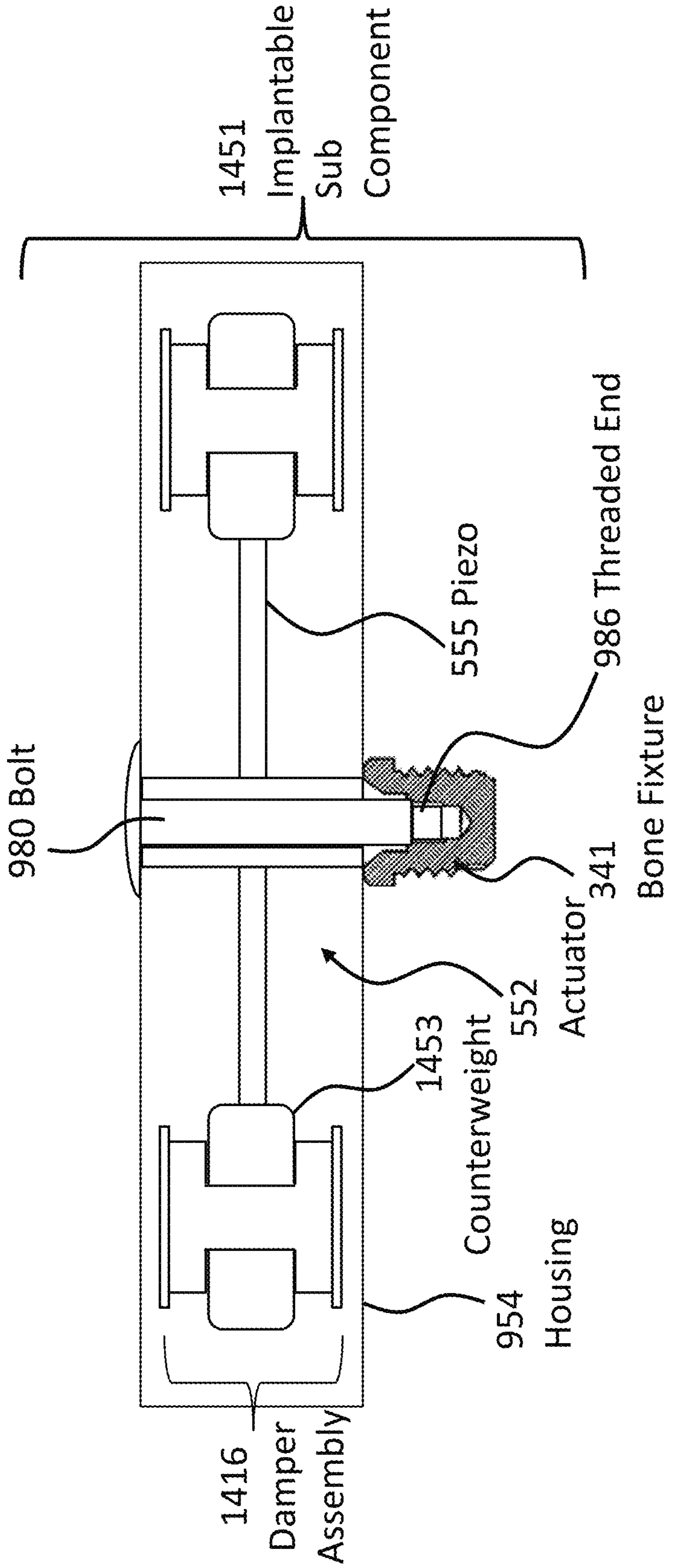
FIGS. 14 and 15 are schematic diagrams of other exemplary embodiments of the implantable subcomponent.

FIG. 14 presents another exemplary embodiment of an implantable subcomponent 1451, where the counterweight 1453 includes a through hole through which extends the force dissipation material/damping material of the damper assembly 1416. In this regard, instead of as in the embodiments above, where there is a damper assembly on or at the top of the counterweight 553 and a separate damper assembly on or at the bottom of the counterweight 553, the damper assembly 1416 is a single assembly for both the top and the bottom. Any arrangement of a damper assembly that can have utilitarian value can be utilized in at least some exemplary embodiments.

Accordingly, in view of the above, it is to be understood that in an exemplary embodiment, there is a vibrator, such as by way of example only and not by way of limitation, the implantable component of an active transcutaneous bone conduction device, or an external component of a passive transcutaneous bone conduction device, or a removable component of a percutaneous bone conduction device. In this exemplary embodiment, the vibrator includes a housing, such as housing 954 with respect to the implantable components, but can instead be the housing detailed above with respect to the external portion of the passive transcutaneous bone conduction device or a housing of a percutaneous bone conduction device. In this exemplary embodiment, a transducer, such as one including a piezoelectric component, but in some other embodiments, an electromagnetic transducer or any other type of transducer, can be positioned within the housing such that there is a gap between the transducer and housing. In at least some exemplary embodiments, there is a damper assembly, disposed in the gap between the housing and at least a portion of the transducer, the damper assembly extending a sub-distance of the total distance of the gap (at least when non-energized). Such an exemplary embodiment is seen with respect to the embodiment of FIG. 9E and FIG. 14 and FIG. 13. This as compared to the embodiments of FIGS. 9A-9D, where the gap between the housing and the transducer is completely spanned by the impulse force damper assembly 316. In this regard, in at least some exemplary embodiments, an open gap is located between the housing and the damper assembly, such as gap 960 or gap 1360.

In at least some exemplary embodiments, the vibrator is configured to output vibrations upon transduction of the transducer with the damper assembly free of compression due to the housing. As noted above, in some embodiments, such can be the case with respect to all frequency ranges of the vibrator, while in some other embodiments, such can be the case with respect to most of the frequency ranges of the vibrator. Corollary to this is that in at least some exemplary embodiments, the vibrator is configured to output vibrations upon transduction of the transducer with the damper assembly free of compression due to the transducer. Again, this can correspond to all frequency ranges of the vibrator or only some frequency ranges of vibrator. With respect to the latter, in at least some exemplary embodiments, the vibrator is configured to close the total distance of the gap upon movement of the transducer relative to the housing, thereby reducing an impulse force applied to the transducer relative to that which would be the case in the absence of the damper assembly. Of course, in at least some other embodiments, with respect to the utilization of the damper assembly to damp the resonance frequency, the vibrator is configured to close the total distance of the gap upon movement of the transducer relative to the housing, thereby damping and output of the transducer at a resonant frequency of the transducer relative to that which would be the case in the absence of the damper assembly.

Figure 15:
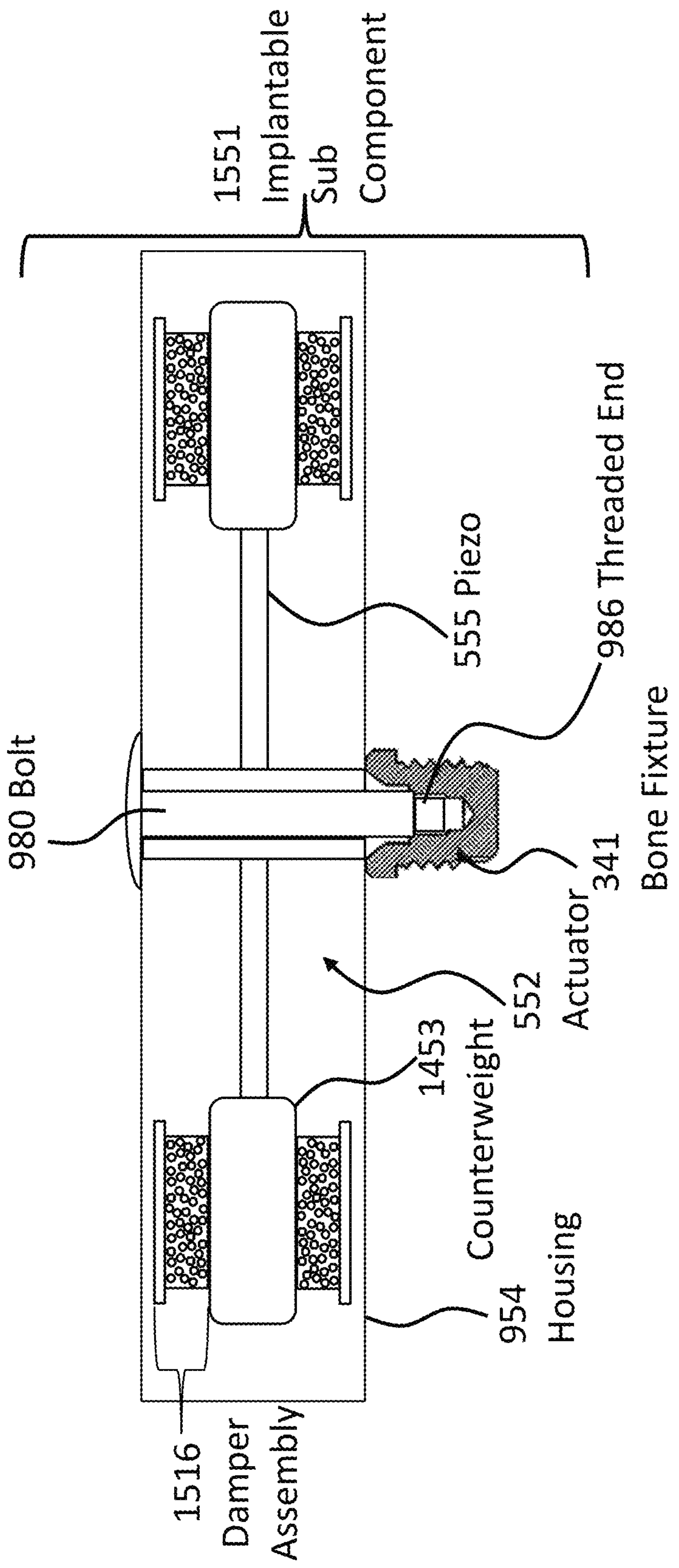
Figure 16:
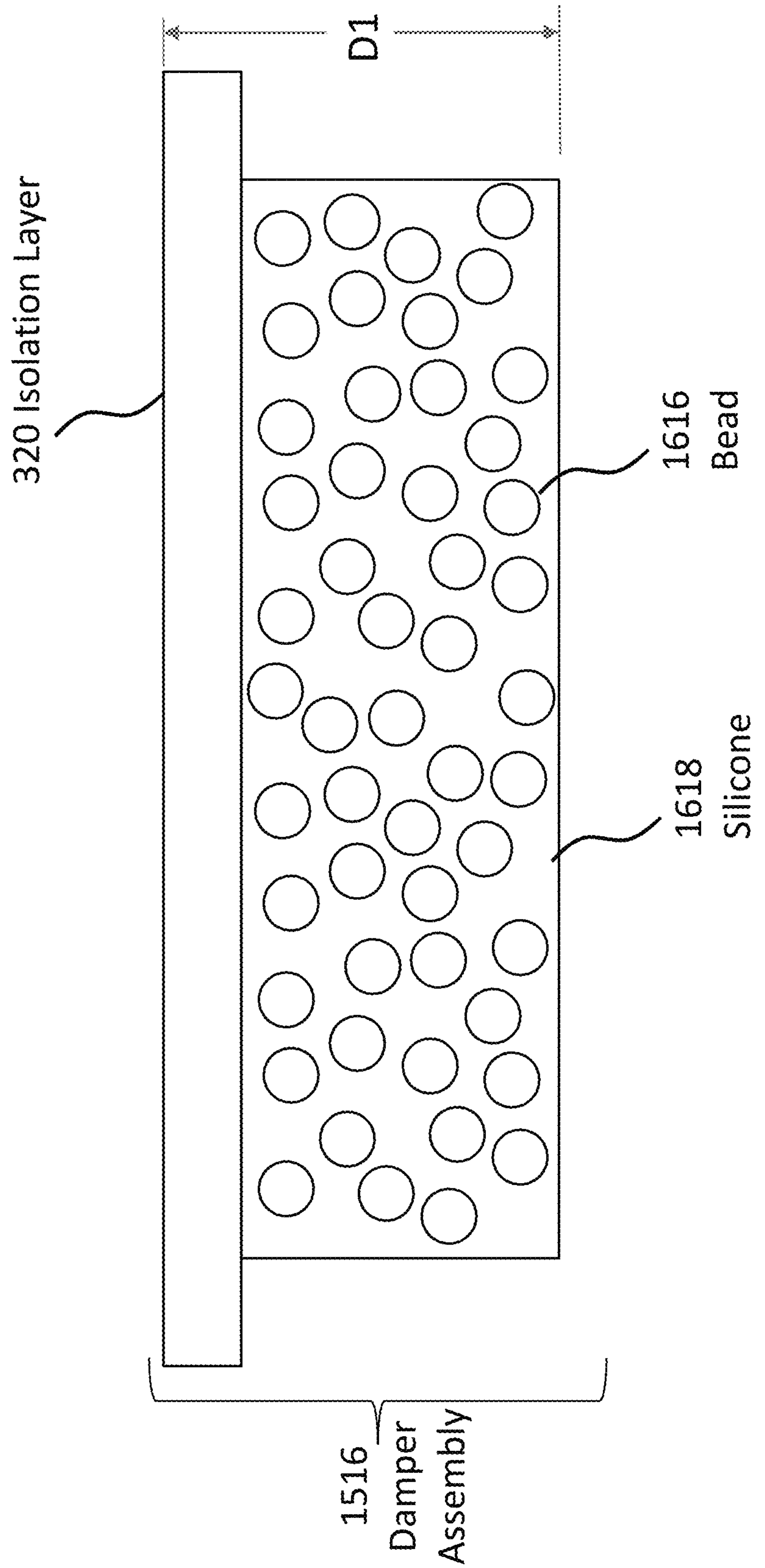
FIGS. 16-18 are close-up views depicting operation of a damper assembly according to an exemplary embodiment.
Figure 17:
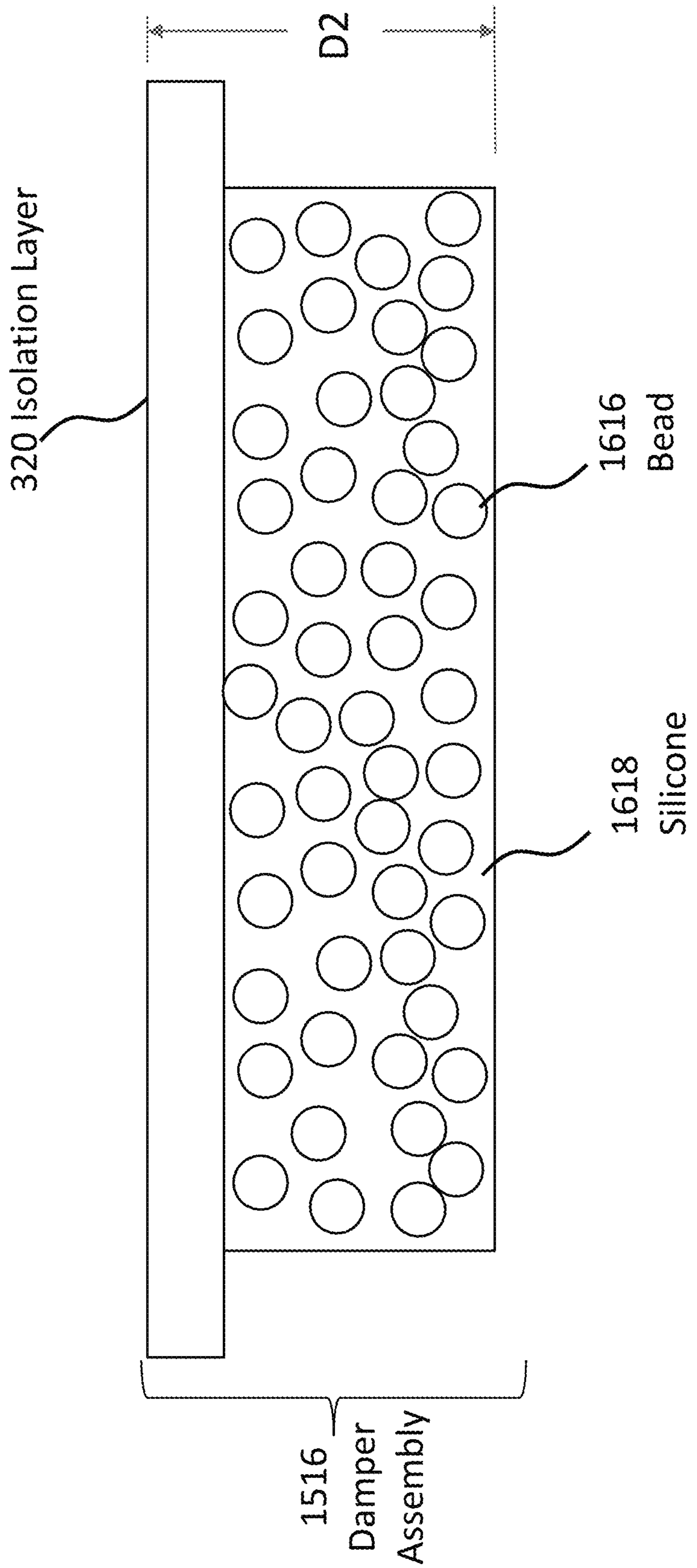

It is noted that in at least some exemplary embodiments, the damper assembly can be a silicone body, concomitant with the teachings detailed above. That said, in another embodiment, the damper assembly can be a mixture of silicone and noncompressible bodies such as by way of example only and not by way of limitation, glass beads, steel beads, titanium beads, or even plastic beads in at least some exemplary embodiments. More specifically, FIG. 15 presents an exemplary embodiment of an exemplary implantable subcomponent 1551, which subcomponent includes a damper assembly 1516. As can be seen, silicone 1618 supports glass beads 1616. In at least some exemplary embodiments, the damper assembly 1516 is configured to be compressed from a distance D1, which is the relaxed/non-compressed state, to a distance D2, a state depicted in FIG. 17, where D2 is less than D1. With respect to the compression depicted in FIG. 17, it is noted that while some glass beads 1616 may come into contact with one another, for the most part, the glass beads are still separated from each other. In an exemplary embodiment, no more than zero, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35% of the glass beads abut one another with respect to scenarios where the vibrator is vibrating at its resonance frequency. In this regard, in an exemplary embodiment, the compression of FIG. 17 corresponds to the compression that results when the vibrator vibrates at its resonance frequency or thereabouts. That is, in at least some embodiments, the silicone 1618 is compressed, and the glass beads 1616 can move towards each other or otherwise closer to each other, but, in at least some embodiments, the glass beads 1616 do not fully abut one another or otherwise there is more room for compression of the damper assembly 1516, such as in the eventuality of an impulse shock. Accordingly, with respect to the compression of FIG. 17, the counterweight can move further towards the housing by further compressing the damper assembly 1516, and thus the piezoelectric component can further deform, which thus results in further compression of the damper assembly 1516.

Briefly, with respect to the embodiment of FIG. 9E where glass beads are utilized (or another rigid component, such as steel beads, titanium beads, or even glass rods (more on this below), the masses are free to move within the functional displacement range of the actuator, which in some embodiments, is less than or equal to 0.5, 0.75, 1, 1.25, 1.5, 1.75, 2, 2.25, 2.5, 2.75, 3, 3.5, 3.75, 4, 4.25, 4.5, 4.75 or 5 μm, at least for operation away from the resonant frequency (more on this below). That said, for some displacement of the masses, such as that which might occur at the resonant frequency, a soft damping is present to gently stop the mass movement. This damping is soft enough that the piezo material is not damaged (e.g., it will not break near the masses because of the actuator's second resonance mode). By way of example, soft damping can occur for displacements less than or equal to 3, 3.25, 3.5, 3.75, 4, 4.25, 4.5, 4.75, 5, 5.5, 6, 6.5, 7, 7.5, 8, 8.5, 9, 9.5, 10, 11, 12, 13, 14, 15, 16, 17, 18, 19, 20, 21, 22, 23, 24, 25, 26, 27, 28, 29, 30, 31, 32, 33, 34, 35, 36, 37, 38 39 or 40 μm. Also, stiff behavior of the damper to block the masses from further displacement to prevent piezo breakage occurs when the beads abut one another.

Figure 18:
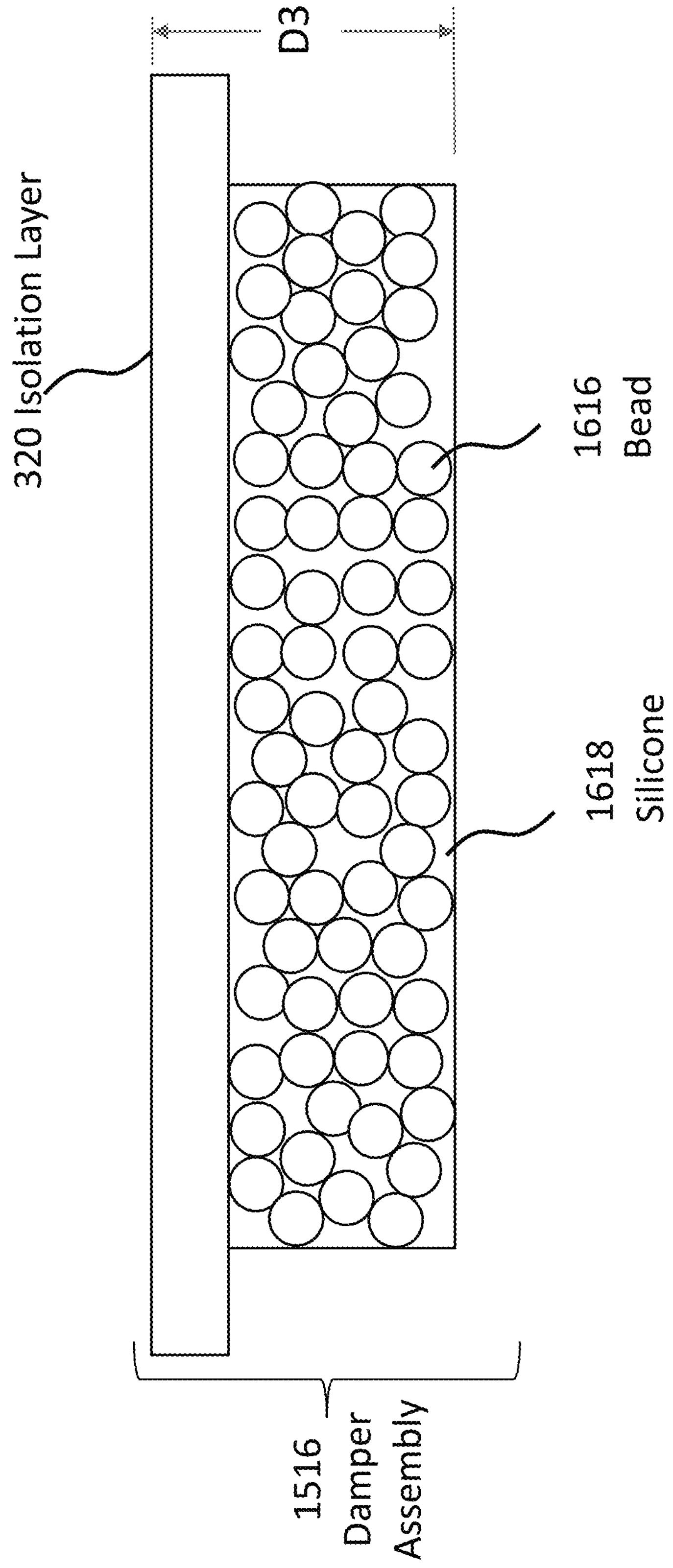

FIG. 18 represents the scenario where the damper assembly 1516 is fully compressed to a distance D3, which is smaller than distance D2. In this embodiment, most if not all of the beads 1616 abut one another. In an exemplary embodiment, at least 60, 65, 70, 75, 80, 81, 82, 83, 84, 85, 86, 87, 88, 89, 90, 91, 92, 93, 94, 95, 96, 97, 98, 99, or 100% of the glass beads abut one another during a compression of the damper assembly 1516 upon the application of a 200 G acceleration or deceleration to the vibrator.

In at least some exemplary embodiments, because the glass beads 1616 abut one another when the damper assembly 1516 is compressed to the distance D3 of FIG. 18, and thus form a quasi-rigid structure with respect to the direction in the direction of D3, the mass/counterweight 553 of the vibrator cannot move further towards the housing. That is, because the glass beads 1616 essentially crowd each other within the volume of the silicon 1618, and because the glass beads are essentially noncompressible, once the density of the glass beads within a given area is maxed out, no further compression of the damper assembly 1516 can occur. Thus, the piezoelectric component 555 cannot further deform, thus preventing the piezoelectric component 555 from deforming by an amount that could cause damage thereto. This is also the case with respect to the damper assembly 516 on the opposite side of the counterweight/mass 553, which can prevent the mass from moving more than a certain amount when the backlash occurs (the movement of the counterweight in the opposite direction when the piezoelectric component 555 springs back towards its relaxed state and thus the mass drives the piezoelectric component 555 to deform in the opposite direction by an amount that can also damage the piezoelectric component 555 or otherwise in a manner that can damage the piezoelectric component 555).

In at least some exemplary embodiments, when the glass beads stack up as depicted in, for example, FIG. 18, this results in implementation of the shock proofing of the vibrator. Thus, in view of the above, there is in some embodiments, a prosthesis comprising a transducer-seismic mass assembly (e.g., the combination of counterweight/mass 553 and piezoelectric component 555), and a housing (e.g., 954). The prosthesis further includes a shock-proof assembly (e.g., damper assembly 1516) configured to permanently shock proof the transducer-seismic mass assembly. In an exemplary embodiment, the prosthesis is configured such that the shock proof assembly is free of contact of one of the housing or the transducer-seismic mass assembly during normal operation.

Figure 19:
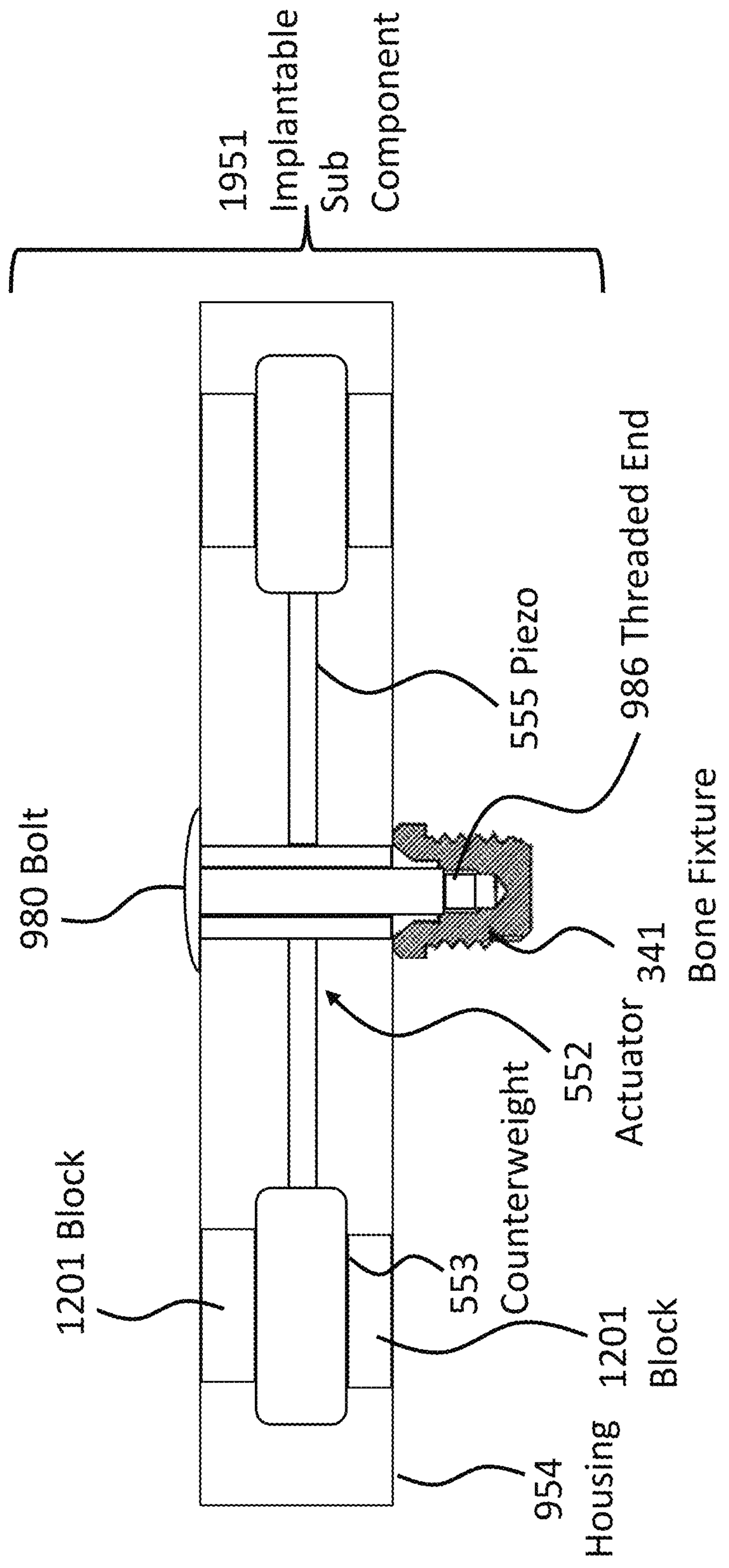
FIGS. 19 and 20 presented another example of shock proofing which, as opposed to some of the embodiments detailed herein, provides only temporary shock proofing.
Figure 20:
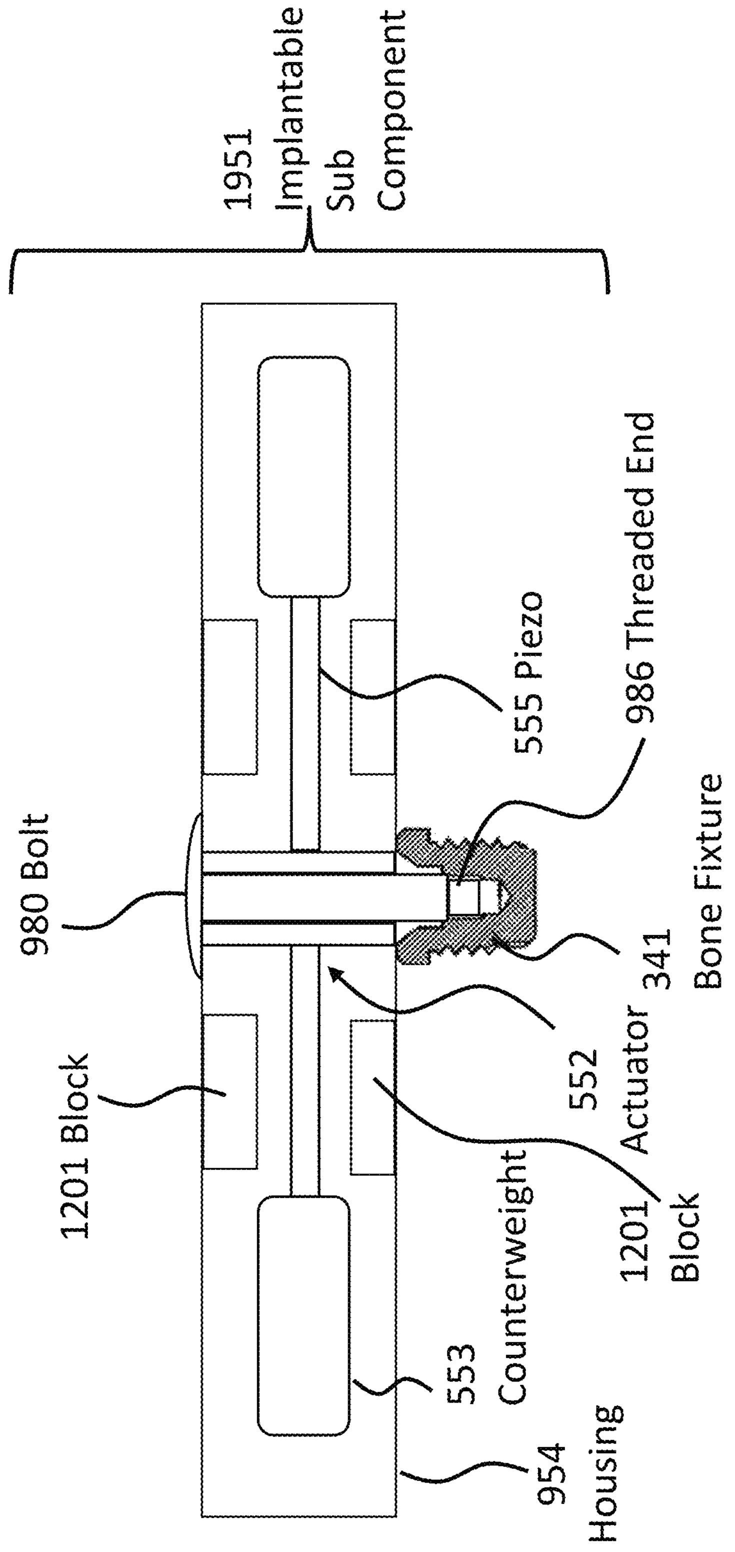

By permanently shock-proofing the transducer-seismic mass assembly, this means that the shock proofing as always present. This as opposed to an embodiment where, for example, the prosthesis can be alternately placed into an out of shock proofing, such as by way of example only and not by way of limitation, with respect to the embodiment of FIG. 19, where, for example, there is a prosthesis 1951 that includes a shock-proof assembly that includes retractable blocks 1201 as seen. During storage or otherwise during periods of nonuse, the retractable blocks 1201 are interposed between the counterweights 553 and the housing 954, thus preventing the counterweight 553 from moving, and thus preventing the piezoelectric component 555 from moving. During periods of use, the retractable blocks 1201 are moved inboard, as seen in FIG. 20, thus permitting the counterweight 553 to move, and thus permitting the piezoelectric component 555 to move. Accordingly, when in the state of FIG. 19, the prosthesis is shock-proof, but when in the state of FIG. 20, the prosthesis is not shock-proof. Thus, the prosthesis is not permanently shock-proofed even when it is shock-proofed in the state of FIG. 19. Conversely, because the damper assembly 1516 is always present and always in the location between the housing and the mass, the prosthesis of the embodiment of FIG. 15 is always shock-proofed.

Consistent with the embodiment of FIG. 9E and implantable subcomponent 951, in at least some exemplary embodiments, the shock-proof assembly is fixed to the transducer-seismic mass assembly (but not the housing 954). Conversely, consistent with the embodiment of FIG. 13 and implantable subcomponent 1351, the shock-proof assembly is fixed to the housing (but not the transducer-seismic mass assembly). Consistent with the embodiment of FIG. 14, the shock-proof assembly includes a resilient component that continuously extends from one side of the transducer-seismic mass assembly to an opposite side of the transducer-seismic mass assembly.

Again, the transducer-seismic mass assembly includes a mass (e.g., mass/counterweight 553). Because, as noted above, the transducer can be an actuator/can be used as an actuator and/or the transducer can be utilized to transduce vibrational energy into an electrical output, the transducer is configured to at least one of permit the mass to oscillate or oscillate the mass. In at least some exemplary embodiments, the shock-proof assembly includes a resilient component that contiguously extends from one side of the mass to an opposite side of the mass (again, the embodiment of FIG. 14, by way of example).

In at least some exemplary embodiments, the shock-proof assembly is a mixture of a compressible component, such as by way of example only and not by way of limitation, a non-solid component(s) such as silicone, and solid components, such as by way of example only and not by way of limitation, glass beads. In at least some exemplary embodiments, the shock-proof assembly is configured to compress a first amount so as to bring the solid components closer to each other and so that the compressible component provides at least a significant portion of a damping of the transducer-seismic mass assembly. Still further, in an exemplary embodiment, the shock-proof assembly is configured to compress a second amount greater than the first amount so as to result in a substantial number of the solid components abutting one another such that that the solid components provide a substantial amount of shock-proofing relative to the compressible component. Some specific details of the damping and the shock proofing will be described below.

In some embodiments, the shock-proof assembly is configured to provide a soft damping of the transducer-seismic mass assembly upon a first amount of compression, and the shock-proof assembly is configured to provide a hard damping of the transducer-seismic mass assembly upon a second amount of compression greater than the first amount of compression.

Consistent with the embodiment detailed above, the shock-proof assembly comprises silicone and beads and the shock-proof assembly is configured to provide a first level of damping of the transducer-seismic mass assembly upon a first amount of deformation of the shock-proof assembly, wherein the silicone can be deformed beyond an amount that corresponds to the first level of damping. Also, the shock-proof assembly is configured to provide a second level of damping of the transducer-seismic mass assembly upon a second amount of deformation of the shock-proof assembly greater than the first amount of deformation when the silicone can no longer deform and/or the beads come into contact with each other. In at least this exemplary embodiment, the shock-proof assembly is an assembly that overall remains in the same location at all times relative to the housing (overall being used to cover the fact that the shock-proof assembly will deform, and thus will move relative to the housing, but overall, it does not move relative to the housing). This as opposed to, for example, the shock proofing of the embodiment of FIG. 19. Again, consistent with the embodiment where the shock-proof assembly is mounted on the transducer-seismic mass assembly, the shock-proof assembly overall remains in the same location at all times relative to the transducer-seismic mass assembly.

Also, in at least some exemplary embodiments, the shock-proof assembly is configured to provide a first level of variable damping of the transducer-seismic mass assembly upon a first amount of deformation of the shock-proof assembly, and the shock-proof assembly is configured to provide a second level of non-variable damping of the transducer-seismic mass assembly upon a second amount of deformation of the shock-proof assembly different than the first amount of deformation. In this regard, in an exemplary embodiment, when the glass beads abut one another, or at least a substantial number of the glass beads abutment one another, this damping that occurs is no longer variable, as opposed to the state in which the shock-proof assembly is compressed to the distance D2, for example, but can be compressed further to vary the amount of damping.

It is to be understood that in an exemplary embodiment, there is a prosthesis, comprising a transducer and a damper configured to provide varying degrees of damping to the transducer, which varying degrees include at least effectively no damping. For example, when the vibrator vibrates at frequencies away from the first resonant frequency, there is at least effectively no damping (the undulating body of silicone might, in some instances, provide a de minimis amount of damping, but such would still be effectively no damping. It is noted that damping as used herein also encompasses the scenario where, for example, the transducer-seismic mass assembly can no longer move any further in one direction owing to the compaction of the glass beads as detailed above, for example, vis-à-vis FIG. 18.

By way of example only and not by way of limitation, in an exemplary embodiment, the vibrator is configured such that operation of the vibrator at frequencies away from the resonant frequency, and thus in states where the damper assembly is not compressed or otherwise where the damper assembly is separated or otherwise not in contact with at least one of the mass or the housing results in at least about 80, 81, 82, 83, 84, 85, 86, 87, 88, 89, 90, 91, 92, 93, 94, 95, 96, 97, 98, 99, or 100% of the energy output for a given energy input into the transducer, all other things being equal, as that would be the case if the damper assembly was not present.

As noted above, in an exemplary embodiment, the damper is configured as a mixture of resilient components (e.g., silicone) and rigid components (e.g., glass beads). Any resilient component and any rigid component that can be applied together to achieve the teachings detailed herein or otherwise the results herein can be utilized in at least some exemplary embodiments. It is noted that in at least some exemplary embodiments, the damper is a mixture of silicone and solids dispersed within the silicone. In some embodiments, the damper is configured such that upon a first amount of deflection of the transducer, the damper resists movement of the transducer with a first force, and upon a second amount of deflection greater than the first deflection, the damper resists movement of the transducer with a second force greater than the first force. In this regard, in an exemplary embodiment as detailed above, the first force occurs when the damper is compressed partially but not fully, and the second force occurs when the damper is compressed fully (e.g., when the glass beads abut one another). Still further, consistent with the teachings detailed above, in at least some exemplary embodiments, this second force prevent substantially all further movement of the transducer.

Also, it is noted that in at least some exemplary embodiments, the damper is configured such that upon a first amount of deflection of the transducer, the damper resists movement of the transducer with zero force, and upon a second amount of deflection greater than the first deflection, the damper resists movement of the transducer with a first force greater than the zero force. In an exemplary embodiment, with respect to the first amount of deflection, this deflection can correspond to the deflection that occurs during normal operation of the transducer at frequencies away from the resonant frequency. Still further, with respect to the second amount of deflection, this deflection can correspond to the amount of deflection that occurs when the transducer operates at the resonant frequency and/or can occur when the transducer subjected to an impulse force.

In at least some exemplary embodiments, the damper smoothly increases resistance to movement of the transducer between the first force and the second force with increased deflection between the first distance and the second distance, with an inflection point at the second distance. In an exemplary embodiment, the inflection point occurs when the damper is fully compressed (e.g., when the beads fully abut one another).

Figure 21:
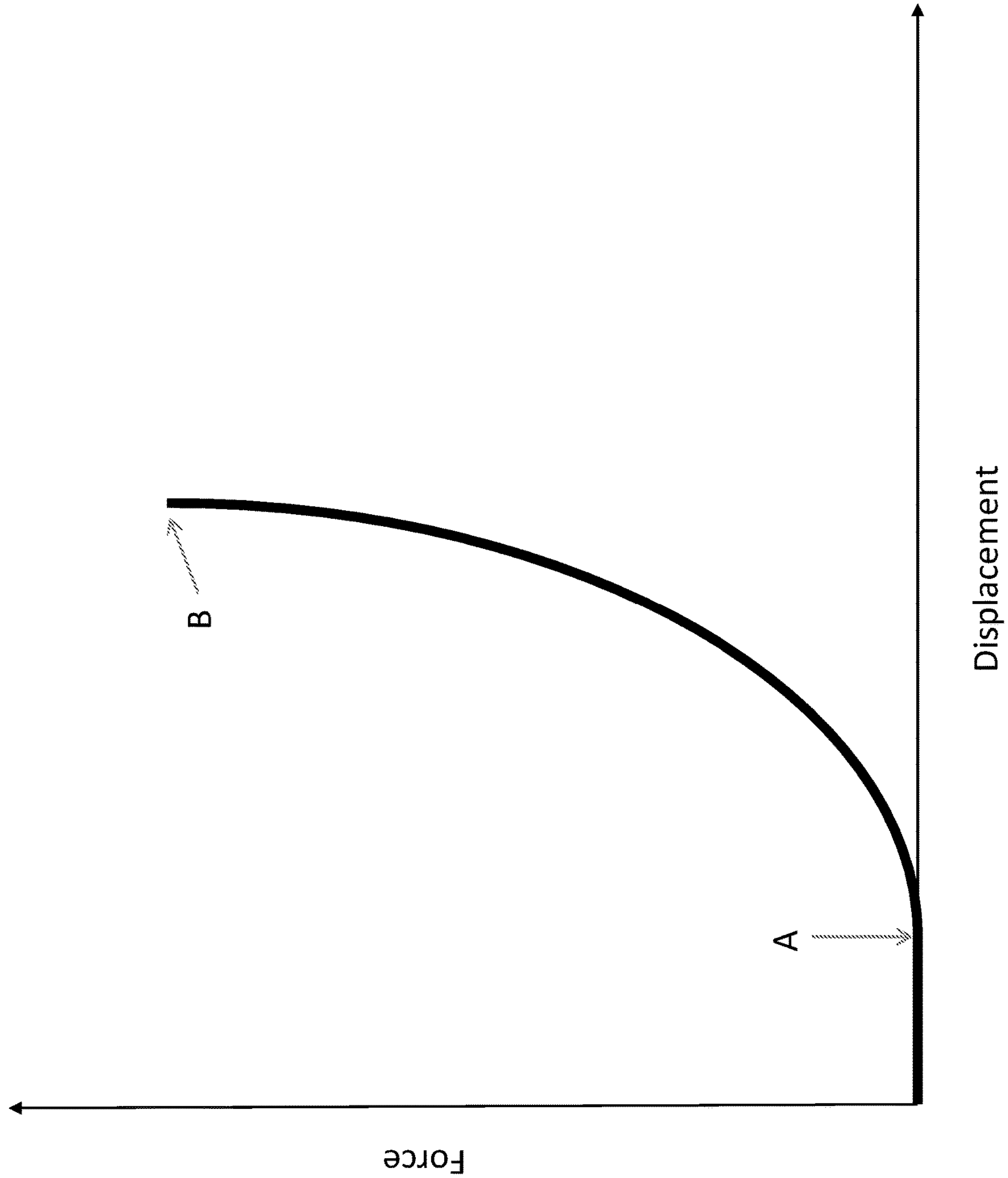
FIGS. 21-26 are exemplary graphs depicting performance features of at least some exemplary embodiments.
Figure 22:
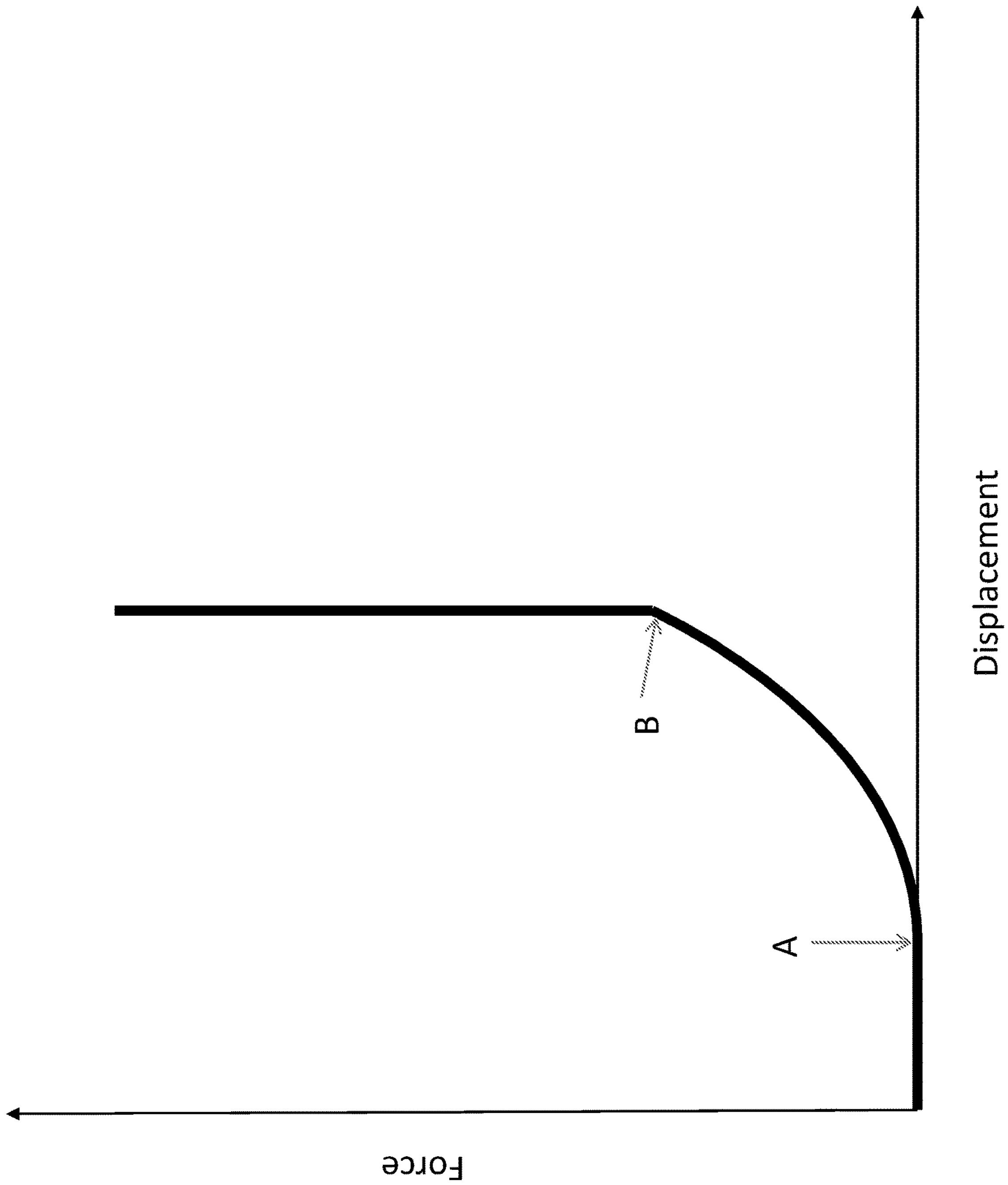
Figure 23:
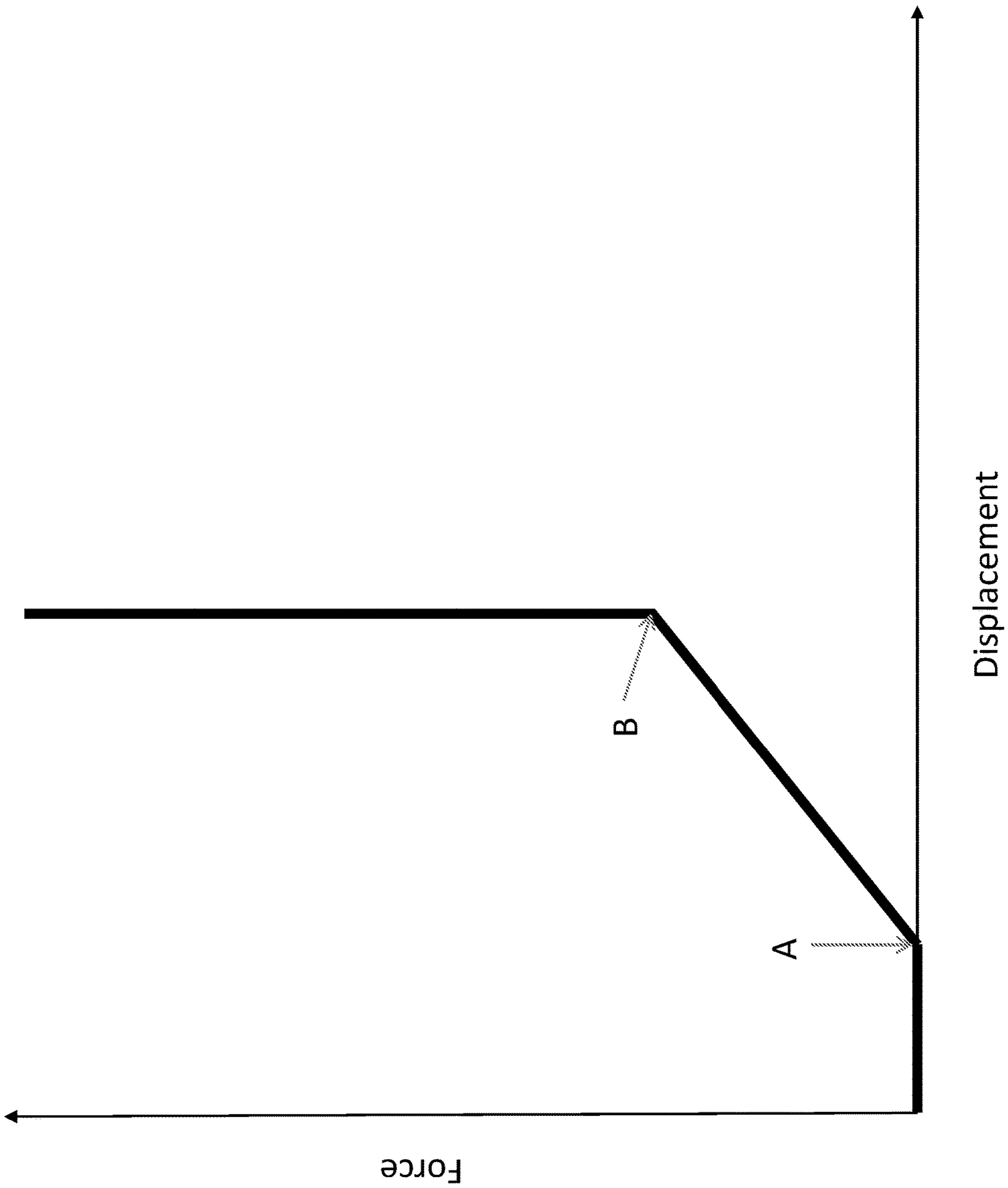
Figure 24:
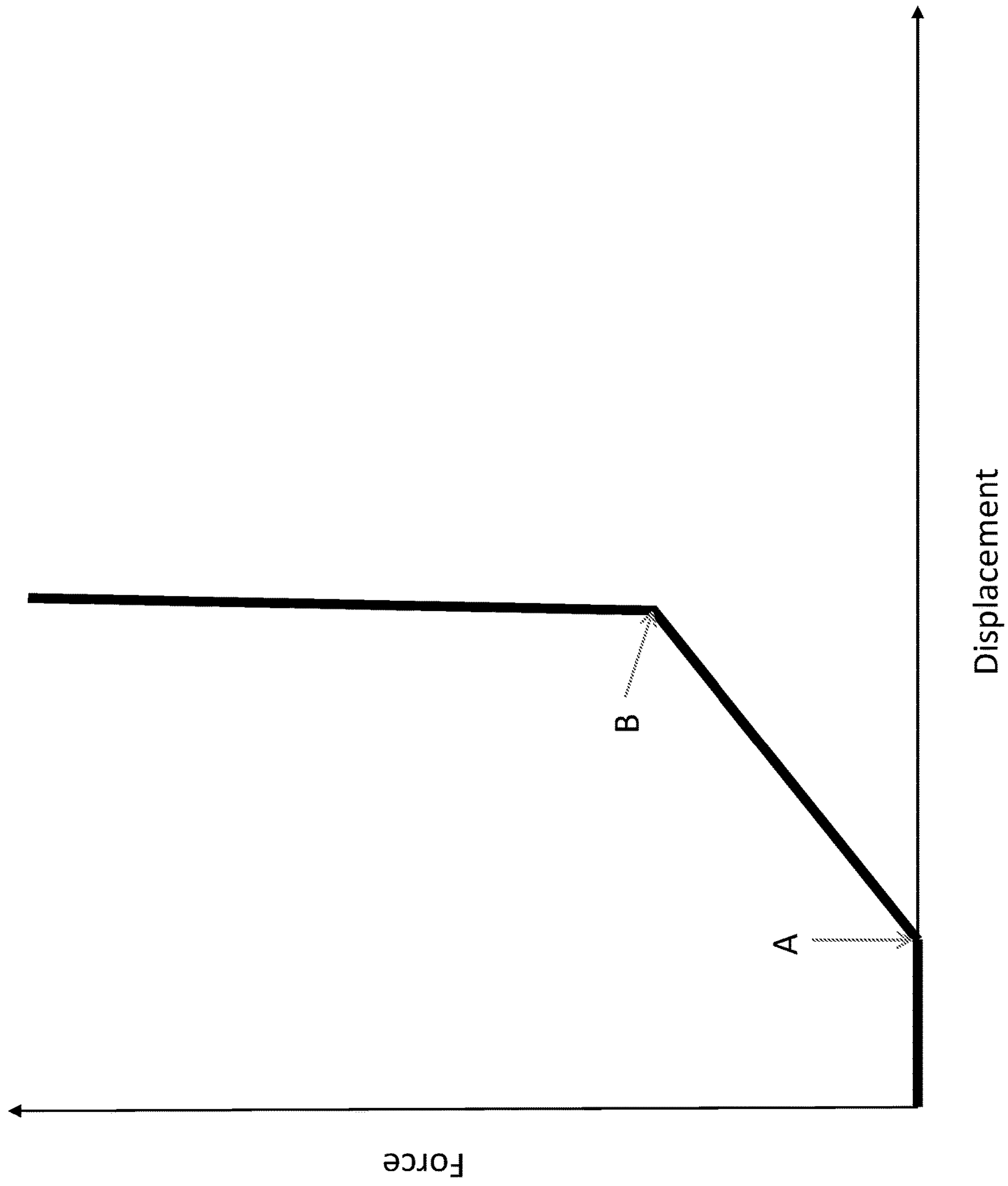
Figure 25:
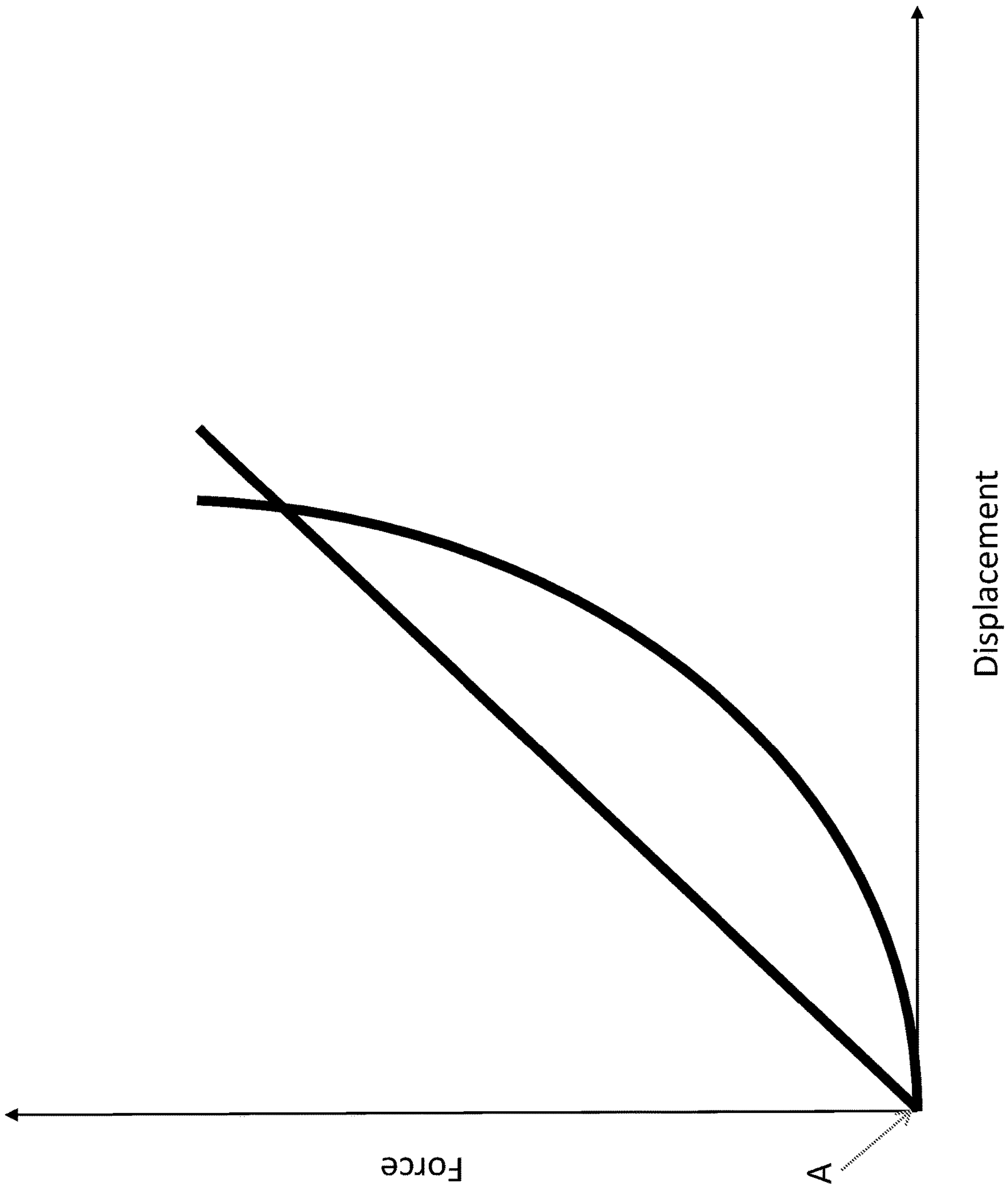

FIGS. 21-25 present some exemplary conceptual graphs of force to displacement using some of the embodiments herein. With respect to these graphs, point A is the beginning of compression of the damper due to "squeezing" between the mass and the housing, and B is the point where no further compression occurs (but the mass is still away from the housing, including further away than any thickness of element 320 and/or any thickness of any silicone present in its fully squashed state (where in the embodiments of the damper that include the glass beads are not fully squashed when the beads fully abut one another—the beads would have to be smashed/pulverized for the damper to be fully squashed, or at least the silicone to be fully squashed). In FIG. 21, it can be seen that there is a displacement extending from zero displacement (the origin of the graph) to point A where there is no force that resists movement of the piezoelectric component. In at least some exemplary embodiments, the Y axis can instead represent damping amount. After point A, the force resisting displacement of the piezoelectric component increases to point B. In FIG. 21, the increase is exponential. At point B, this represents in at least some exemplary embodiments, the point where the compression of the damper assembly is such that the beads fully abut one another. Data is not presented for force after this point. Conversely, in FIG. 22, data is presented past point B, where the force increases linearly as can be seen but there is no additional displacement after that point. This is contrasted to the embodiment of FIG. 24, where there is a very tiny amount of displacement after point B with increasing force, as can be seen by comparing the force above point B in FIG. 24 to that of FIG. 23. In FIGS. 23 and 24, the force versus displacement curve between points A and point B is linear as can be seen. FIG. 25 presents force versus displacement curves for some alternate embodiments, such as the embodiment of FIG. 9A above, where the resistance to displacement of the piezoelectric component occurs upon initial displacement thereof and increases thereafter, wherein some embodiments such as exponential and in other embodiments such as linear. Any relationship between force versus displacement can be utilized in at least some exemplary embodiments providing that such has utilitarian value.

Figure 26:
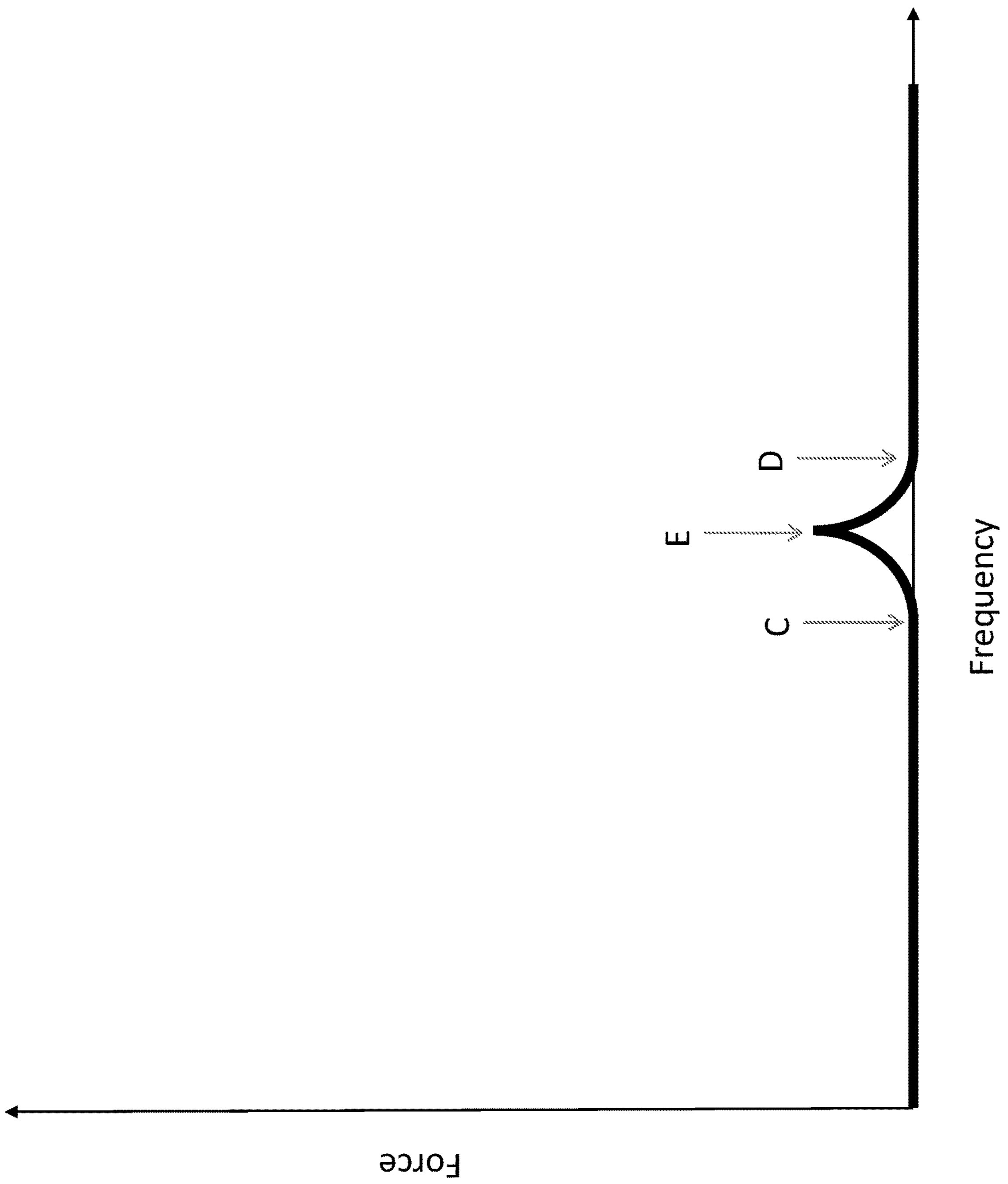

FIG. 26 depicts an exemplary force versus frequency graph with respect to resistance to displacement by the damper assembly with increasing frequency in a 1 G environment (no impulse force) for normal operation of the transducer, which can be a scenario where the transducer is used as a hearing prosthesis to evoke a bone conduction hearing percept at the maximum volume for frequencies from about 50 Hz to about 15,000 Hz. As can be seen, the resistance to displacement is zero until point C, and then the resistance increases and then decreases again to zero at point D. The inflection point E represents the resonant frequency of the vibrator. In the embodiment depicted in FIG. 26, the force increases and then decreases exponentially, while in other embodiments, the force increases and then decreases linearly. Any relationship between force versus frequency can be utilized in at least some exemplary embodiments. (In FIG. 26, frequency increases logarithmically.)

Thus, as is represented in FIG. 26, in some embodiments, the damper provides a damping of a first resonance peak of the transducer without damping another frequency, such as a frequency 5, 10, 15, 20, 25, 30, 35, 40, 45, 50, 55, 60, 65% less or greater than the first resonant frequency, whether linearly or logarithmically. (It is noted that any reference herein to a resonant frequency corresponds to a disclosure of at least a first resonant frequency.) In an exemplary embodiment, the only frequencies where damping occurs during normal operation are the frequencies at and around the resonant frequency. In an exemplary embodiment, the only frequencies where damping occurs during normal operation are frequencies within 1, 2, 3, 4, 5, 6, 7, 8, 9, 10, 11, 12, 13, 14, 15, 20, 25, 30, 35 or 40%, either linearly or logarithmically, of the resonant frequency.

Figure 27:
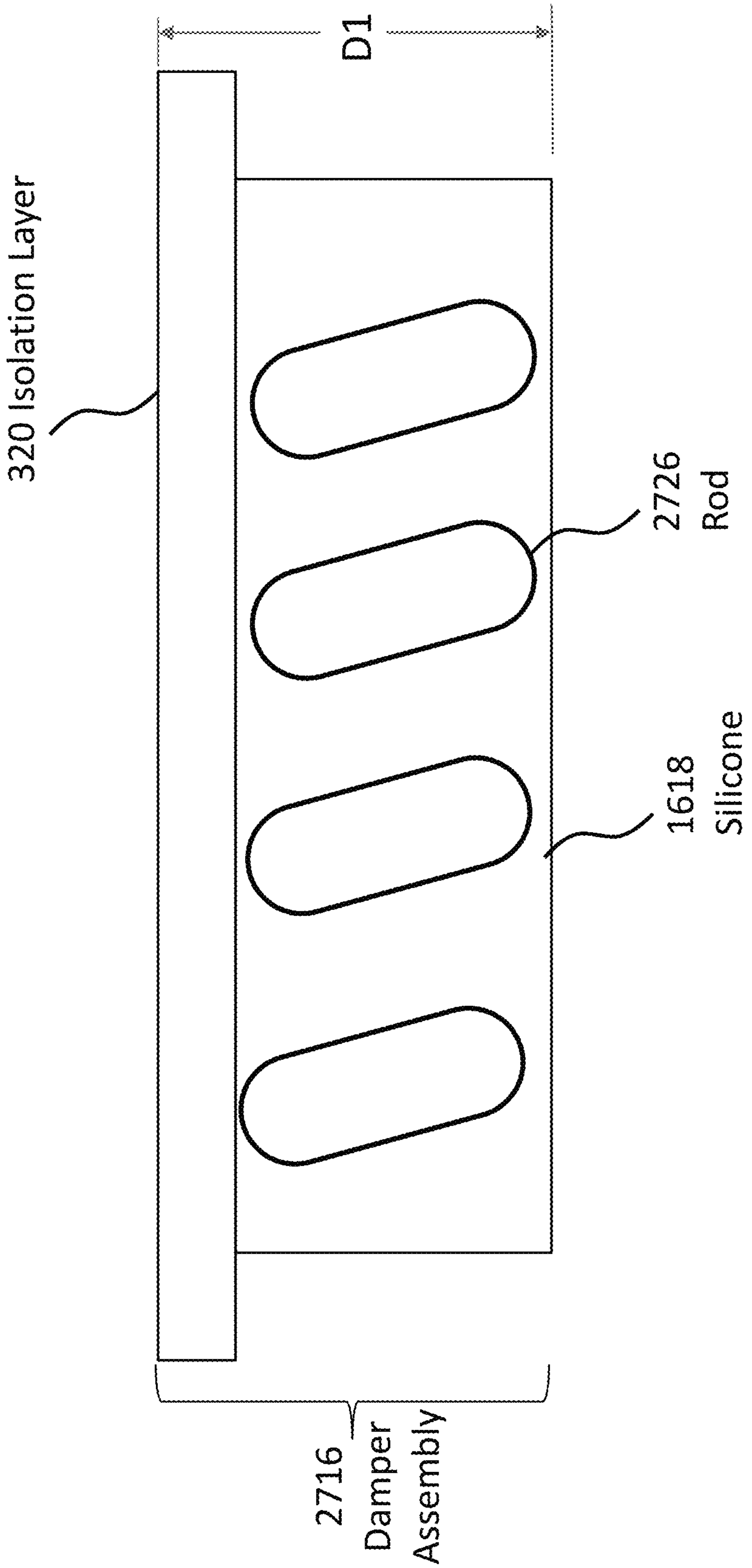
FIGS. 27-31 present close-up views depicting operation of various damper assemblies according to other exemplary embodiments.
Figure 28:
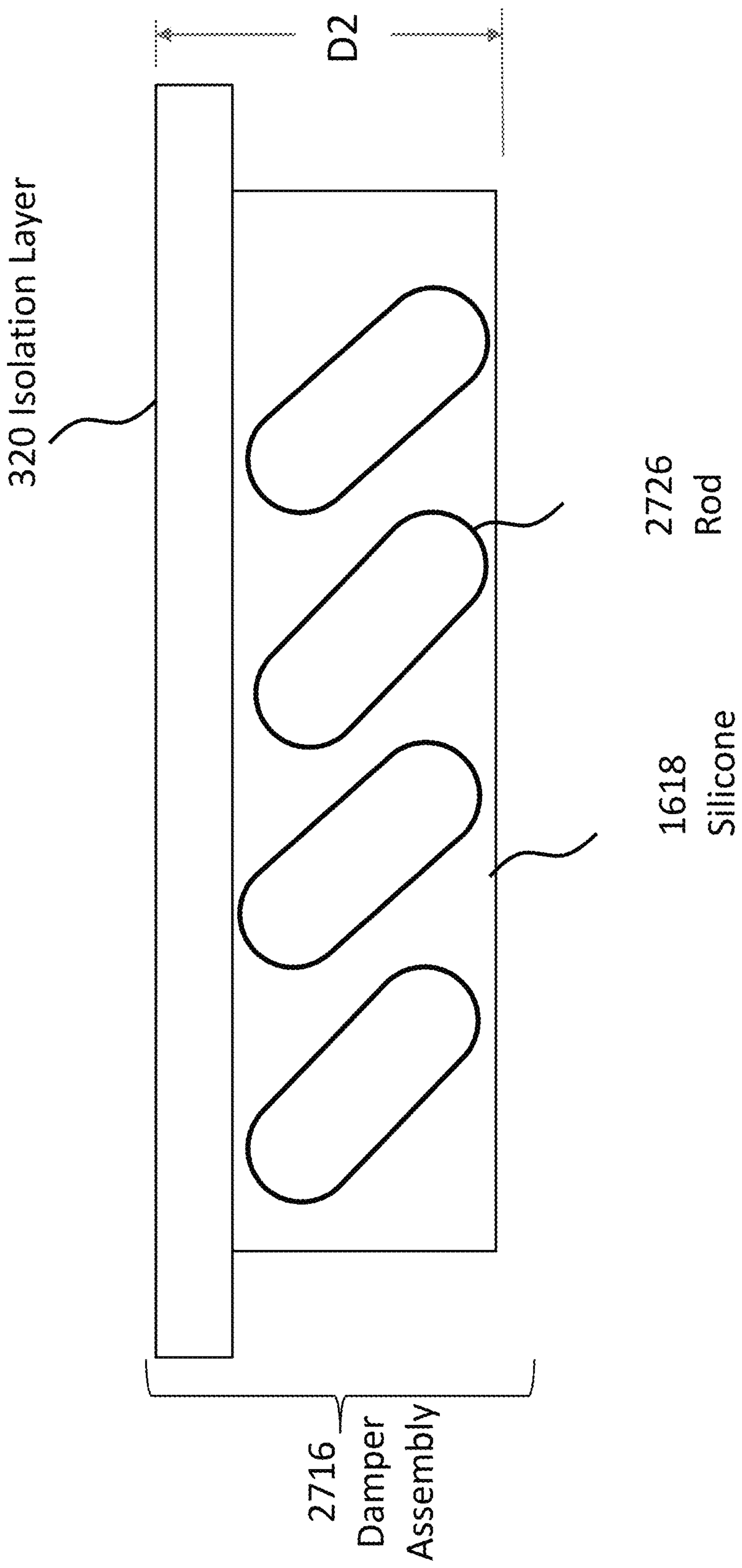
Figure 29:
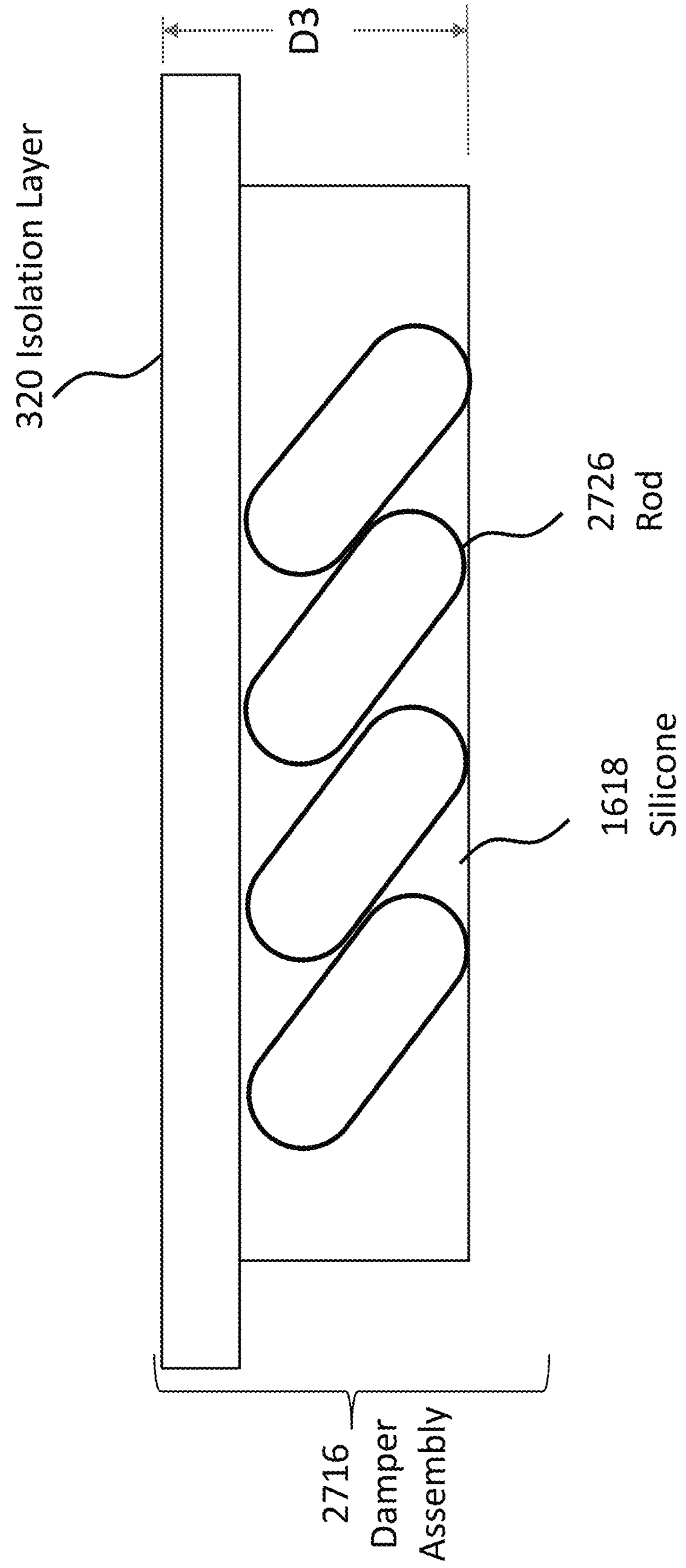
Figure 30:
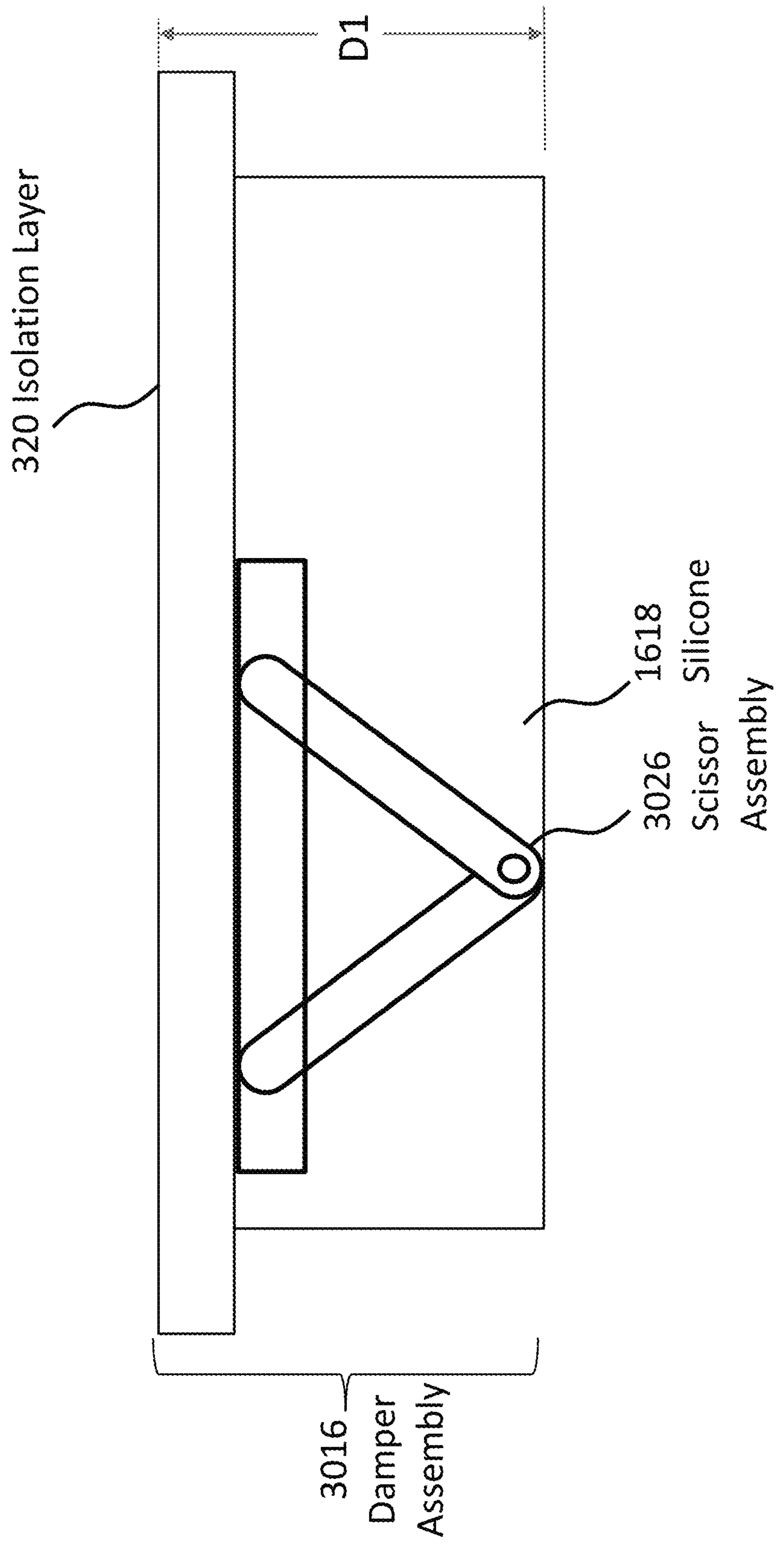
Figure 31:
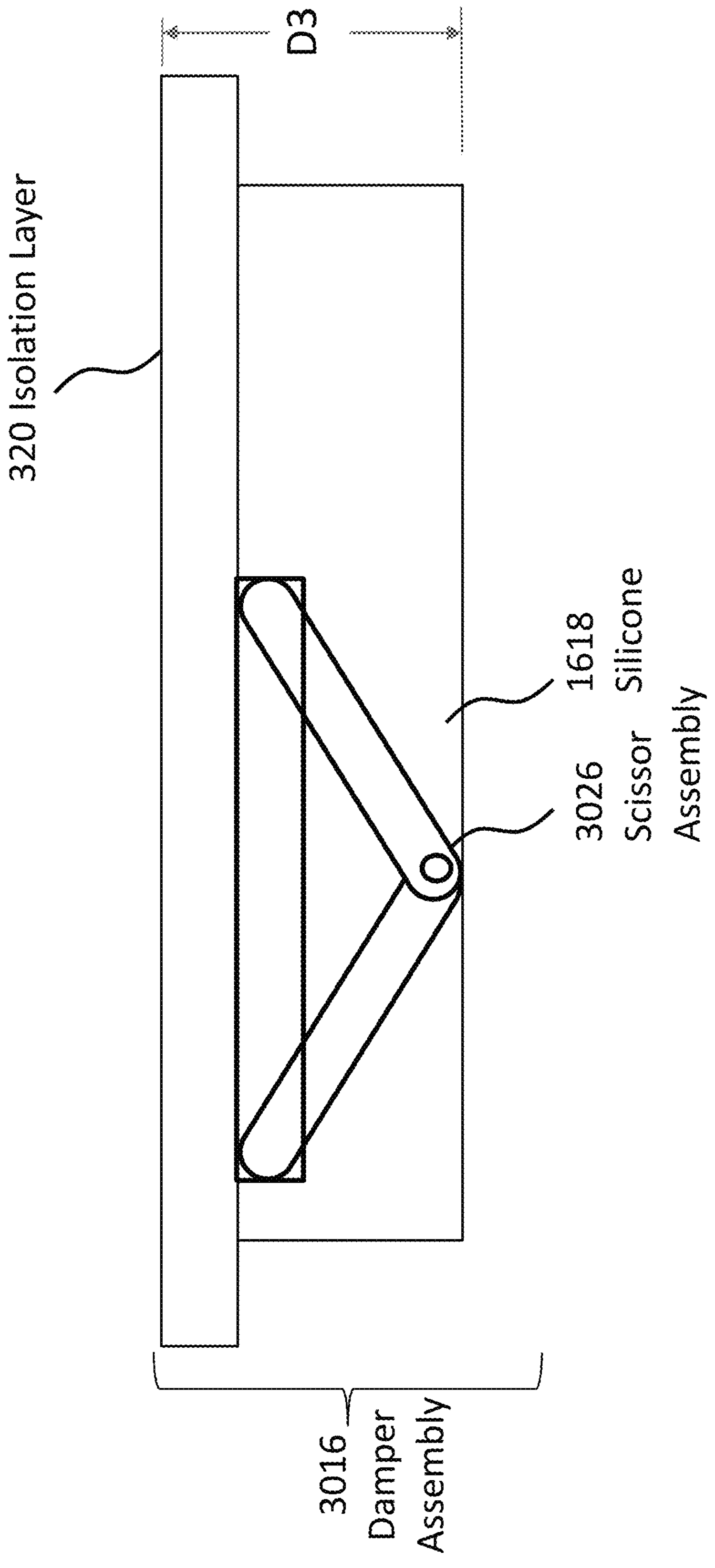

FIGS. 27-29 present another exemplary embodiment of a damper assembly 2716 that utilizes a mixture of silicone 1618 and glass rods 2726. Here, the damper assembly 2716 is configured such that upon compression of the damper assembly 2716, the rods 2726 rotate counterclockwise, and upon the rods taking a configuration like fallen dominoes, no further compression of the damper assembly occurs. FIGS. 30 and 31 present yet another alternate embodiment that permits soft damping and hard damping. Here, damper assembly 3016 includes silicone 1618 and scissor assembly 3026. Scissor assembly 3026 slides along a track located at the top upon compression of the damper assembly 3016, until the end of the scissor assembly strike the ends of the slot, as seen in FIG. 31, after which no further compression can occur or otherwise very little compression can occur. It is noted that while the embodiment of FIG. 30 depicts the scissor being at the bottom face of the silicone, and some other embodiments, the scissor can be located away from the bottom face. Any arrangement that can enable the teachings detailed herein to be practiced can be utilized in at least some exemplary embodiments.

It is noted that the embodiments above can provide different levels of utilitarian value with respect to shock proofing. By way of example, the embodiments of FIGS. 9A-9D, without glass beads, can, in at least some exemplary embodiments, protect against shock with peak acceleration values of 200 G in half sine waveform of 1 ms. However, it is entirely possible that in some instances, such cannot protect against values greater than, for example, 250, 300, 350, 400, 450, 500, 550 and/or 600 G or more, all other things being equal. Conversely, in at least some exemplary embodiments, such as embodiments utilizing the glass beads, and also such as those utilizing the above gap, such as that of FIG. 9E, the teachings herein provide protection against shock with peak acceleration values of 300, 350, 400, 450, 500, 550, 600, 650, 700, 750, 800, 850, 900, 950 and/or 1000 G or more, in half sine wave forms of 1 ms. By protection, it is meant that after the transducer or subassembly including the transducer is subjected to such accelerations (which includes decelerations), the transducer or subassembly can output energy at at least 80, 85, 90, 91, 92, 93, 94, 95, 96, 97, 98, 99 or 100% of its pre acceleration output, all other things being equal (e.g., energy input) for a period of standard use of 6 months, 9 months, 1 year, 1.5 years, 2 years, 2.5 years, 3 years or more all other things being equal. In at least some exemplary embodiments, the aforementioned glass beads (or other rigid components in the silicone) enable the higher shock values, because in some instances, it provides more or stiffer damping material. However, there is utilitarian value with respect to utilizing less silicone relative to more silicone, all other things being equal. This is believed to be the case in that the silicone and/or the sheet(s) deforms during curing, thus causing permanent contact of the cured material and the surrounding component(s) and/or imparting a compression force on the bender owing to the deformation (a pre-tension in some embodiments). Thus, the Output Transfer Function (OTF) can, in some instances, be changed when larger quantities of damping gel are used. Thus, there is utilitarian value in using only limited quantities of damping gel. However, such results in sub-standard shock-proofing by itself (e.g., to 50, 75, 100, 125, 150, 175, or 200 G).

Accordingly, in an exemplary embodiment, for a given outer volume of cured silicone (or for a given outer volume of another resilient material) all other things being equal, the utilization of the glass beads (or other rigid substances) increases the amount of acceleration that can be applied to the transducer in half sine waveform of 1 ms by at least 1.5, 1.75, 2, 2.25, 2.5, 2.75, 3, 3.25, 3.5, 3.75, 4, 4.5, 5, 5.5, 6, 6.5, 7, or 7.5 times, all other things being equal. Also, in at least some exemplary embodiments, such is the case without changing the output transfer function relative to that which would be the case in the absence of the damper assembly, while in at least some other exemplary embodiments, such as the case with only minimally changing the output transfer function/changing the output transfer function in a de minimis amount. It is also noted that in at least some exemplary embodiments, such is the case while achieving the above-noted output energy differences relative to the vibrator with and without the damper assemblies, all other things being equal. It is noted that with respect to the above noted "outer volume," it is meant the outer volume of the silicone, not the total volume of the silicone. For example, for a given outer volume of "pure" silicone, there will be much more silicone than that which will be the case with respect to the mixture of the silicone in glass beads. Thus, "outer volume" is different than the total volume. The total volume of silicone will be much lower than that of the "outer volume." In a sense, the outer volume is the "packaging" volume of the damper/damper assembly.

Consistent with embodiment 9E, there is a prosthesis that includes a housing that encompasses a transducer, and the prosthesis is configured such that at rest (e.g., in a 1 G environment) with the transducer in a non-energized state, a gas gap is located between the damper and the housing. The prosthesis is configured to collapse the gas gap during normal operation when the transducer operates at the resonant frequency. In at least some exemplary embodiments, the prosthesis is configured to maintain the gas gap during normal operation when the transducer operates at frequencies away from the resonant frequency. In at least some exemplary embodiments, the prosthesis is configured to maintain the gas gap during normal operation when the transducer operates at frequencies at or at least 1, 2, 3, 4, 5, 6, 7, 8, 9, 10, 11, 12, 13, 14, 15, 20, 25, 30, 35, or 40%, either linearly or logarithmically, of the resonant frequency away from the resonant frequency. Still further, in at least some exemplary embodiments, the damper provides a damping of the first resonance peak of the transducer due to collapsation of the gas gap.

Thus, in some embodiments, there is a controlled air gap that is created to enable the functional up-down movement of the masses, where there is little (including no) impact on the OTF on the system. A soft damping is in place when the masses displace some more following shock. In at least some exemplary embodiments, the silicone hardness determines the softness in this stage, and hard damping is achieved when the silicone can no longer deform and the glass beads come in contact with each other. In at least some exemplary embodiments, the packing of the glass beads determines the hardness. In at least some exemplary embodiments, the aforementioned dampers provide survival rates of 100% at 400, 500, 600, 700, 800, or 900 Gs, all other things being equal, at least when using the glass beads (or equivalent structure). Conversely, in at least some exemplary embodiments without utilizing the glass beads (or equivalent structure) survival rates of less than 100% are seen at the aforementioned G forces, all other things being equal. Indeed, in some exemplary embodiments without utilizing the glass beads, survival rates of less than 10%, including zero percent, are seen at 400, 500, 600, 700, 800, or 900 Gs, all other things being equal.

In an exemplary embodiment, because the first residence peak of the actuator is mechanically damped, in at least some exemplary embodiments, the teaching detailed herein include a bone conduction device that does not include a firmware notch filter or otherwise firmware or software or even electronicware/circuitry that functions as a notch filter or otherwise affirmatively reduces the output of the actuator. That is, in an exemplary embodiment, there is a bone conduction device that is based on pure mechanical damping of the first resonance peak.

It is noted that in at least some exemplary embodiments, there is a method of making the prostheses detailed herein. In this regard, in an exemplary embodiment, the method includes obtaining a transducer-seismic mass assembly, and placing such in a housing subcomponent, and then placing an embryonic damper apparatus between the transducer-seismic mass assembly and the housing. In an exemplary embodiment, the embryonic damper corresponds to a silicone gel-based composition that is in a pre-cured state. It is noted that the damper can correspond to an embryonic damper assembly that includes silicone gel in the above-noted spacers 320. In an exemplary embodiment, the embryonic damper corresponds to a mixture of silicone gel and rigid components, such as the glass beads detailed above, and can also correspond to an embryonic damper assembly that includes the spacers 320. Still further, another housing subassembly is placed onto the housing subassembly to which the transducer-sized mass assembly has been attached, thereby fully enclosing the transducer-seismic mass assembly and the embryonic damper in the housing. Subsequently, heat is applied in at least some exemplary embodiments to the housing, so as to raise the interior temperature in the housing, so as to cure the silicone gel from the gel state to a state closer to a solid. In this exemplary embodiment, as a result of the curing of the silicone gel, a space/gap opens up between the damper and the housing or the damper and the seismic mass, depending on whether the damper is carried by the housing or carried by the seismic mass. In an exemplary embodiment, prior to the curing, the embryonic damper or damper assembly completely spans the distance between the seismic mass and the interior wall of the housing. However, after curing, the silicone shrinks so as to result in a gap or otherwise a space between the now fully cured damper assembly and the transducer-seismic mass assembly or the housing, depending on the configuration, this gap corresponding to the gap detailed above in at least some exemplary embodiments.

In an exemplary embodiment, after the transducer-seismic mass assembly is attached to the housing, a glass bead/silicone mixture is injected in between the mass and the housing in liquid (pasta) shape, which injection fills the gap between the mass and the spacer sheet or the gap between spacer sheet and the housing or the gap between the two spacer sheets respectively proximate the mass and the housing, etc. In the embodiment of FIG. 9E, upon full establishment of the embryonic damper assembly, the polymer sheet is in contact with the housing. Then, hermetic welding of the housing is executed. In at least some exemplary embodiments, welding deformations occur, but because the pasta is still in liquid phase, it adapts to the micro-deformations caused by laser welding, and the distance between the seismic mass and the housing is still filled with the embryonic damper assembly. Subsequent this, and action of curing of the glass bead/silicone mixture is executed, such as by way of example only and not by way of limitation, the application of heat. During curing, the silicone shrinks 1-3% and thereby creates the gas gap between the polymer sheet (that is attached to the silicone) and the housing or the gas gap between the polymer sheet (that is attached to the silicone, and the mass.

In at least some exemplary embodiments, the glass bead content determines how much the total damping combination shrinks. By way of example only and not by way of limitation, with respect to a given volume of the damper assembly, the more beads the less shrinking, and vice versa, all other things being equal (e.g., the same amount of curing heat, curing time, etc.). In an exemplary embodiment, the amount of glass beads is utilized to control the final size of the gas gap.

Accordingly, in an exemplary embodiment, there is a prosthesis, comprising a transducer-seismic mass assembly and a housing and a damper apparatus. In this exemplary embodiment the damper apparatus is made by a method of completely filling a space between the housing and the transducer-seismic mass assembly with structural components of the prosthesis (e.g., the silicone and glass bead mixture and the spacer sheets. Further, the method of manufacture further includes permanently shrinking the damper apparatus to create a gas gap in the formerly filled space. As noted above, in an exemplary embodiment, the permanent shrinking is executed by curing a silicone of the damper apparatus. In an exemplary embodiment, the permanent shrinking is executed by heating the prostheses. In an exemplary embodiment, the damper apparatus is a means for damping the transducer-seismic mass assembly according to the teachings detailed herein.

In at least some exemplary embodiments, the damper apparatus comprises glass beads suspended in silicon, and the prosthesis is configured such that the amount that the damper apparatus is permanently shrunk is a result of, at least in part (which includes in total), a ratio of the glass beads a silicone by volume, all other things being equal. Still further, consistent with the teachings detailed above, the damper apparatus is located on a first side and a second side of the transducer-seismic mass assembly, and component(s) of the damper apparatus located on both sides include an amalgamation of silicone and glass beads. Also, in some embodiments, the housing is hermetically welded shut, and the welding was executed while a component of the damper apparatus was in a liquid phase.

In an exemplary embodiment, a magnitude of the vibrational energy output of the implantable component with the damper assembly in place is at least about 100, 99, 98, 97, 96, 95, 94, 93, 92, 91, 90, 89, 88, 87, 86, 85, 84, 83, 82, 81, or 80 percent of that which would otherwise be the case in the absence of the damper assembly, all other things being equal, at least when the implantable component is operated at frequencies away from the resonant frequency.

In an exemplary embodiment, the damper assembly as detailed herein or variations thereof, is such that, with respect to angular movement of the counterweight 553 relative to that which is the case at rest, the arrangement prevents the counterweights 553 from moving more than 3000%, 2750%, 2500%, 2250%, 2000%, 1750%, 1500%, 1250%, 1000%, 750%, 500%, 250%, 225%, 200%, 175%, 150%, 140%, 130%, 125%, 120%, 115%, 110%, 105%, 100%, 95%, 90%, 85%, 80%, 75%, 70%, 65%, 60%, 55%, 50%, 45%, 40%, 35%, 30%, 25%, 20%, 15%, 10%, 9%, 8%, 7%, 6%, 5%, 4%, 3%, 2%, 1%, 0.5%, 0.25%, 0.125%, 0.1%, 0.05%, 0.025%, 0.01%, or any value or range of values therebetween in 0.01% increments (e.g., 75.33% to 33.31%, 003%, etc.) beyond that which results from the apparatus vibrating in response to a pure sine wave at 1000 Hz at 80 dB (as measured at the microphone of the external component when used therewith), such prevention of bending can be in one or both directions, and such prevention of bending can be measured from the at rest position to the maximum upswing or downswing, or the combined upswing and downswing (a full flap).

In an exemplary embodiment, if, for example, the subcomponent 951 was subjected to a deceleration and/or acceleration corresponding to that which would otherwise result in the scenario depicted in FIG. 7 and/or that which results in flapping of the piezoelectric component, the countermass 553 in general would be damped by the damper assembly, thus preventing the counter mass 553 from moving a large amount/an amount that would cause the piezoelectric material 555 to break or otherwise plastically deform and/or preventing the counterweight from flapping, or at least limiting the amount of flapping that occurs, thus preventing the aforementioned failure modes. Hereinafter, the configuration utilizing apparatuses to prevent the counterweights and/or the piezoelectric material from moving when subjected to an acceleration and/or deceleration is sometimes referred to herein for purposes of linguistic economy as a shock-proof assembly.

As detailed above, some exemplary embodiments of shock-proofing entail limiting the movement of the transducer-seismic mass assembly. In at least some exemplary embodiments of this, a modicum of movement of the transducer-seismic mass assembly, even when subjected to very high acceleration and/or deceleration, will not permanently deleteriously impact the piezoelectric material 555. Thus, in at least some exemplary embodiments, it is not necessary to completely prevent the transducer-seismic mass assembly from moving. Accordingly, at least some of the exemplary embodiments of the damper assembly detailed herein embrace this fact.

As noted above, the transducer-seismic mass assembly 552 is configured to move upward and downward to generate vibrations (and thus evoke a bone conduction hearing percept). Further, in at least some embodiments, the implanted component is configured to permanently limit movement (including preventing movement) of the transducer-seismic mass assembly 552 in at least one of the upward or downward directions (so far, limiting movement in both directions have been described) relative to that which would be the case in the absence of the damper assembly, thus shock-proofing the assembly.

With respect to at least embodiments where the "flapping" is the failure mode that causes the piezoelectric material 555 to fail, in at least some exemplary embodiments, there can be only a damper assembly on the bottom or on the top, but not both (but in other embodiments, damper assemblies located both at the bottom and the top), and thus, because flapping is prevented, or otherwise the flapping is significantly reduced relative to that which would otherwise occur, the piezoelectric material 555 will not fail or otherwise the likelihood of failure is reduced, all other things being equal, even though the piezoelectric material can deform significantly in one direction.

Also, with respect to flapping, it is noted that in at least some embodiments, the teachings herein are utilized to prevent a "full flap," and in some embodiments, only permit a "quasi-half flap." That is, in some exemplary embodiments, it is sufficient to prevent the piezoelectric material from bending one of downward or upward from the at-rest position. In this regard, by way of example only and not by way of limitation in at least some exemplary embodiments the configurations herein enable the piezoelectric transducer 552 to quasi-half flap, but no more (e.g., such as configurations where there is damper assemblies only at the top or only at the bottom, but not both places). That is, in an exemplary embodiment, a deceleration of the implantable subcomponent where the embodiment includes only damper assemblies at the top, with respect to a scenario where the subcomponent is traveling downward at the time of the deceleration, will permit the transducer-seismic mass assembly to bend downwards and then recoil back upwards, but then interface with the damper assemblies on the top, and thus only about "quasi-half flap." In an exemplary embodiment, this is sufficient to shock-proof the assembly. In some embodiments, the transducer-seismic mass assembly will be permitted to more than half flap but not fully flap. It is a quasi-half flap because the piezo does flap towards the damper, but because of the damper, that portion effectively results in the flapping only being a quasi-half flap. This as opposed to, for example, a completely rigid stop that prevents any flapping towards the stop from the rest position, which would be a true half-flap. Any reference to half-flap herein also corresponds to a disclosure of quasi-half flap, and vice versa. The point is that any quasi-half flap is a flap that effectively corresponds to a half flap even though there is more.

In any event, in at least some exemplary embodiments, such as those having a damper assembly at the top and the bottom, the magnitude of a flap would be reduced relative to that which would exist in the absence of such assemblies, but a full flap could exist. In an exemplary embodiment, by reducing the magnitude of the full flap, shock-proofing can still be enabled even though there is a full flap.

Accordingly, in an exemplary embodiment, the shock-proofing can correspond to a device, system, and/or method of preventing a full flap of the piezoelectric transducer. In an exemplary embodiment, where a half flap constitutes movement only downward or upward, and more than a half flap (more than a 50% flap) constitutes full movement in one direction and partial/limited movement in the opposite direction, the shock-proofing is configured to prevent the piezoelectric transducer from attaining a 100% flap, and, in some embodiments, the shock-proofing is configured to prevent the piezoelectric transducer from attaining a value of ABC flap, where ABC equals 90%, 85%, 80%, 75%, 70%, 69%, 68%, 67%, 66%, 65%, 64%, 63%, 62%, 61%, 60%, 59%, 58%, 57%, 56%, 55%, 54.5%, 54%, 53.5%, 53%, 52.5%, 52%, 51.5%, 51%, 50.5%, 50%, 49.5%, 49%, 48.5%, 48%, 47.5%, 47%, 46.5%, 46%, 45.5%, 45%, 44%, 43%, 42%, 41%, 40%, 39%, 38%, 37%, 36%, 35%, 34%, 33%, 32%, 31%, 30%, 25%, 20%, 15%, 14%, 13%, 12%, 11%, 10%, 9%, 8%, 7%, 6%, 5%, 4%, 3%, 2%, 1%, or any value or range of values therebetween in 0.1% increments.

In an exemplary embodiment, for a given acceleration and/or deceleration, all other things being equal, such given acceleration/deceleration results in a full flap that has a magnitude of MNO in the absence of the shock-proofing detailed herein, the shock-proofing limits the magnitude of a full flap to only 90%, 85%, 80%, 75%, 70%, 69%, 68%, 67%, 66%, 65%, 64%, 63%, 62%, 61%, 60%, 59%, 58%, 57%, 56%, 55%, 54.5%, 54%, 53.5%, 53%, 52.5%, 52%, 51.5%, 51%, 50.5%, 50%, 49.5%, 49%, 48.5%, 48%, 47.5%, 47%, 46.5%, 46%, 45.5%, 45%, 44%, 43%, 42%, 41%, 40%, 39%, 38%, 37%, 36%, 35%, 34%, 33%, 32%, 31%, 30%, 25%, 20%, 15%, 14%, 13%, 12%, 11%, 10%, 9%, 8%, 7%, 6%, 5%, 4%, 3%, 2%, or 1% of MNO, or any value or range of values therebetween in 0.1% increments of a full flap for that given acceleration/deceleration.

It is also noted that in an exemplary embodiment, the flapping in both directions can be limited, but by different amounts in each direction. By way of example only and not by way of limitation, the amount of flapping in the upward direction can be limited to 80% of that which would otherwise be the case in the absence of the shock-proofing, and the amount of flapping in the downward direction can be limited to 60% of that which would otherwise be the case in the absence of the shock-proofing. Accordingly, in an exemplary embodiment, with respect to an upward flap portion and a downward flap portion, embodiments detailed herein can limit the amount of upward flap portion to the ABC values detailed above, and/or can limit the downward flap portion to the ABC values detailed above.

In an exemplary embodiment, the shock-proof resulting from the configurations detailed herein, when engaged/when in shocked-proof configuration, prevents tips of the counterweight 553 (the portions furthest from the longitudinal axis of the implantable subcomponent) from moving more than 0.001 degrees, 0.002, 0.003, 0.004, 0.005, 0.006, 0.007, 0.008. 0.009, 0.01, 0.011, 0.012, 0.013, 0.014, 0.015, 0.016, 0.017, 0.018, 0.019, 0.20, 0.021, 0.022, 0.023, 0.024, 0.025, 0.026, 0.027, 0.028, 0.029, 0.030, 0.035, 0.04, 0.045, 0.05, 0.055, 0.06, 0.065, 0.07, 0.08, 0.09, 0.1, 0.11, 0.12, 0.13, 0.14, 0.15, 0.175, 0.2, 0.25, 0.3, 0.35, 0.4, 0.45, or 0.5 degrees, or any value or range of values therebetween in 0.001° increments from the at rest position (in one or both directions—as will be detailed below, in some embodiments, the transducer is not restrained on one direction of movement, but limited from moving in another direction (such as by no more than the aforementioned amounts)). Of course, in some embodiments, the teachings detailed herein prevent the counterweights from moving entirely, or at least the tips thereof from moving entirely.

In an exemplary embodiment, during normal operation (or, in some alternate embodiments, during operation with the sine wave detailed herein), the counterweight 553 moves at most 1, 2, 3, 4, 5, 6, or 7 micrometers, with a 2 cm arm distance. In an exemplary embodiment, the movements are scaled linearly with increasing arm distance, and thus the above and below noted movement prevention values are scaled linearly as well.

In some embodiments, the configurations detailed herein prevent the counterweight 553 from moving more than about 10 micrometers with respect to an oscillatory movement of the actuator, although in other exemplary embodiments, the configurations herein prevent the counterweight 553 from moving by an amount less 5 micrometers while in other embodiments, the configurations prevent the counterweights 553 from moving more than 1 or 2 or 3 or 4 micrometers. In an exemplary embodiment, the shock-proof apparatuses detailed herein, when engaged, prevent tips of the counterweight 553 (the portions furthest from the longitudinal axis of the implantable subcomponent) from moving more than 50 nm, 60 nm, 70 nm, 80 nm, 90 nm, 100 nm, 110 nm, 120 nm, 130 nm, 150 nm, 200 nm, 250 nm, 300 nm, 350 nm, 400 nm, 450 nm, 500 nm, 550 nm, 600 nm, 650 nm, 700 nm, 750 nm, 800 nm, 850 nm, 900 nm, 950 nm, 1 micrometer, 1.2, 1.3, 1.4, 1.5, 1.6, 1.7, 1.8, 1.9 2, 3, 4, 5, 6, 7, 8, 9, 10, 11, 12, 13, 14, 15, 16, 17, 18, 19, 20, 25, 30, 35, 40, 45, 50, 55, 60, 65, 70, 75, 80, 85, 90, or 100 micrometers from the static at rest position, or any value or range of values therebetween in 10 nm increments (in one or both directions—as will be detailed below, in some embodiments, the transducer is not restrained on one direction of movement, but limited from moving in another direction (such as by no more than the aforementioned amounts)).

In some embodiments, the limitation of movement is relative to that, all other things being equal, which would exist in the absence of the damper assemblies detailed herein. In an exemplary embodiment, the amount of limitation of movement results in a reduction of the movement of the piezoelectric transducer at a given location (e.g., the point that moves the most during normal operation, or any other consistent, apples to apples, point) at least 50, 60, 70, 80, 90, 100, 125, 150, 175, 200, 250, 300, 350, 400, 450, 500, 550, 600, 650, 700, 750, 800, 900, 1,000, 1,250, 1,500, 1,750, 2,000, 2,500, 3,000, 3,500, 4,000, 4,500, 5,000, 6,000, 7,000, 8,000, 9,000, 10,000, 12,500, 15,000, 17,500, 20,000, 25,000, 30,000, 40,000, 50,000, 60,000, 70,000, 80,000, 90,000, or 100,000 percent, or any value or range of values therebetween in 1% increments, for a given acceleration and/or deceleration, all other things being equal.

In an exemplary embodiment, the distance from the center of the piezoelectric transducer to the outermost edge of the piezoelectric material and/or the outermost edge of the counterweights is about 2, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, or 4 mm or any value or range of values therebetween in about 0.01 mm increments.

In an exemplary embodiment, the transducer is configured such that, during operation to evoke a hearing percept, when the component is subjected to a one G environment, the transducer bends upwards a maximum of a first value and downward a maximum of a second value, wherein the direction of movement upward and downward is parallel to the direction of gravity of the one G environment, and the transducer cannot move upward more than 1.01, 1.02, 1.03, 1.04, 1.05, 1.06, 1.07, 1.08, 1.09, 1.1, 1.2, 1.3, 1.4, 1.5, 1.6, 1.7, 1.8, 1.9, 2.0, 2.2, 2.4, 2.6, 2.8, 3.0, 3.5, 4, 4.5, 5, 5.5 or 6 times the first value and/or downward more than 1.01, 1.02, 1.03, 1.04, 1.05, 1.06, 1.07, 1.08, 1.09, 1.1, 1.2, 1.3, 1.4, 1.5, 1.6, 1.7, 1.8, 1.9, 2.0, 2.2, 2.4, 2.6, 2.8, 3.0, 3.5, 4, 4.5, 5, 5.5 or 6 times more than the second value.

It is noted that with respect to the teachings detailed herein vis-à-vis the damping of the transducer, including shock proofing the transducer, in at least some embodiments, the damping ability is present while the transducer is utilized to evoke a hearing percept. Still further, in at least some exemplary embodiments, the damping ability is present while the transducer is implanted in the recipient, such as in the case of the active transcutaneous bone conduction device or while the transducer is attached to a recipient, such as the case with respect to the percutaneous bone conduction device or the active transcutaneous bone conduction device.

Briefly, it is noted that in some embodiments, when exposed to a 10, 15, or 20 G acceleration and/or deceleration, in embodiments without the damping assembly, the resulting flap moves the piezoelectric transducer at least 4, 5, 6, 7, 8, 9, 10, 11, 12, 13, 14, 15, 20, 25, 30, 35, 40, 45, or 50 times the amount that occurs during normal operation in response to a pure sine wave at 1000 Hz at 80 dB (as measured at the microphone of the external component when used therewith). The damping assemblies as detailed herein reduces this amount such as by an amount that is no more than at least 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3. 3.25, 3.5, 3.75, 4, 4.25, 4.5, 4.75, 5, 5.5, 6, 6.5, 7, 7.5, 8, 8.5, or 9 times the amount that occurs during normal operation in response to the aforementioned pure sine wave at 1000 Hz at 80 dB.

In an exemplary embodiment, there is a prosthesis, comprising: a transducer; and a damper configured to provide varying degrees of damping to the transducer, which varying degrees include at least effectively no damping. In an exemplary embodiment of this embodiment, the damper is a mixture of resilient components and rigid components. In an exemplary embodiment of the prosthesis described above and/or below, the prosthesis includes a housing that encompasses the transducer;

the prosthesis is configured such that at rest with the transducer in a non-energized state, a gas gap is located between the damper and the housing;

the prosthesis is configured to collapse the gas gap during normal operation when the transducer operates at the resonant frequency; and the damper provides a damping of the first resonance peak of the transducer due to collapsation of the gas gap.

In an exemplary embodiment of the prosthesis described above and/or below the prosthesis is configured such that the gas gap is closed upon the application of a 200 G acceleration to the housing; and the damper is configured to shockproof the transducer at least up to the 200 G acceleration.

In an exemplary embodiment of the prosthesis described above and/or below the damper is configured such that upon a first amount of deflection of the transducer, the damper resists movement of the transducer with zero force, and upon a second amount of deflection greater than the first deflection, the damper resists movement of the transducer with a first force greater than the zero force.

In an exemplary embodiment, there is a prosthesis, comprising:

a transducer-seismic mass assembly;

a housing; and a damper apparatus, wherein the damper apparatus is made by a method of:

completely filling a space between the housing and the transducer-seismic mass assembly with structural components of the prosthesis; and permanently shrinking the damper apparatus to create a gas gap in the formerly filled space.

In an exemplary embodiment of the prosthesis described above and/or below, the the housing is hermetically welded shut; and the welding was executed while a component of the damper apparatus was in a liquid phase.

It is noted that any disclosure of a device and/or system herein corresponds to a disclosure of a method of utilizing such device and/or system. It is further noted that any disclosure of a device and/or system herein corresponds to a disclosure of a method of manufacturing such device and/or system. It is further noted that any disclosure of a method action detailed herein corresponds to a disclosure of a device and/or system for executing that method action/a device and/or system having such functionality corresponding to the method action. It is also noted that any disclosure of a functionality of a device herein corresponds to a method including a method action corresponding to such functionality. Also, any disclosure of any manufacturing methods detailed herein corresponds to a disclosure of a device and/or system resulting from such manufacturing methods and/or a disclosure of a method of utilizing the resulting device and/or system.

Unless otherwise specified or otherwise not enabled by the art, any one or more teachings detailed herein with respect to one embodiment can be combined with one or more teachings of any other teaching detailed herein with respect to other embodiments.

While various embodiments have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A vibrator comprising:

a housing;

a transducer positioned within the housing such that there is a gap between the transducer and housing; and a damper assembly, disposed in the gap between the housing and at least a portion of the transducer, the damper assembly extending a sub-distance of the total distance of the gap.

2. The vibrator of claim 1, wherein:

an open gap is located between the housing and the damper assembly; and a width of the open gap always varies with transduction of the transducer.

3. The vibrator of claim 1, wherein:
the vibrator is configured to close the total distance of the gap upon movement of the transducer relative to the housing, thereby damping an output of the transducer at a resonant frequency of the transducer relative to that which would be the case in the absence of the damper assembly.
4. The vibrator of claim 1, wherein:
the damper assembly is a glass bead/silicone mixture.
5. The vibrator of claim 1, wherein:
the vibrator is configured to output vibrations upon transduction of the transducer with the damper assembly free of compression due to the housing and due to the transducer.
6. The vibrator of claim 1, wherein:
the vibrator is configured to close the total distance of the gap upon movement of the transducer relative to the housing, thereby reducing acceleration applied to the transducer relative to that which would be the case in the absence of the damper assembly.
7. The vibrator of claim 1, wherein:
the transducer carries the damper assembly within the housing.
8. The vibrator of claim 1, wherein:
the vibrator is a prosthesis.
9. The vibrator of claim 1, wherein:
the damper assembly is a means for damping the transducer.
10. The vibrator of claim 1, wherein:
the vibrator is of a design so that the transducer is shock-proofed by the damper apparatus for at least 300 G accelerations all the time.
11. The vibrator of claim 1, wherein:
the damper assembly is configured such that upon a first amount of deflection of the transducer, the damper assembly resists movement of the transducer with a first force, and upon a second amount of deflection greater than the first deflection, the damper resists movement of the transducer with a second force greater than the first force.
12. The vibrator of claim 11, wherein:
the damper assembly smoothly increases resistance to movement of the transducer between the first force and the second force with increased deflection between the first amount and the second amount, with an inflection point at the second amount.
13. The vibrator of claim 11, wherein:
the damper assembly increases resistance of movement exponentially between the first force and the second force with increased deflection.
14. The vibrator of claim 1, wherein:
the damper assembly provides a damping of a first resonance peak of the transducer without damping another frequency for normal operation of the vibrator.
15. The vibrator of claim 1, wherein:
the damper assembly is configured to provide varying degrees of damping to the transducer, which varying degrees include at least effectively no damping.
16. The vibrator of claim 1, wherein:
the vibrator is of a design so that the transducer is shock-proofed by the damper apparatus for at least 600 G accelerations all the time.
17. The vibrator of claim 1, wherein:
the vibrator is configured to, in a 1 G environment, close the total distance of the gap upon movement of the transducer relative to the housing, thereby damping an output of the transducer at a resonant frequency of the transducer relative to that which would be the case in the absence of the damper assembly.
18. A device, comprising:
a transducer;
a damper configured to provide varying degrees of damping to the transducer, which varying degrees include at least effectively no damping.
19. The device of claim 18, wherein:
the damper is a mixture of silicone and solids dispersed within the silicone.
20. The device of claim 18, wherein:
the damper is configured such that upon a first amount of deflection of the transducer, the damper resists movement of the transducer with a first force, and upon a second amount of deflection greater than the first deflection, the damper resists movement of the transducer with a second force greater than the first force.
21. The device of claim 20, wherein:
the second force prevents substantially all further movement of the transducer.
22. The device of claim 20, wherein:
the damper increases resistance of movement exponentially between the first force and the second force with increased deflection.
23. A vibrator comprising:
a housing;
a transducer positioned within the housing such that there is a gap between the transducer and housing; and
an apparatus, disposed in the gap between the housing and at least a portion of the transducer, the apparatus extending a sub-distance of the total distance of the gap.
24. The vibrator of claim 23, wherein the apparatus is a damper assembly that includes silicone.
25. The vibrator of claim 23, wherein the apparatus is a damper component that includes silicone.
26. The vibrator of claim 23, wherein the apparatus is a stop component.
27. The vibrator of claim 23, wherein the apparatus is a non-damper apparatus.

* * * * *